United States Patent
Jeon et al.

(10) Patent No.: US 11,758,587 B2
(45) Date of Patent: Sep. 12, 2023

(54) RANDOM ACCESS PROCESS IN NEW RADIO

(71) Applicant: Comcast Cable Communications, LLC, Philadelphia, PA (US)

(72) Inventors: Hyoungsuk Jeon, Centreville, VA (US); Esmael Hejazi Dinan, McLean, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 313 days.

(21) Appl. No.: 17/333,821

(22) Filed: May 28, 2021

(65) Prior Publication Data

US 2021/0400733 A1    Dec. 23, 2021

Related U.S. Application Data

(63) Continuation of application No. 15/933,295, filed on Mar. 22, 2018, now Pat. No. 11,057,935.

(60) Provisional application No. 62/475,039, filed on Mar. 22, 2017, provisional application No. 62/475,045, filed on Mar. 22, 2017, provisional application No. 62/475,028, filed on Mar. 22, 2017.

(51) Int. Cl.
*H04W 74/08* (2009.01)
*H04W 72/23* (2023.01)
*H04L 5/00* (2006.01)

(52) U.S. Cl.
CPC ....... *H04W 74/0833* (2013.01); *H04W 72/23* (2023.01); *H04L 5/001* (2013.01); *H04L 5/0023* (2013.01); *H04L 5/0048* (2013.01)

(58) Field of Classification Search
None
See application file for complete search history.

(56) References Cited

U.S. PATENT DOCUMENTS

| | | |
|---|---|---|
| 7,161,952 B1 | 1/2007 | Herrmann |
| 7,304,970 B1 | 12/2007 | Ishikawa |
| 8,229,439 B2 | 7/2012 | Du |
| 8,229,494 B1 | 7/2012 | Kela et al. |
| 8,451,781 B2 | 5/2013 | Jeong et al. |
| 8,494,572 B2 | 7/2013 | Chen et al. |
| 9,008,050 B2 | 4/2015 | Feuersanger et al. |
| 9,609,499 B2 | 3/2017 | Shukla |
| 9,781,687 B2 | 10/2017 | Sen et al. |
| 9,930,700 B2 | 3/2018 | Wang et al. |
| 9,942,412 B1 | 4/2018 | Oroskar et al. |

(Continued)

FOREIGN PATENT DOCUMENTS

JP    5023150 B2    9/2012

OTHER PUBLICATIONS

3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).

(Continued)

*Primary Examiner* — Edan Orgad
*Assistant Examiner* — Emmanuel K Maglo
(74) *Attorney, Agent, or Firm* — Banner & Witcoff, Ltd.

(57) ABSTRACT

Systems, apparatuses, and methods are described for wireless communications. Random access procedures may include various types of procedures, such as four-step or two-step random access procedures.

28 Claims, 27 Drawing Sheets

(56) References Cited

U.S. PATENT DOCUMENTS

| | | | |
|---|---|---|---|
| 10,142,980 B2 | 11/2018 | Radulescu et al. | |
| 10,397,958 B2* | 8/2019 | Tsai | H04W 74/0833 |
| 2009/0156194 A1* | 6/2009 | Meylan | H04W 74/0866 |
| | | | 455/422.1 |
| 2009/0181710 A1 | 7/2009 | Pani et al. | |
| 2010/0062799 A1 | 3/2010 | Ishii et al. | |
| 2010/0322096 A1 | 12/2010 | Hsu et al. | |
| 2012/0069788 A1 | 3/2012 | Shen et al. | |
| 2012/0076075 A1 | 3/2012 | Komine et al. | |
| 2012/0149422 A1 | 6/2012 | Ye et al. | |
| 2013/0010711 A1 | 1/2013 | Larsson et al. | |
| 2013/0242730 A1 | 9/2013 | Pelletier et al. | |
| 2014/0204843 A1 | 7/2014 | Larsson et al. | |
| 2014/0334448 A1 | 11/2014 | Langereis et al. | |
| 2015/0110072 A1 | 4/2015 | Kato et al. | |
| 2015/0181546 A1 | 6/2015 | Freda et al. | |
| 2015/0296542 A1* | 10/2015 | Heo | H04W 74/0833 |
| | | | 370/329 |
| 2016/0150445 A1 | 5/2016 | Sandhu et al. | |
| 2016/0212769 A1 | 7/2016 | Huang et al. | |
| 2016/0262109 A1 | 9/2016 | Chen et al. | |
| 2016/0330740 A1 | 11/2016 | Uchino et al. | |
| 2017/0006640 A1 | 1/2017 | Dinan | |
| 2017/0034853 A1 | 2/2017 | Rune et al. | |
| 2017/0041841 A1 | 2/2017 | Pedersen et al. | |
| 2017/0257195 A1 | 9/2017 | Maaref | |
| 2017/0290064 A1 | 10/2017 | Liu et al. | |
| 2018/0054837 A1 | 2/2018 | Islam et al. | |
| 2018/0103465 A1 | 4/2018 | Agiwal et al. | |
| 2018/0110074 A1* | 4/2018 | Akkarakaran | H04W 74/0833 |
| 2018/0115981 A1 | 4/2018 | Kim et al. | |
| 2018/0124830 A1 | 5/2018 | Lin et al. | |
| 2018/0176962 A1* | 6/2018 | Wu | H04W 74/0833 |
| 2018/0205516 A1 | 7/2018 | Jung et al. | |
| 2018/0220345 A1* | 8/2018 | Moon | H04B 7/088 |
| 2018/0234839 A1 | 8/2018 | Tenny et al. | |
| 2018/0270869 A1 | 9/2018 | Tsai | |
| 2018/0288746 A1 | 10/2018 | Zhang et al. | |
| 2018/0310257 A1 | 10/2018 | Papasakellariou | |
| 2018/0343682 A1 | 11/2018 | Tang et al. | |
| 2019/0075598 A1 | 3/2019 | Li et al. | |
| 2019/0173740 A1 | 6/2019 | Zhang et al. | |
| 2019/0174554 A1* | 6/2019 | Deenoo | H04L 5/0048 |
| 2020/0045742 A1 | 2/2020 | Suzuki et al. | |
| 2020/0068616 A1 | 2/2020 | Qian et al. | |
| 2020/0252974 A1 | 8/2020 | Akkarakaran et al. | |
| 2021/0337597 A1 | 10/2021 | Yoshimura et al. | |

OTHER PUBLICATIONS

R1-1709897 3GPP TSG RAN WG1 NR Ad-hoc #2, Qingdao, P.R. China, Jun. 27-30, 2017, Source: ZTE, Title: 4-step random access procedure.
R1-1710035 3GPP TSG RAN WG1 NR Ad-Hoc #2, Qingdao, P.R. China, Jun. 27-30, 2017, Source: CATT, Title: Further details on NR 4-step RA Procedure.
R1-1710138 3GPP TSG RAN WG1 NR Ad-Hoc #2, Qingdao, P.R. China, Jun. 27-30, 2017, Source: Guangdong OPPO Mobile Telecom, Title: NR 4-Step Random Access Procedure.
R1-1710218 3GPP TSG RAN WG1 NR Ad-Hoc #2, Qingdao, P.R. China, Jun. 27-30, 2017, Source: Mitsubishi Electric, Title: RACH transmission count.
R1-1710234 3GPP TSG-RAN WG1 NR Ad-Hoc #2, Qingdao, P.R. China, Jun. 27-30, 2017, Source: Fujitsu, Title: Discussion on 4-step RA procedure.
R1-1710271 3GPP TSG RAN WG1 NR #2, Qingdao, P.R. China, Jun. 27-30, 2017, Source: LG Electronics, Title: RACH procedure.
R1-1710422 3GPP TSG RAN WG1 Ad hoc Meeting #2, Qingdao, P.R. China, Jun. 26-30, 2017, Source: AT&T, Title: DL Tx Beam Reporting in msg. 3.
R1-1710478 3GPP TSG RAN WG1 NR Ad-Hoc Meeting, Qingdao, P.R. China, Jun. 27-30, 2017, Source: Huawei, HiSilicon, Title: RACH procedures and resource configuration.
R1-1710513 3GPP TSG RAN WG1 NR Adhoc #2, Qingdao, P.R. China, Jun. 27-30, 2017, Source: Intel Corporation, Title: 4-step PRACH procedures.
R1-1710636 3GPP TSG RAN WG1 Meeting NR AH #2, Qingdao, P.R. China, Jun. 27-30, 2017, Source: Samsung, Title: 4-step RACH procedure discussion.
R1-1710774 3GPP TSG RAN WG1 Meeting NR Adhoc, Qingdao, P.R. China, Jun. 27-30, 2017, Source: CMCC, Title: Discussion on RACH configuration.
R1-1710824 3GPP TSG RAN WG1 NR Ad-Hoc #2, Qingdao, P.R. China, Jun. 27-30, 2017, Source: MediaTek Inc., Title: On 4-step RACH procedure.
R1-1710860 3GPP TSG RAN WG1 NR Ad-Hoc #2, Qingdao, P.R. China, Jun. 27-30, 2017, Source: Sony, Title: Considerations on 4-step RA Procedure.
R1-1710871 3GPP TSG-RAN WG1 NR Ad-Hoc #2, Qingdao, P.R. China, Jun. 27-20, 2017, Source: InterDigital Inc., Title: Multiple Msg1 transmissions for one monitored RAR window.
R1-1710892 3GPP TSG RAN WG1 NR Ad-Hoc #2, Qingdao, P.R. China, Jun. 27-30, 2017, Source: Nokia, Alcatel-Lucent Shanghai Bell, Title: NR 4-step RACH procedure.
R1-1711068 3GPP TSG RAN WG1 NR Ad-Hoc #2, Qingdao, P.R. China, Jun. 27-30, 2017, Source: NTT Docomo, Inc., Title: Discussion on 4-step RA procedure for NR.
R1-1711148 3GPP TSG-RAN WG1 Meeting #89, Hangzhou, China, May 15-19, 2017, Source: Qualcomm Incorporated, Title: 4-step RACH procedure consideration.
R1-1711279 3GPP TSG RAN WG1 NR Ad-Hoc #2, Qingdao, P.R. China, Jun. 27-30, 2017, Source: Motorola Mobility, Lenovo, Title: RACH configuration and procedure.
R1-1711383 3GPP TSG RAN WG1 NR Ad-Hoc #2, Qingdao, P.R. China, Jun. 27-30, 2017, Source: Ericsson, Title: 4-step random access procedure.
Dec. 16, 2019—European Extended Search Report—EP 19190988.6.
R1-1806545 3GPP TSG RAN WG1 Meeting #93, Busan, Korea, May 21-25, 2018, Source: Intel Corporation, Title: Potential enhancements to NR initial access and mobility to support unlicensed operation.
R2-1713954 3GPP TSG RAN WG2 Meeting #100, Reno, USA, Nov. 27-Dec. 1, 2017, Source: ZTE Corporation, Sanechips, Title: Discussion on the beam failure recovery impact on RAN2.
R1-164131 3GPP TSG RAN WG1 Meeting #85, Nanjing, China, May 23-27, 2017, Source: Intel Corporation, Title: PRACH Transmission for eLAA.
R1-162358 3GPP TSG RAN WG1 Meeting #84bis, Busan, Korea, Apr. 11-15, 2016, Source: Intel Corporation, Title: PRACH Design for eLAA.
Apr. 22, 2021—European Office Action—EP 18718540.0.
"Text Proposal to TR 38.804 on Random Access Procedure," Spokane, WA, 3GPP TSG-RAN WG2 NR Ad Hoc, R2-1700416, Jan. 17-19, 2017, Source: Ericsson.
"Discussions on 2 Steps RACH Procedure," Spokane, WA, 3GPP TSG RAN WG2 Meeting AH_NR Meeting, R2-1700471, Jan. 17-19, 2017, Source: Sony.
"Flexible RACH," Spokane, WA, 3GPP TSG-RAN WG2 Meeting NR AH, R2-1700522, Jan. 17-19, 2017, Source: MediaTek Inc.
"2 step Random Access Procedure in NR," Spokane, WA, 3GPP TSG-RAN WG2 Meeting NR ad-hoc, R2-1700564, Jan. 17-19, 2017, Source: Qualcomm Incorporated.
"Considerations on L2 handling for Handover," Athens, Greece, 3GPP TSG-RAN WG2 NR Adhoc, R2-1700816, Feb. 13-17, 2017, Source: Nokia, Alcatel-Lucent Shanghai Bell.
"Random Access in NR—Flexible UE Bandwidth Aspects," Athens, Greece, 3GPP TSG-RAN WG2 Meeting #97, R2-1700821, Feb. 13-17, 2017, Source: Samsung.
"Random Access Enhancements," Athens, Greece, 3GPP TSG-RAN WG2 Meeting #97, R2-1700850, Feb. 13-17, 2017, Source: Ericsson.
"Text proposal on RACH (E-mail discussion NR-AH#12)," Athens, Greece, 3GPP TSG-RAN WG2 Meeting #97, R2-1700851, Feb. 13-17, 2017, Source: Ericsson.

(56) References Cited

OTHER PUBLICATIONS

"Pcell change procedure for CA in NR," Athens, Greece, 3GPP TSG-RAN WG2 Meeting #97, R2-1700855, Feb. 13-17, 2017, Source: Ericsson.
"Further details of handover execution in NR," Athens, Greece, 3GPP TSG-RAN WG2 Meeting #97, R2-1700863, Feb. 13-17, 2017, Source: Ericsson.
"Conditional Handover," Athens, Greece, 3GPP TSG-RAN WG2 Meeting #97, R2-1700864, Feb. 13-17, 2017, Source Ericsson.
"RLC ARQ vs. PDCP data recovery during mobility," Athens, Greece, 3GPP TSG-RAN WG2 Meeting #97, R2-1700865, Feb. 13-17, 2017, Source: Ericsson.
"SeNB to MeNB reconfiguration for NR dual-connectivity," Athens, Greece, 3GPP TSG-RAN WG2 Meeting #97, R2-1700866, Feb. 13-17, 2017, Source: Ericsson.
"RRC involved HO for cell-level mobility," Athens, Greece, 3GPP TSG-RAN WG2 Meeting #97, R2-1700883, Feb. 13-17, 2017, Source: MediaTek Inc.
"Mobility Enhancement for '0ms' interruption," Spokane, WA, 3GPP TSG-RAN WG2 NR, R2-1700897, Jan. 17-19, 2017, Source: MediaTek Inc., ASUS TeK.
"Discussion on Handover Procedure Optimization," Athens, Greece, 3GPP TSG-RAN WG2 Meeting #97, R2-1700956, Feb. 13-17, 2017, Source: OPPO.
"Consideration on Random Access in NR," Athens, Greece, 3GPP TSG-RAN WG2 Meeting #97, R2-1700962, Feb. 13-17, 2017, Source: OPPO.
"Design Principles for Random Access Procedure in NR," Athens, Greece, 3GPP TSG-RAN WG2 Meeting #97, R2-1700969, Feb. 13-17, 2017, Source: CATT.
"Random Access Procedure in NR," Athens, Greece, 3GPP TSG-RAN WG2 Meeting #97, R2-1700970, Feb. 13-17, 2017, Source: CATT.
"L2 Behaviors in NR Handover or Reconfiguration," Athens, Greece, 3GPP TSG-RAN WG2 Meeting #97, R2-1700984, Feb. 13-17, 2017, Source: CATT.
"Further Consideration on Inter-cell HO Mechanism," Athens, Greece, 3GPP TSG-RAN WG2 Meeting #97, R2-1700985, Feb. 13-17, 2017, Source: CATT.
"NR Mobility Enhancement on Single Connectivity," Athens, Greece, 3GPP TSG-RAN WG2 Meeting #97, R2-1700986, Feb. 13-17, 2017, Source: CATT.
"NR Mobility Enhancement on Dual Connectivity," Athens, Greece, 3GPP TSG-RAN WG2 Meeting #97, R2-1700987, Feb. 13-17, 2017, Source: CATT.
"NW Activation-De-activation of autonomous handover in single connectivity," Athens, Greece, 3GPP TSG-RAN WG2 Meeting #97, R2-1701137, Feb. 13-17, 2017, Source: Sharp.
"Mobility in NR Connected-Active," Athens, Greece, 3GPP TSG-RAN WG2 Meeting #97, R2-1701148, Feb. 13-17, 2017, Source: Samsung.
"Inter-cell and Inter-node UE RRC Driven Mobility in NR," Athens, Greece, 3GPP TSG-RAN WG2 Meeting #97, R2-1701194, Feb 13-17, 2017, Source: InterDigital Communications.
"Introduction of UE autonomous mobility," Athens, Greece, 3GPP TSG-RAN WG2 Meeting #97, R2-1701360, Feb. 13-17, 2017, Source: Samsung.
"Discussion on intra-frequency operation for dual-connectivity in HF NR," Athens, Greece, 3GPP TSG-RAN WG2 Meeting #97, R2-1701361, Feb. 13-17, 2017, Source: Samsung.
"Consideration on dual connected handover," Athens, Greece, 3GPP TSG-RAN WG2 Meeting #97, R2-1701384, Feb. 13-17, 2017, Source: ZTE, ZTE Microelectronics.
"Solutions for single connected handover," Athens, Greece, 3GPP TSG-RAN WG2 Meeting #97, R2-1701385, Feb. 13-17, 2017, Source: ZTE, ZTE Microelectronics.
"Remaining RAN2 aspects on random access procedure for NR," Athens, Greece, 3GPP TSG-RAN WG2 Meeting #97, R2-1701520, Feb. 13-17, 2017, Source: NTT Docomo, Inc.

"RA enhancement for New RAT," Athens, Greece, 3GPP TSG-RAN WG2 Meeting #97, R2-1701539, Feb. 13-17, 2017, Source: LG Electronics Inc.
"NW controlled autonomous handover in single connectivity," Athens, Greece, 3GPP TSG-RAN WG2 Meeting #97, R2-1701711, Feb. 13-17, 2017, Source: Intel Corporation.
"Mobility type support for multiple beams in NR," Athens, Greece, 3GPP TSG-RAN WG2 Meeting #97, R2-1701712, Feb. 13-17, 2017, Source: Intel Corporation.
"Further considerations of random access in NR," Athens, Greece, 3GPP TSG-RAN WG2 Meeting #97, R2-1701721, Feb. 13-17, 2017, Source: Intel Corporation.
"Considerations on NR RA procedure," Athens, Greece, 3GPP TSG-RAN WG2 Meeting #97, R2-1701771, Feb. 13-17, 2017, Source: Qualcomm Incorporated.
"Handover in single connectivity scenario," Athens, Greece, 3GPP TSG-RAN WG2 Meeting #97, R2-1701798, Feb. 13-17, 2017, Source: Huawei, HiSilicon.
"0ms interruption handover for NR," Athens, Greece, 3GPP TSG-RAN WG2 Meeting #97, R2-1701799, Feb. 13-17, 2017, Source: Huawei, HiSilicon.
"Enhancements for robust handover," Athens, Greece, 3GPP TSG-RAN Meeting #97, R2-1701800, Feb. 13-17, 2017, Source: Huawei, HiSilicon.
"NR mobility in Connected," Athens, Greece, 3GPP TSG-RAN WG2 Meeting #97, R2-1701833, Feb. 13-17, 2017, Source: Sharp.
"Mobility Enhancements in NR phase 1 (Release 15)," Athens, Greece, 3GPP TSG-RAN WG2 Meeting #97, R2-1701905, Feb. 13-17, 2017, Source: Samsung.
"How to define zero mobility interruption time," Athens, Greece, 3GPP TSG-RAN WG2 Meeting #97, R2-1701906, Feb. 13-17, 2017, Source: Samsung.
"Condition based handover procedure in NR," Athens, Greece, 3GPP TSG-RAN2 Meeting #97, R2-1701966, Feb. 13-17, 2017, Source: LG Electronics Inc.
"2-Step Random Access Procedure in NR," Reno, Nevada, 3GPP TSG-RAN WG2 Meeting #96, R2-168520, Nov. 14-18, 2016, Source: Intel Corporation.
Jun. 21, 2018—Partial International Search Report and Written Opinion—PCT/US2018/023886.
"2-step Random Access Procedure," Spokane, WA, 3GPP TSG RAN WG1 NR, AH_NR Meeting R1-1700105, Jan. 16-20, 2017, Source: ZTE, ZTE Microelectronics (Version 2).
Aug. 13, 2018—International Search Report and Written Opinion—PCT/2018/023886.
U.S. Appl. No. 62/427,736, filed Nov. 29, 2016.
3GPP TS 38.213 V15.2.0 (Jun. 2018), Technical Specification, 3rd Generation Partnership Project; Technical Specification Group Radio Access Network; NR; Physical layer procedures for control (Release 15).
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
3GPP TS 36.300 V8.5.0 (May 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 10.1.2-10.1.2.7: Handover Procedure: Mobility Management in ECM-Connected.
"Further Consideration on two-step RACH," Spokane, WA, 3GPP TSG RAN WG1 NR, Ad Hoc Meeting R1-1700035, Jan. 16-20, 2017, Source: Huawei, HiSilicon.
"General discussion of UL power control for NR," Spokane, WA, 3GPP TSG RAN WG1 NR, Ad Hoc Meeting R1-1700063, Jan. 16-20, 2017, Source: Huawei, HiSilicon.
"Detailed considerations on UL power control design for NR," Spokane, WA, 3GPP TSG RAN WG1 NR, Ad Hoc Meeting R1-1700064, Jan. 16-20, 2017, Source: Huawei, HiSilicon.
"2-step Random Access Procedure," Spokane, WA, 3GPP TSG RAN WG1 NR, AH_NR Meeting R1-1700105, Jan. 16-20, 2017, Source: ZTE, ZTE Microelectronics.

(56) References Cited

OTHER PUBLICATIONS

"Discussion on UL power control for NR," Spokane, WA, 3GPP TSG RAN WG1 NR Ad-Hoc Meeting R1-1700142, Jan. 16-20, 2017, Source: ZTE, ZTE Microelectronics.
"On 2-step random access procedure and physical channel in NR," Spokane, WA, 3GPP TSG RAN WG1 NR Meeting #87, R1-1700172, Jan. 16-20, 2017, Source: MediaTek Inc.
"NR two-step random access procedure," Spokane, WA, 3GPP TSG-RAN WG1 NR adhoc, R1-1700300, Jan. 16-20, 2017, Source: Ericsson.
"Further considerations on a 2-step RA Procedure," Spokane, WA, 3GPP TSG RAN WG1 AH_NR, R1-1700186, Jan. 16-20, 2017, Source: CATT.
"2-Step RA Procedure for NR," Spokane, WA, 3GPP TSG RAN1 NR Ad-Hoc Meeting, R1-1700311, Jan. 16-20, 2017, Source: AT&T.
"On Uplink Power Control," Spokane, WA, 3GPP TSG RAN WG1 NR Ad-Hoc Meeting, R1-1700358, Jan. 16-20, 2017, Source: Intel Corporation.
"Discussion on 2-step RA procedure issues," Spokane, WA, 3GPP TSG RAN WG1 Meeting #87, R1-1700426, Jan. 16-20, 2017, Source: ITRI.
"Discussion on 2 step RACH," Spokane, WA, 3GPP TSG RAN WG1 NR Ad-Hoc Meeting, R1-1700464, Jan. 16-20, 2017, Source: LG Electronics.
"Discussion on UL transmit power control for NR," Spokane, WA, 3GPP TSG RAN WG1 NR Ad-Hoc Meeting, R1-1700492, Jan. 16-20, 2017, Source: LG Electronics.
"Uplink power control for NR," Spokane, WA, 3GPP TSG RAN WG1 NR Ad-Hoc, R1-1700553, Jan. 16-20, 2017, Source: Guangdong OPPO Mobile Telecom.
"On 2-step RA procedure for NR," Spokane, WA, 3GPP TSG RAN WG1 Ad-Hoc Meeting, R1-1700577, Jan. 16-20, 2017, Source: ETRI.
"Design considerations for 2-step RACH," Spokane, WA, 3GPP TSG RAN WG1 NR Ad-Hoc Meeting, R1-1700587, Jan. 16-20, 2017, Source: HTC.
"Uplink power control considering waveform switching," Spokane, WA, 3GPP TSG-RAN WG1-NR, R1-1700601, Jan. 16-20, 2017, Source: NTT Docomo, Inc.
"On 2-step Random Access Procedure," Spokane, WA, 3GPP TSG-RAN WG1 AH_NR Meeting, R1-1700652, Jan. 16-20, 2017, Source: Nokia, Alcatel-Lucent Shanghai Bell.
"Discussions on 2 Steps RACH Procedure," Spokane, WA, 3GPP TSG RAN WG1 Meeting AH_NR Meeting, R1-1700668, Jan. 16-20, 2017, Source: Sony.
"2-step random access procedure," Spokane, WA, 3GPP TSG RAN WG1 AH_NR Meeting, R1-1700703, Jan. 16-20, 2017, Source: InterDigital Communications.
"2-step RACH procedure consideration," Spokane, WA, 3GPP TSG-RAN WG1 NR AdHoc Meeting, R1-1700792, Jan. 16-20, 2017, Source: Qualcomm Incorporated.
"UL power control in multi-beam based approaches," Spokane, WA, 3GPP TSG RAN WG1 AH_NR Meeting, R1-1700868, Jan. 16-20, 2017, Source: ASUS TeK.
"Physical channel design for 2-step RACH," Spokane, WA, 3GPP TSG RAN WG1 Meeting NR, R1-1700880, Jan. 16-20, 2017, Source: Motorola Mobility.
"NR 2-step random access procedure," Spokane, WA, 3GPP TSG RAN WG1 NR Ad Hoc, R1-1700892, Jan. 16-20, 2017, Source: Samsung.
"UL Power Control Aspects," Spokane, WA, 3GPP TSG RAN WG1 NR Ad-Hoc Meeting, R1-1700940, Jan. 16-20, 2017, Source: Samsung.
"Dynamic network coordination for URLLC in the 5G New Radio," Spokane, WA, 3GPP TSG RAN WG1 NR Ad-Hoc Meeting, R1-1701108, Jan. 16-20, 2017, Source: Nokia, Alcatel-Lucent Shanghai Bell.
"Uplink Power Control for MIMO," Spokane, WA, 3GPP TSG RAN WG1 NR Ad-Hoc Meeting, R1-1701109, Jan. 16-20, 2017, Source: Nokia, Alcatel-Lucent Shanghai Bell.
"General discussion of UL power control for NR," Athens, Greece, 3GPP TSG RAN WG1 Meeting #88, R1-1701687, Feb. 13-17, 2017, Source: Huawei, HiSilicon.
"Detailed considerations on UL power control design for NR," Athens, Greece, 3GPP TSG RAN WG1 Meeting #88, R1-1701688, Feb. 13-17, 2017, Source: Huawei, HiSilicon.
"Uplink power control for NR," Athens, Greece, 3GPP TSG RAN WG1 Meeting #88, R1-1701947, Feb. 13-17, 2017, Source: Guangdong OPPO Mobile Telecom.
"On UL Power Control," Athens, Greece, 3GPP TSG-RAN WG1 Meeting #88, R1-1702216, Feb. 13-17, 2017, Source Intel Corporation.
"Discussion on uplink power control for NR," Athens, Greece, 3GPP TSG RAN WG1 Meeting #88, R1-1702468, Feb. 13-17, 2017, Source: LG Electronics.
"Discussion on uplink power control," Athens, Greece, 3GPP TSG RAN WG1 Meeting #88, R1-1702623, Feb. 13-17, 2017, Source: Qualcomm Incorporated.
"On power control for NR," Athens, Greece, 3GPP TSG-RAN WG1 Meeting #88, R1-1702695, Feb. 13-17, 2017, Source: Ericsson.
"UL Power Control Aspects," Athens, Greece, 3GPP TSG RAN WG1 Meeting #88, R1-1702964, Feb. 13-17, 2017, Source: Samsung.
"UL power control in multi-beam based approaches," Spokane, WA, 3GPP TSG RAN WG1 AH_NR Meeting, R1-1703052, Jan. 16-20, 2017, Source: ASUS TeK.
"Consideration on use cases of 2-step RACH procedure," Spokane, WA, 3GPP TSG-RAN WG2 Meeting #NR Ad Hoc, R2-1700023, Jan. 17-19, 2017, Source: ASUS TeK.
"Consideration on fallback of 2-step RACH procedure," Spokane, WA, 3GPP TSG-RAN WG2 Meeting #NR Ad Hoc, R2-1700024, Jan. 17-19, 2017, Source: ASUS TeK.
"Considerations on RACH procedure in NR," Spokane, WA, 3GPP TSG-RAN WG2 NR Ad Hoc, R2-1700089, Jan. 17-19, 2017, Source: Huawei, HiSilicon.
"Considerations on the Random-Access Procedure in Massive MIMO NR," Spokane, WA, 3GPP TSG-RAN WG2 NR Ad Hoc, R2-1700103, Jan. 17-19, 2017, Source: National Instruments.
"2-step RACH to 4-step RACH fallback," Spokane, WA, 3GPP TSG RAN WG2 NR Adhoc, R2-1700137, Jan. 17-19, 2017, Source: Sony.
"Considerations on the two-step RACH in NR," Spokane, WA, 3GPP TSG-RAN WG2 NR Ad Hoc, R2-1700155, Jan. 17-19, 2017, Source: ZTE, ZTE Microelectronics.
"Considerations on 2-step RA," Spokane, WA, 3GPP TSG RAN WG2 Meeting Ad Hoc, R2-1700205, Jan. 17-19, 2017, Source: CATT.
"2-Step Random Access Procedure in NR," Spokane, WA, 3GPP TSG-RAN WG2 NR Ad Hoc, R2-1700237, Jan. 17-19, 2017, Source: InterDigital Communications.
"Consideration on use cases of 2-step RACH procedure," Spokane, WA, 3GPP TSG-RAN WG2 Meeting #NR Ad Hoc, R2-1700356, Jan. 17-19, 2017, Source: ASUSTeK, MediaTek Inc.
"Consideration on 2-step RACH," Spokane, WA, 3GPP TSG-RAN WG2 Meeting NR, R2-1700357, Jan. 17-19, 2017, Source: Samsung.
"Consideration on fallback of 2-step RACH procedure," Spokane, WA, 3GPP TSG-RAN WG2 Meeting #NR Ad Hoc, R2-1700358, Jan. 17-19, 2017, Source: ASUSTeK.
"Random Access enhancements," Spokane, WA, 3GPP TSG-RAN WG2 NR Ad Hoc, R2-1700412, Jan. 17-19, 2017, Source: Ericsson.
"On Two-step Random Access and Random Access Latency," Spokane, WA, 3GPP TSG-RAN WG2 NR Ad hoc, R2-1700413, Jan. 17-19, 2017, Source: Ericsson.

* cited by examiner

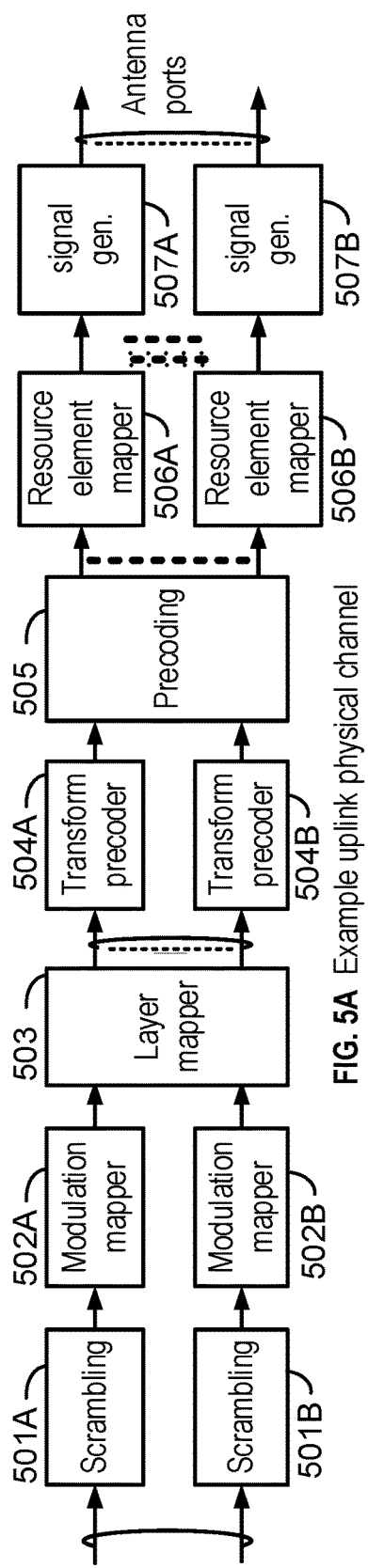
FIG. 5A Example uplink physical channel
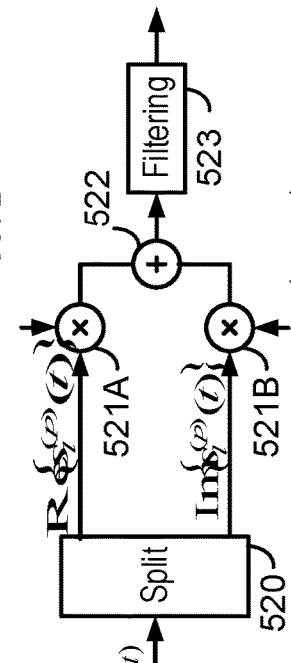
FIG. 5B Example uplink modulation
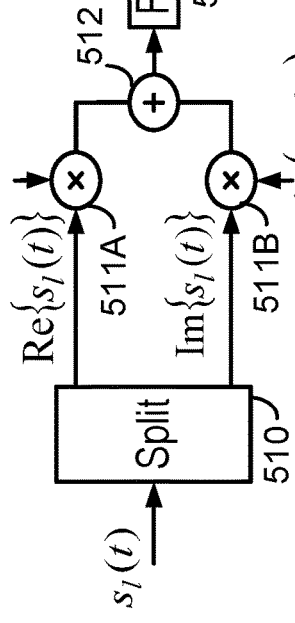
FIG. 5D Example downlink modulation
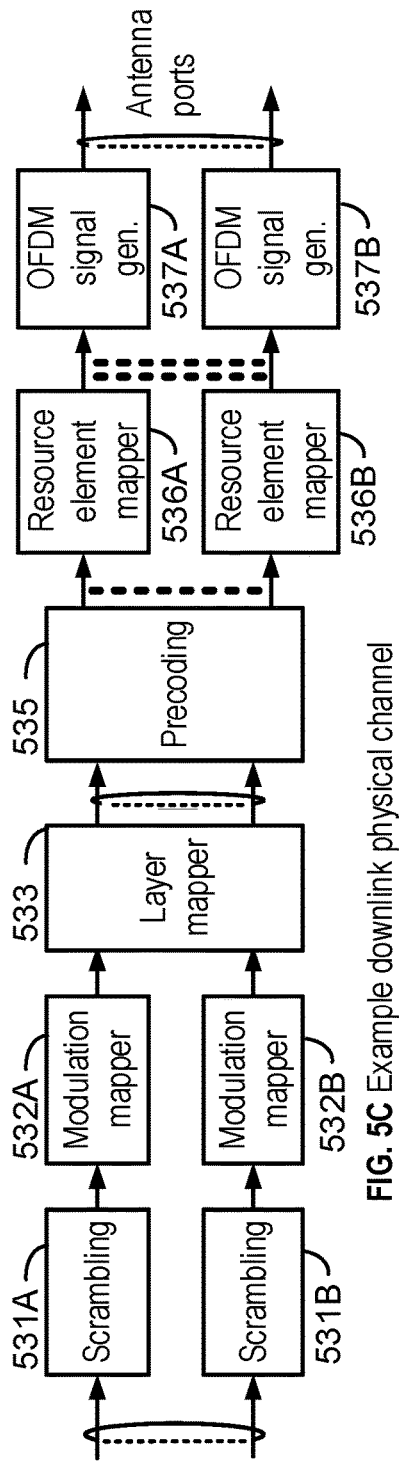
FIG. 5C Example downlink physical channel

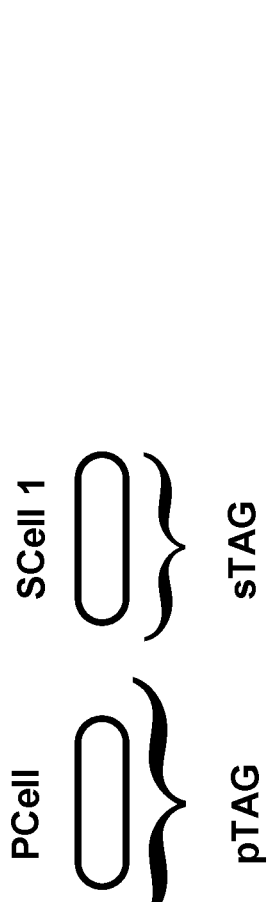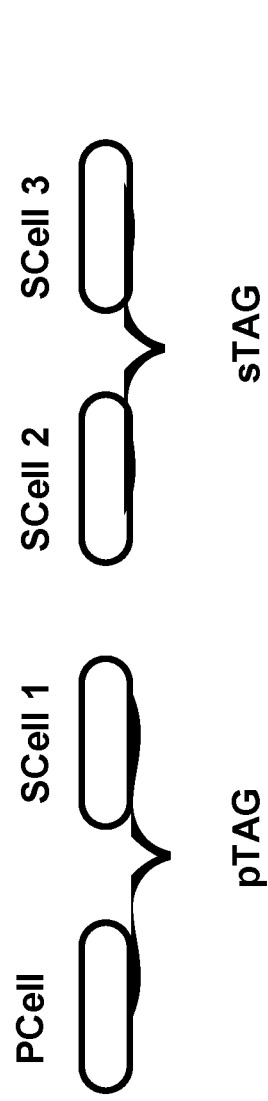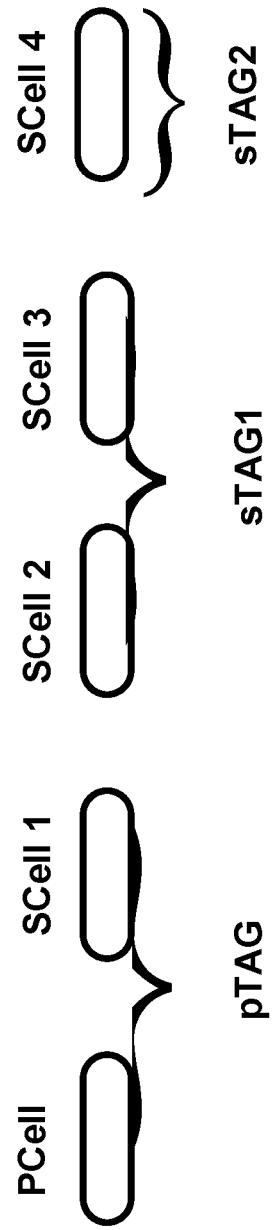
FIG. 8

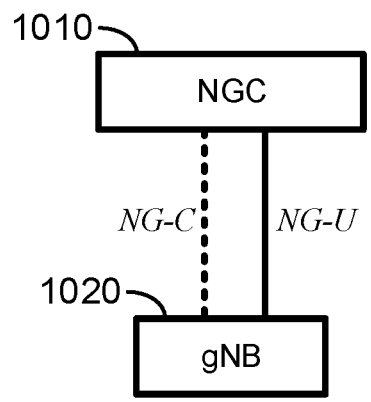
FIG. 10A gNB connected to NGC
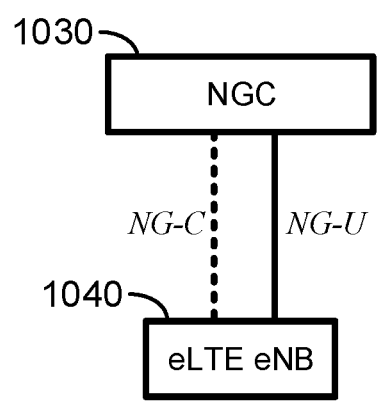
FIG. 10B eLTE eNB connected to NGC

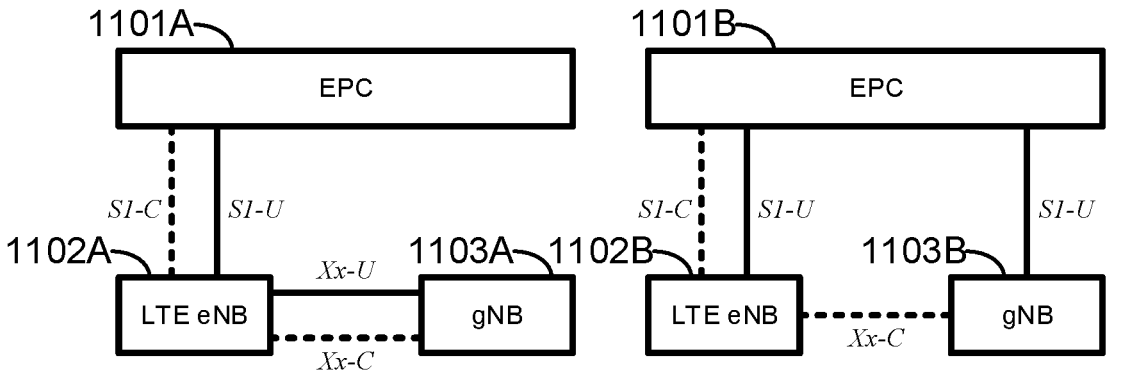

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

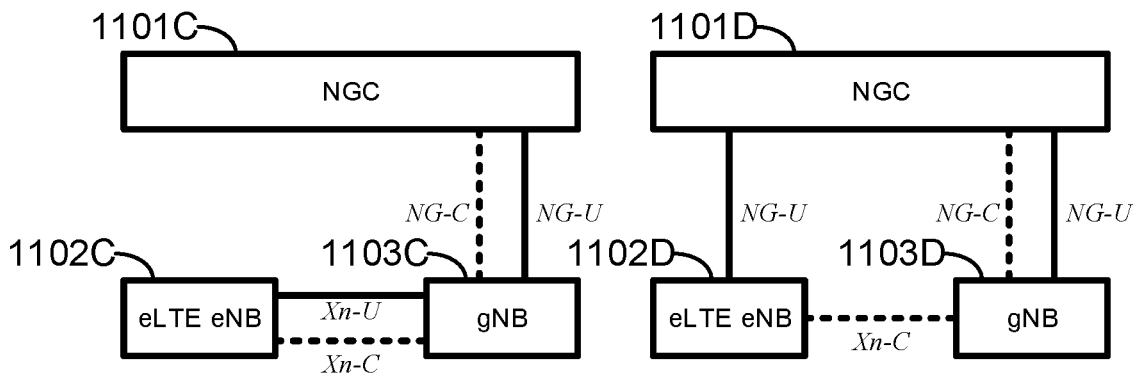

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

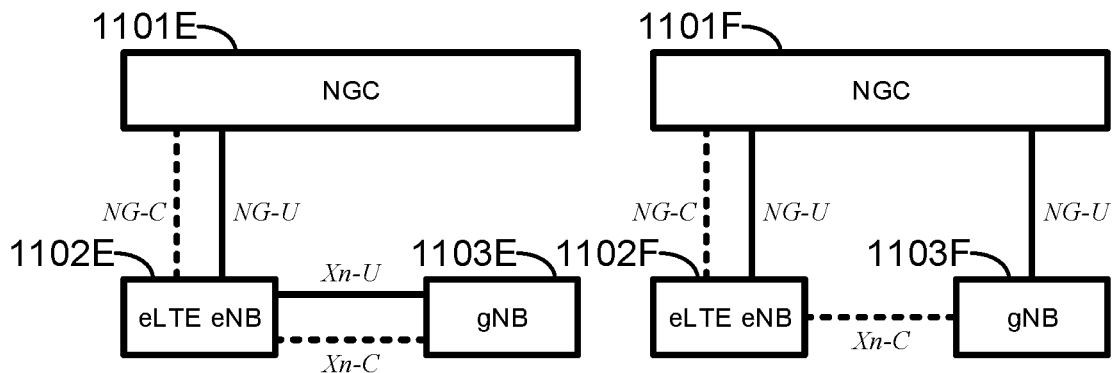

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

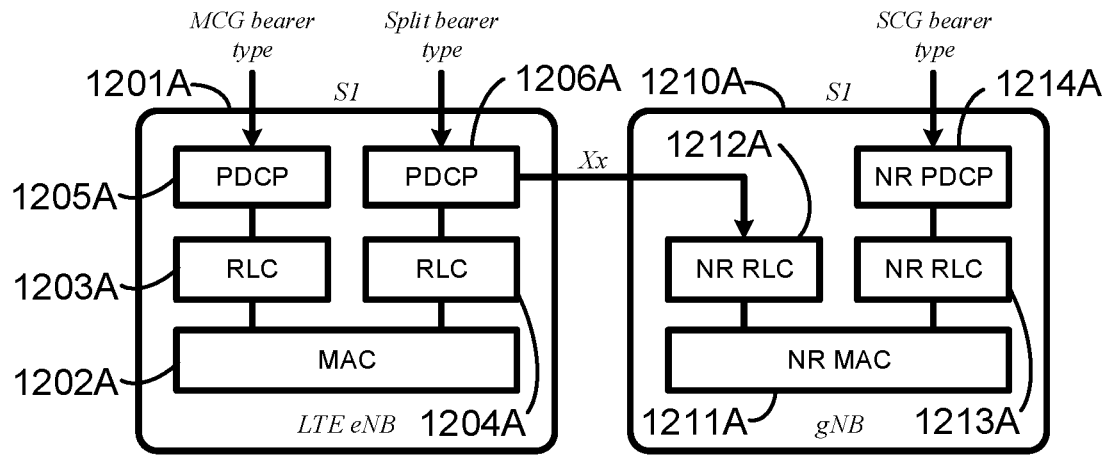
FIG. 12A Radio protocol architecture for split bearer and SCG bearer. LTE eNB connected to EPC with non-standalone gNB.
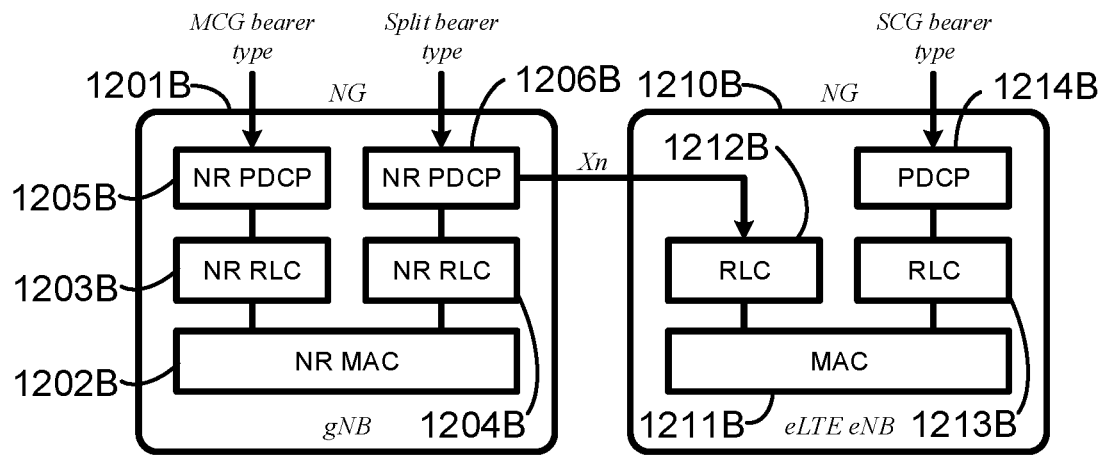
FIG. 12B Radio protocol architecture for split bearer and SCG bearer. gNB connected to NGC with non-standalone eLTE eNB.
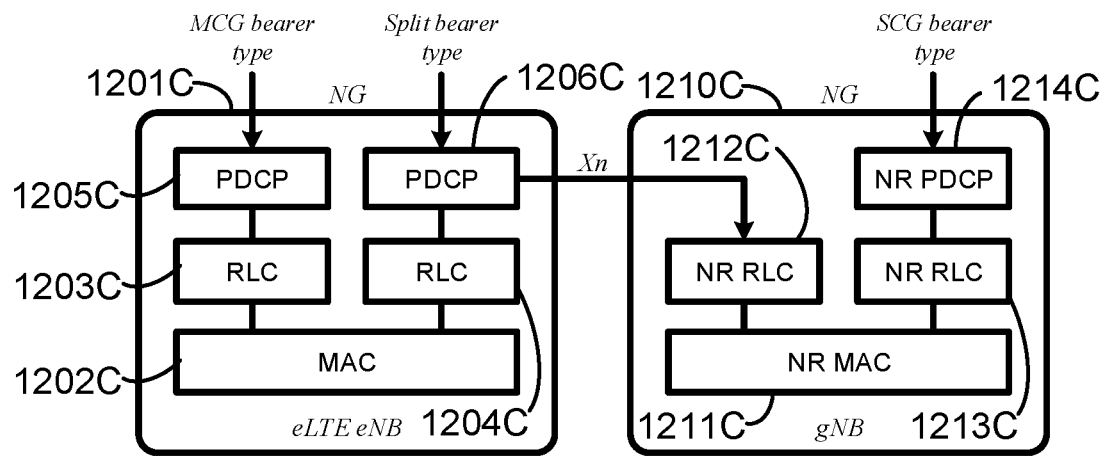
FIG. 12C Radio protocol architecture for split bearer and SCG bearer. eLTE eNB connected to NGC with non-standalone gNB.

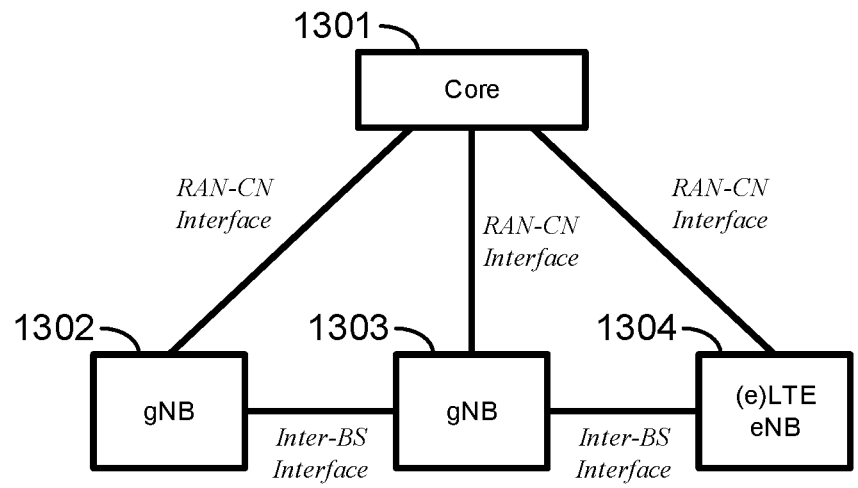
FIG. 13A Non-centralized deployment
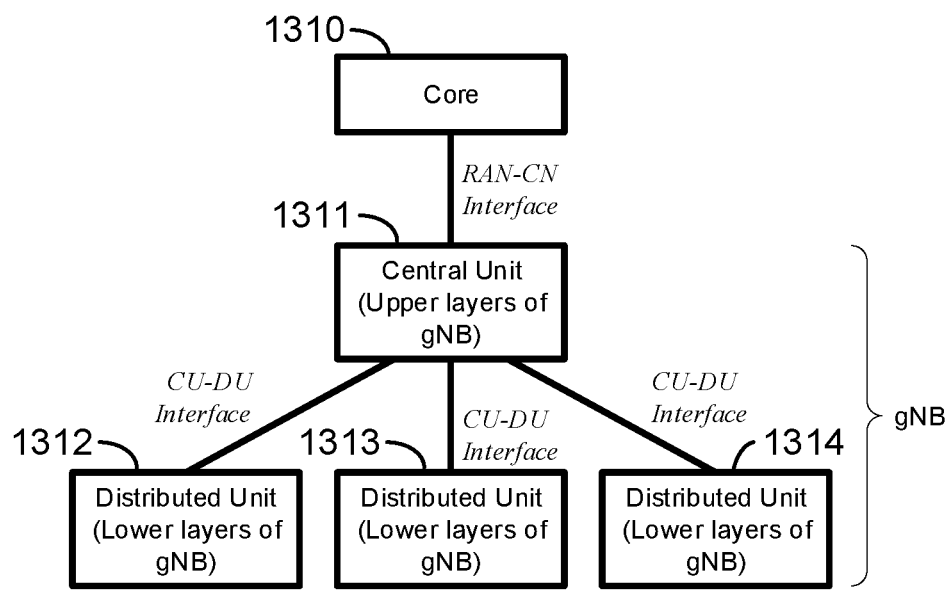
FIG. 13B Centralized deployment

| | | | | | | | | |
|---|---|---|---|---|---|---|---|---|

| R | Timing Advance Command | Oct 1 |
|---|---|---|
| Timing Advance Command | UL Grant | Oct 2 |
| UL Grant | | Oct 3 |
| UL Grant | | Oct 4 |
| Temporary C-RNTI | | Oct 5 |
| Temporary C-RNTI | | Oct 6 |
| UE contention resolution identity | | Oct 7 |
| UE contention resolution identity | | Oct 8 |
| UE contention resolution identity | | Oct 9 |
| UE contention resolution identity | | Oct 10 |
| UE contention resolution identity | | Oct 11 |
| UE contention resolution identity | | Oct 12 |

FIG. 24

RANDOM ACCESS PROCESS IN NEW RADIO

CROSS-REFERENCE TO RELATED APPLICATIONS

This application is a continuation of U.S. patent application Ser. No. 15/933,295, filed on Mar. 22, 2018, which claims the benefit of U.S. Provisional Application No. 62/475,028, titled "Random Access Process in New Radio," U.S. Provisional Application No. 62/475,039, titled "RAR in New Radio," and U.S. Provisional Application No. 62/475,045, titled "2-Stage RACH in New Radio," each of the above of which was filed on Mar. 22, 2017, and each of which is hereby incorporated by reference in its entirety.

BACKGROUND

In wireless communications, such as between a wireless device and a base station, a four-step random access (RA) procedure may be performed. A first step may include a random access preamble (RAP) transmission. A second step may include a random access response (RAR) transmission. A third step may include scheduled transmissions of one or more transport blocks (TBs). And, a fourth step may include contention resolution. While different RA procedures may be performed, difficulties may arise in determining and/or indicating a particular RA procedure among a plurality of RA procedures.

SUMMARY

The following summary presents a simplified summary of certain features. The summary is not an extensive overview and is not intended to identify key or critical elements.

Systems, apparatuses, and methods are described for performing and indicating various RA procedures. RA procedures may comprise different steps. For example, a two-step RA procedure or a four-step RA procedure may be performed. A type of RA procedure may be indicated by one or more indicators. Such indicators may be used, for example, to indicate random access successes, random access failures, random access response size information, various steps for random access procedures, and/or other information about one or more RA procedures. One or more timers may be used to determine, e.g., whether an RA procedure fails (such as a failure of a 2-step RA procedure) and/or whether a different RA procedure should be performed (such as a fallback to a 4-step RA procedure).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between 5G RAN and long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment scenarios.

FIG. 24 shows an example RAR with a fixed size 12 bytes for example RAR formats for two-step and four-step RA procedures.

DETAILED DESCRIPTION

Figure 1:
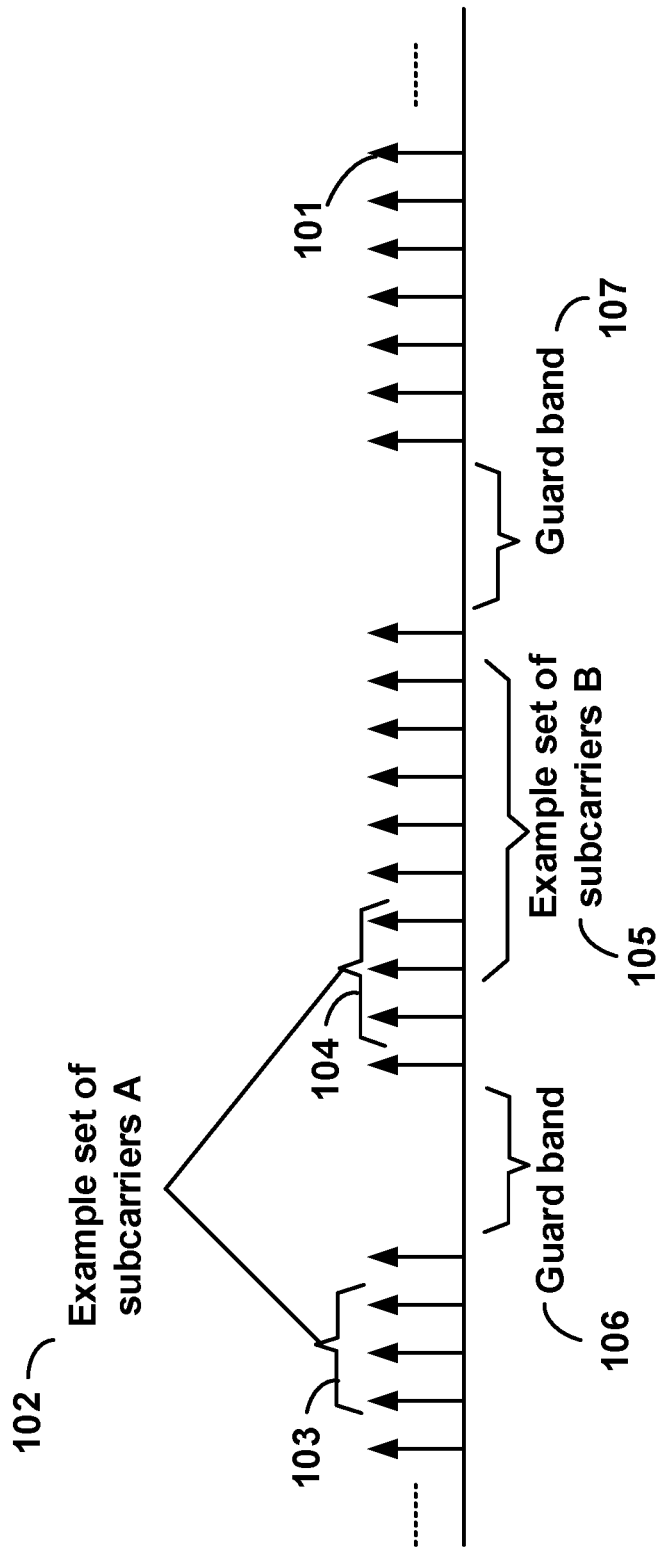
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to signal timing in a multicarrier communication systems.

The following Acronyms are used throughout the present disclosure:
3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAPID/RAP ID random access preamble identifier
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
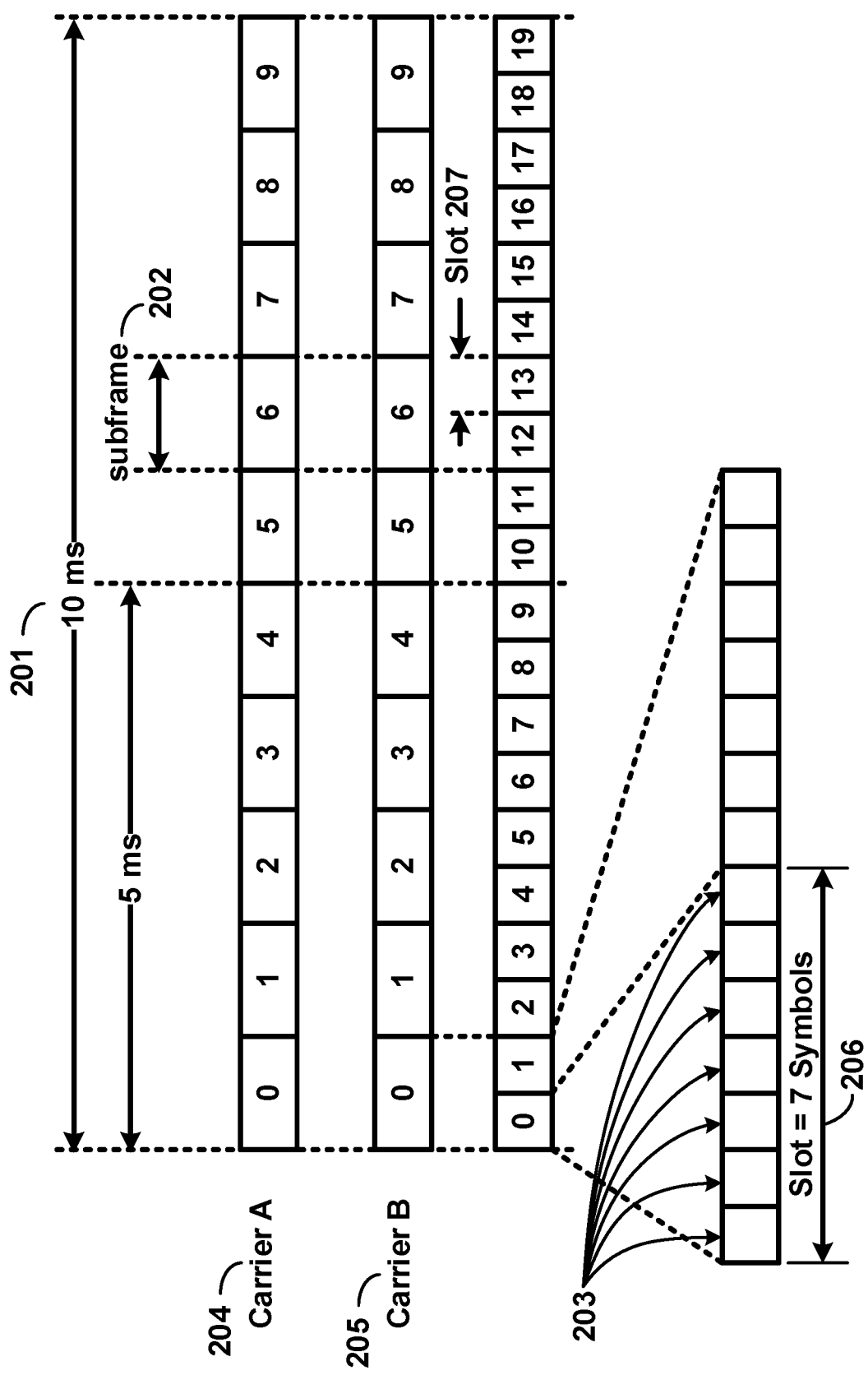
FIG. 2 shows example transmission time and reception time for two carriers in a carrier group.

FIG. 2 shows an example with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part, and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
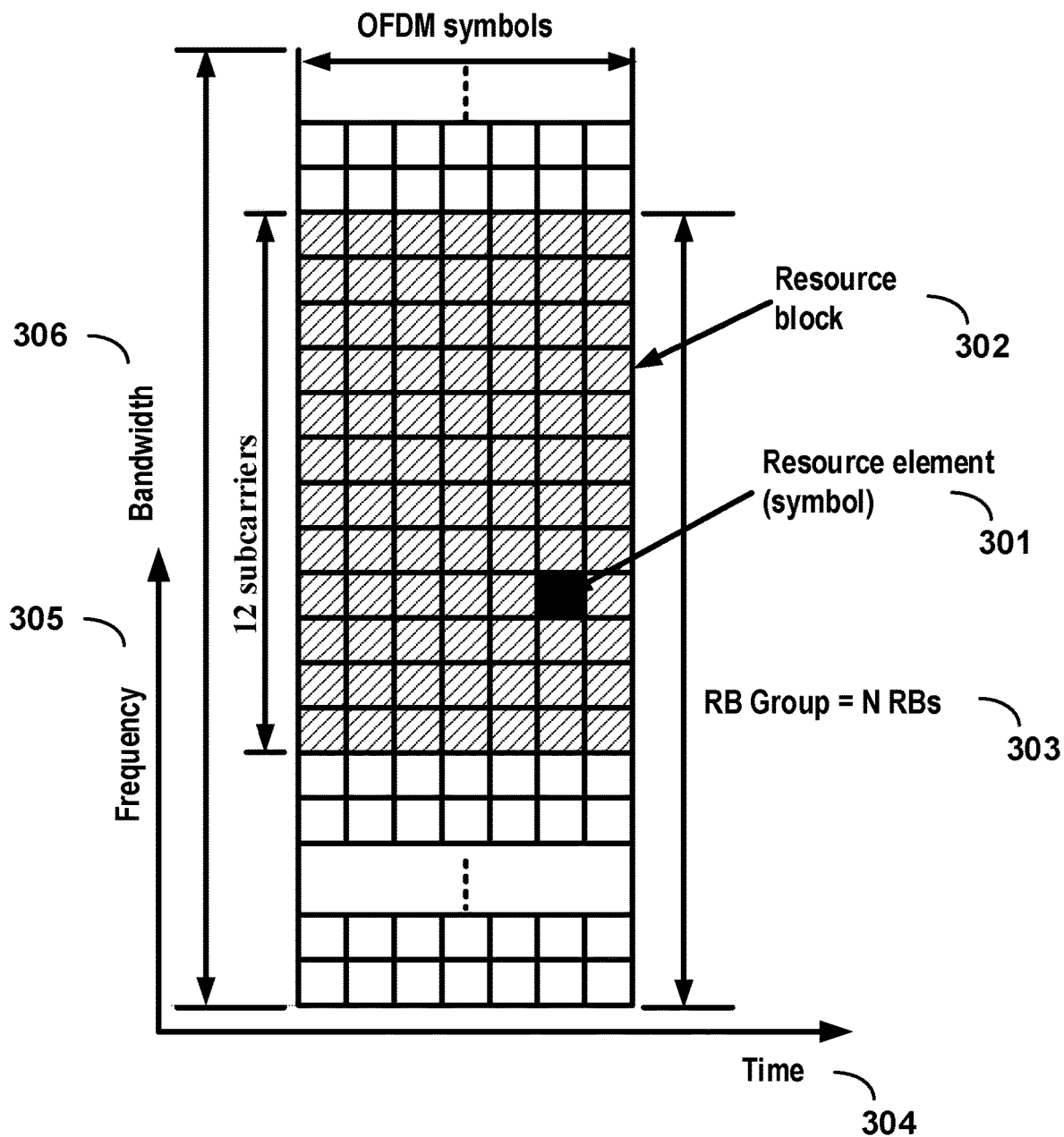
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
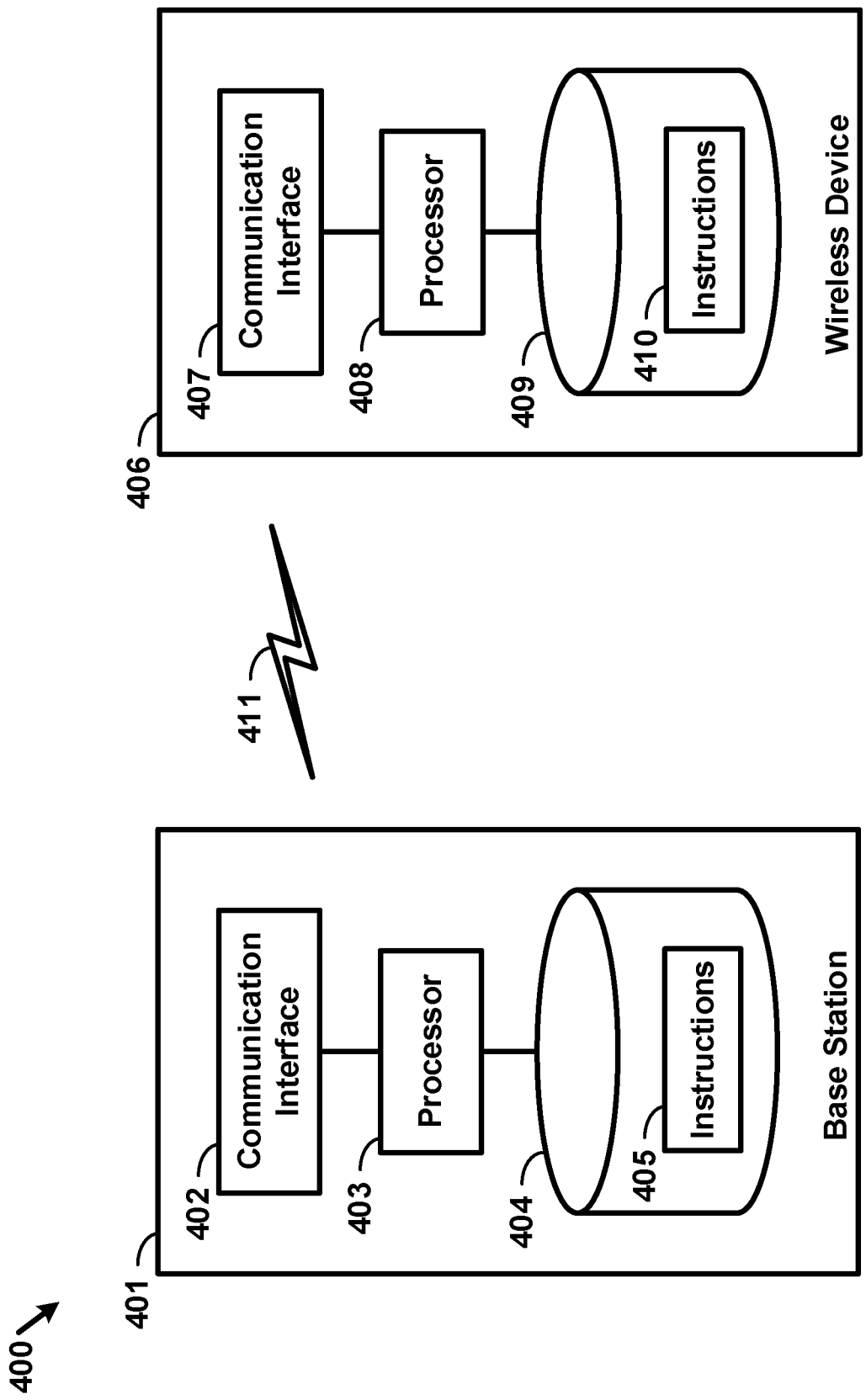
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As an example, any reference to a base station may comprise an eNB, a gNB, a computing device, or any other device, and any reference to a wireless device may comprise a UE, a handset, a mobile device, a computing device or any other device.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise at least one of a gNB, ng-eNB, and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plan Function (UPF) functions. A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

Examples may be configured to operate as needed. The disclosed mechanisms may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various examples may be applied. Therefore, it may be possible to implement examples that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell. While in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

FIG. 5A, FIG. 5B, FIG. 5C, and FIG. 5D show examples for uplink and downlink signal transmission. FIG. 5A shows an example for an uplink physical channel. The baseband signal representing the physical uplink shared channel may be processed according to the following processes, which may be performed by structures described below. While these structures and corresponding functions are shown as examples, it is anticipated that other structures and/or functions may be implemented in various examples. The structures and corresponding functions may comprise, e.g., one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

Example modulation and up-conversion to the carrier frequency of the complex-valued DFTS-OFDM/SC-FDMA baseband signal for each antenna port and/or the complex-valued physical random access channel (PRACH) baseband signal is shown in FIG. 5B. For example, the baseband signal, represented as $s_1(t)$, may be split, by a signal splitter 510, into real and imaginary components, $\text{Re}\{s_1(t)\}$ and $\text{Im}\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

An example structure for downlink transmissions is shown in FIG. 5C. The baseband signal representing a downlink physical channel may be processed by the following processes, which may be performed by structures described below. While these structures and corresponding functions are shown as examples, it is anticipated that other structures and/or functions may be implemented in various examples. The structures and corresponding functions may comprise, e.g., one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

Example modulation and up-conversion to the carrier frequency of the complex-valued OFDM baseband signal for each antenna port is shown in FIG. 5D. For example, the baseband signal, represented as $s_1^{(p)}(t)$, may be split, by a signal splitter 520, into real and imaginary components, $\text{Re}\{s_1^{(p)}(t)\}$ and $\text{Im}\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
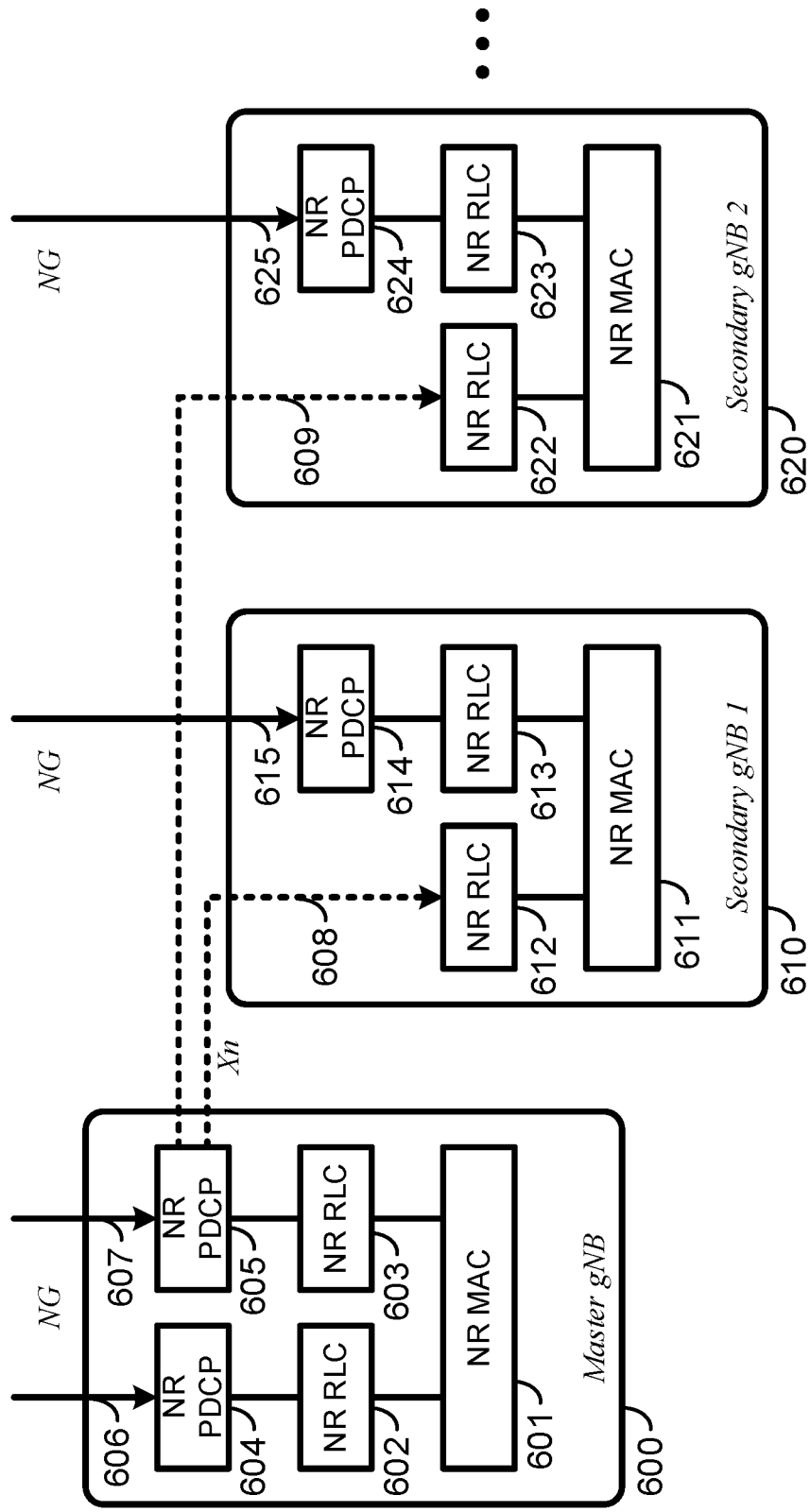
FIG. 6 shows an example protocol structure with multi-connectivity.
Figure 7:
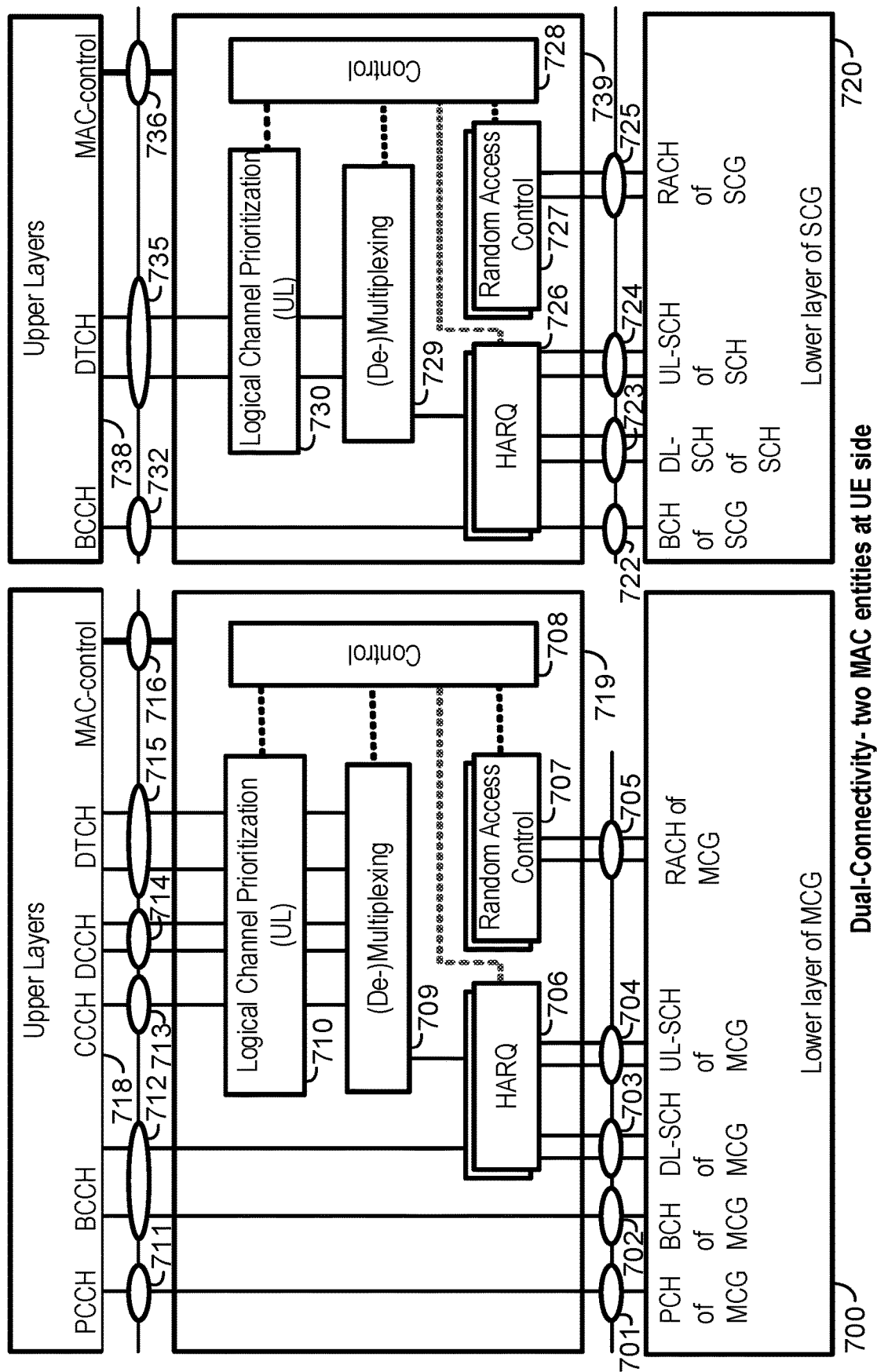
FIG. 7 shows an example protocol structure with carrier aggregation (CA) and dual connectivity (DC).

FIG. 6 and FIG. 7 show examples for protocol structures with CA and multi-connectivity. In FIG. 6, NR may support multi-connectivity operation, whereby a multiple receiver/transmitter (RX/TX) UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB (e.g., 600) or as a secondary gNB (e.g., 610 or 620). In multi-connectivity, a UE may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 620 via interfaces 608 and 609, respectively, which may include Xn interfaces. For example, the master gNB 600 may communicate via the interface 608, at layer NR PDCP 605, with the secondary gNB 610 at layer NR RLC 612. The master gNB 600 may communicate via the interface 609, at layer NR PDCP 605, with the secondary gNB 620 at layer NR RLC 622.

FIG. 7 shows an example structure for the UE side MAC entities, e.g., if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

In the case of multi-connectivity, the UE may be configured with multiple NR MAC entities: e.g., one NR MAC entity for a master gNB, and other NR MAC entities for secondary gNBs. In multi-connectivity, the configured set of serving cells for a UE may comprise two subsets: e.g., the Master Cell Group (MCG) containing the serving cells of the master gNB, and the Secondary Cell Groups (SCGs) containing the serving cells of the secondary gNBs.

For an SCG, one or more of the following may be applied. At least one cell in the SCG may have a configured UL component carrier (CC) and one of the UL CCs, e.g., named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the UE of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

With respect to the interaction between a master gNB and secondary gNBs for multi-connectivity, one or more of the following principles may be applied. The master gNB may maintain the RRM measurement configuration of the UE, and the master gNB may, (e.g., based on received measurement reports, and/or based on traffic conditions and/or bearer types), decide to ask a secondary gNB to provide additional resources (e.g., serving cells) for a UE. If a request from the master gNB is received, a secondary gNB may create a container that may result in the configuration of additional serving cells for the UE (or the secondary gNB decide that it has no resource available to do so). For UE capability coordination, the master gNB may provide some or all of the Active Set (AS) configuration and the UE capabilities to the secondary gNB. The master gNB and the secondary gNB may exchange information about a UE configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In the case of an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). In an example, when adding a new SCG SCell, dedicated NR RRC signaling may be used for sending required system information of the cell for CA, except, e.g., for the SFN acquired from an MIB of the PSCell of an SCG.

FIG. 7 shows an example of dual-connectivity (DC) for two MAC entities at a UE side. A first MAC entity may comprise a lower layer of an MCG 700, an upper layer of an MCG 718, and one or more intermediate layers of an MCG 719. The lower layer of the MCG 700 may comprise, e.g., a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, e.g., one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, e.g., a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, e.g., a BCH 722, a DL-SCH 723, an UL-SCH 724, and a RACH 725. The one or more intermediate layers of the SCG 739 may comprise, e.g., one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, e.g., a BCCH 732, a DCCH 714, a DTCH 735, and a MAC control 736.

Serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (e.g., MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be applied to configurations with multiple sTAGs.

In an example, an eNB may initiate an RA procedure, via a PDCCH order, for an activated SCell. The PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
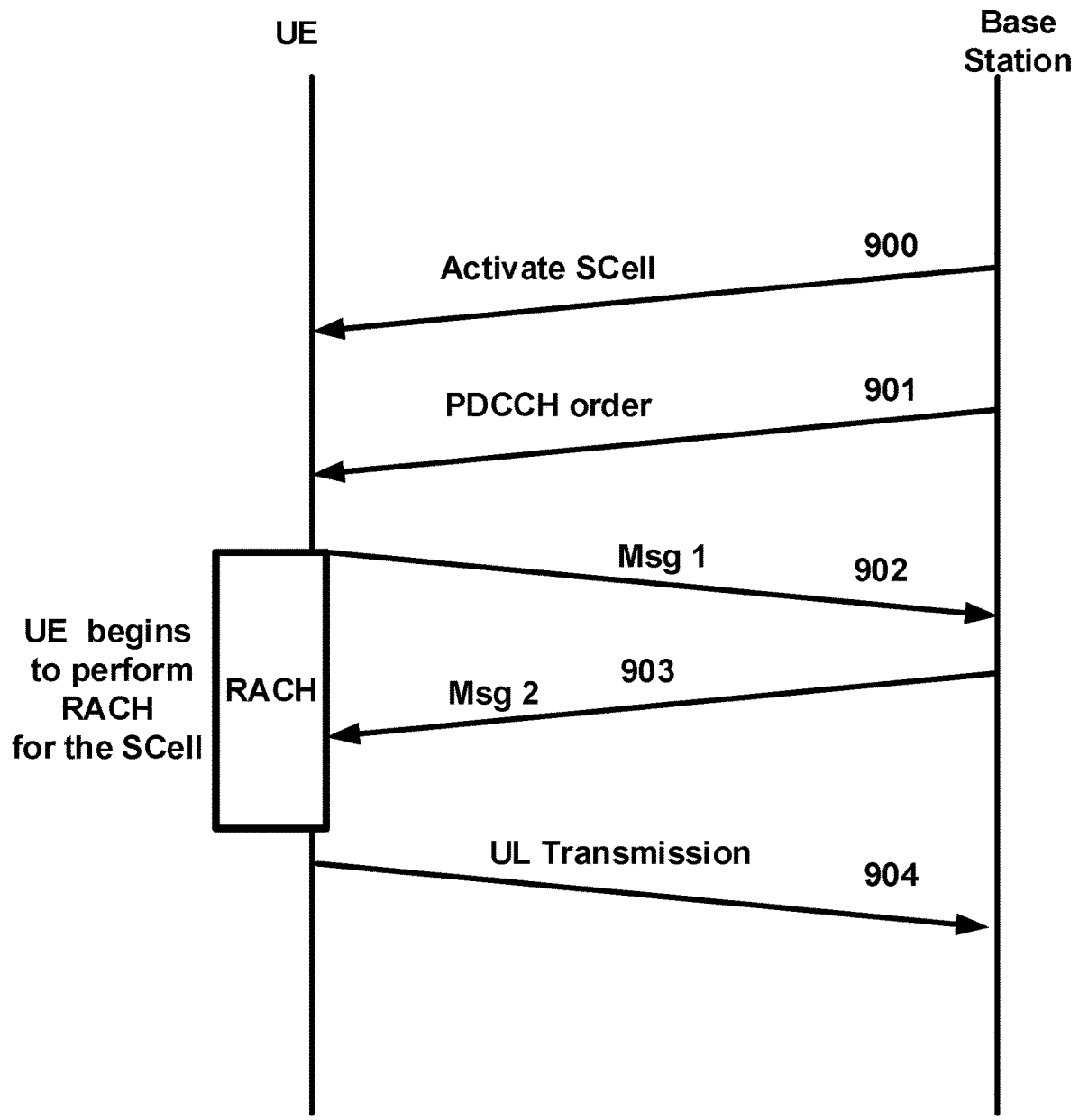
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted after the activation command 900. The wireless device may begin to perform a RACH process for the SCell, which may be initiated after receiving the PDDCH order 901. The RACH process may include the wireless device transmitting to the base station a preamble 902 (e.g., Msg1), such as a random access preamble (RAP). The preamble 902 may be transmitted in response to the PDCCH order 901. The wireless device may transmit the preamble 902 via an SCell belonging to an sTAG. In an example, preamble transmission for SCells may be controlled by a network using PDCCH format 1A. The base station may send a random access response (RAR) 903 (e.g., Msg2 message) to the wireless device. The RAR 903 may be in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Initial timing alignment for communications between the wireless device and the base station may be achieved through a random access procedure, such as described above regarding FIG. 9. The random access procedure may involve a wireless device, such as a UE, transmitting a random access preamble and a base station, such as an eNB, responding with an initial TA command $N_{TA}$ (amount of timing advance) within a random access response window. The start of the random access preamble may be aligned with the start of a corresponding uplink subframe at the UE assuming $N_{TA}=0$. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the UE. The at least one RRC message may be sent to the UE to reconfigure TAG configurations, e.g., by releasing the SCell and then configuring the SCell as a part of the pTAG. If, e.g., an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a UE may transmit PUCCH information on one cell (e.g., a PCell or a PSCell) to a given eNB. As the number of CA capable UEs increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, e.g., timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). For example, in FIG. 10A, a base station, such as a gNB 1020, may be interconnected to an NGC 1010 control plane employing an NG-C interface. The base station, e.g., the gNB 1020, may also be interconnected to an NGC 1010 user plane (e.g., UPGW) employing an NG-U interface. As another example, in FIG. 10B, a base station, such as an eLTE eNB 1040, may be interconnected to an NGC 1030 control plane employing an NG-C interface. The base station, e.g., the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) UE in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain UE may assume different roles. For example, a base station may act as a master base station or a base station may act as a secondary base station. In tight interworking, a UE may be connected to both a master base station and a secondary base station. Mechanisms implemented in tight interworking may be extended to cover more than two base stations.

In FIG. 11A and FIG. 11B, a master base station may be an LTE eNB 1102A or an LTE eNB 1102B, which may be connected to EPC nodes 1101A or 1101B, respectively. This connection to EPC nodes may be, e.g., to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

In FIG. 11C and FIG. 11D, a master base station may be a gNB 1103C or a gNB 1103D, which may be connected to NGC nodes 1101C or 1101D, respectively. This connection to NGC nodes may be, e.g., to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

In FIG. 11E and FIG. 11F, a master base station may be an eLTE eNB 1102E or an eLTE eNB 1102F, which may be connected to NGC nodes 1101E or 1101F, respectively. This connection to NGC nodes may be, e.g., to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

In FIG. 12A, an LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

In FIG. 12B, a gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

In FIG. 12C, an eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, e.g., an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

In the case of tight interworking, the UE may be configured with two MAC entities: e.g., one MAC entity for a master base station, and one MAC entity for a secondary base station. In tight interworking, the configured set of serving cells for a UE may comprise of two subsets: e.g., the Master Cell Group (MCG) containing the serving cells of the master base station, and the Secondary Cell Group (SCG) containing the serving cells of the secondary base station.

For an SCG, one or more of the following may be applied. At least one cell in the SCG may have a configured UL CC and one of them, e.g., a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the UE of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, e.g., with security key change and a RACH procedure. A direct bearer type change, between a split bearer and an SCG bearer, may not be supported. Simultaneous configuration of an SCG and a split bearer may not be supported.

With respect to the interaction between a master base station and a secondary base station, one or more of the following principles may be applied. The master base station may maintain the RRM measurement configuration of the UE. The master base station may determine to ask a secondary base station to provide additional resources (e.g., serving cells) for a UE. This determination may be based on, e.g., received measurement reports, traffic conditions, and/or bearer types. If a request from the master base station is received, a secondary base station may create a container that may result in the configuration of additional serving cells for the UE, or the secondary base station may determine that it has no resource available to do so. The master base station may provide at least part of the AS configuration and the UE capabilities to the secondary base station, e.g., for UE capability coordination. The master base station and the secondary base station may exchange information about a UE configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, e.g., for the SFN acquired from an MIB of the PSCell of an SCG.

FIG. 13A and FIG. 13B show examples for gNB deployment scenarios. A core 1301 and a core 1310, in FIG. 13A and FIG. 13B, respectively, may interface with other nodes via RAN-CN interfaces. In a non-centralized deployment scenario in FIG. 13A, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In the centralized deployment scenario in FIG. 13B, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1313, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation after the Fs interface setup procedure, or the functional split option may change only in the Fs setup procedure (e.g., the functional split option may be static during operation after Fs setup procedure).

Figure 14:
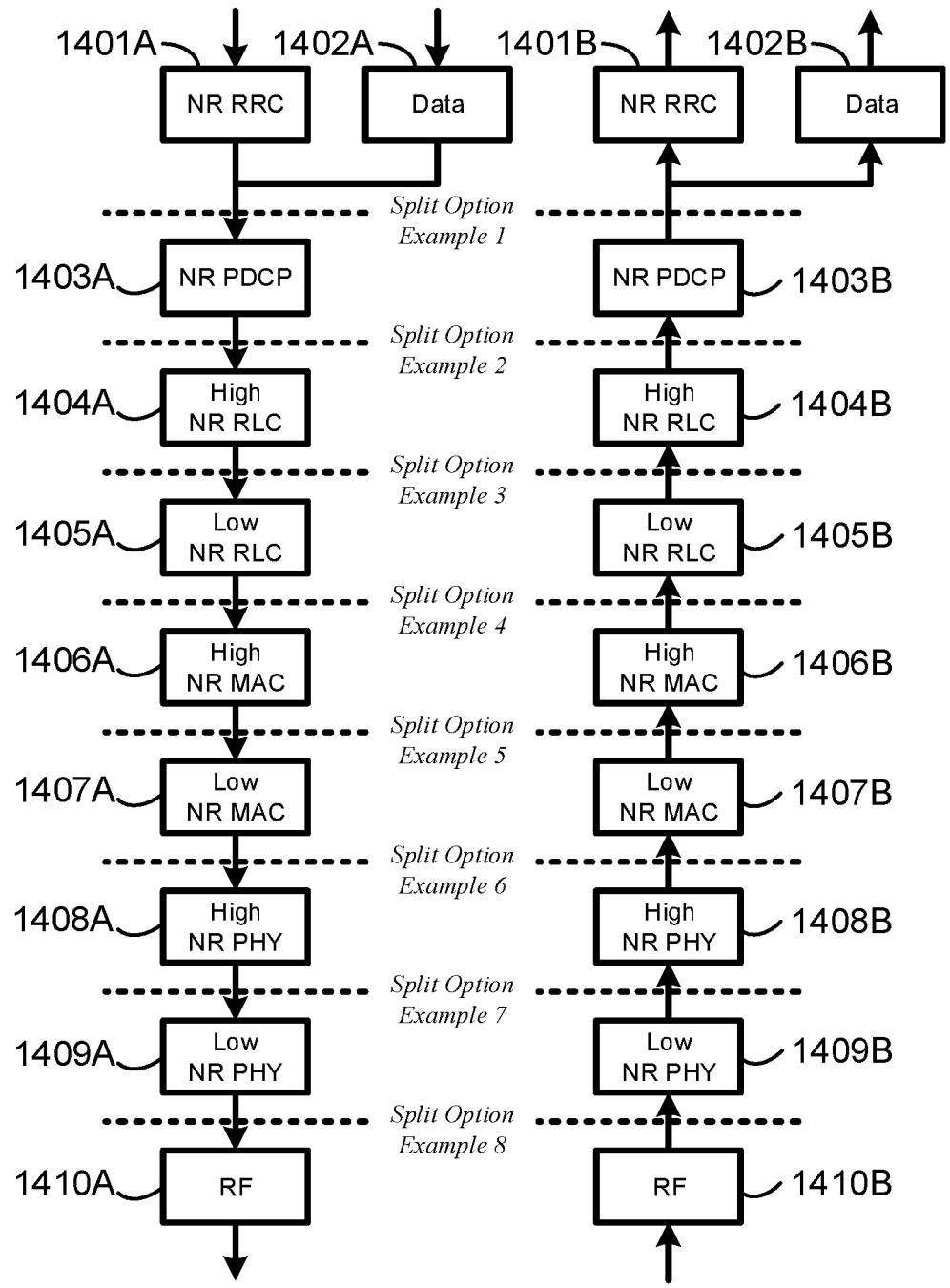
FIG. 14 functional split option examples of a centralized gNB deployment scenario.

FIG. 14 shows examples for different functional split options of a centralized gNB deployment scenario. Element numerals that are followed by "A" or "B" designations in FIG. 14 may represent the same elements in different traffic flows, e.g., either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per UE, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per UE split, a gNB (e.g., a CU and a DU) may provide different split options for different UEs. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, e.g., by one or more slice ID(s) or NSSAI(s) provided by a UE or provided by an NGC (e.g., an NG CP). The slice ID(s) or NSSAI(s) may identify one or more of pre-configured network slices in a PLMN. For an initial attach, a UE may provide a slice ID and/or an NSSAI, and a RAN node (e.g., a gNB) may use the slice ID or the NSSAI for routing an initial NAS signaling to an NGC control plane function (e.g., an NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. When the RAN resource isolation is implemented, shortage of shared resources in one slice does not cause a break in a service level agreement for another slice.

The amount of data traffic carried over networks is expected to increase for many years to come. The number of users/devices is increasing and each user/device accesses an increasing number and variety of services, e.g., video delivery, large files, and images. This requires not only high capacity in the network, but also provisioning very high data rates to meet customers' expectations on interactivity and responsiveness. More spectrum may be required for network operators to meet the increasing demand Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for network operators, e.g., to help address the traffic explosion in some scenarios, such as hotspot areas. Licensed Assisted Access (LAA) offers an alternative for operators to make use of unlicensed spectrum while managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, e.g., via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time synchronization of UEs, and frequency synchronization of UEs.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH when not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N may be used in the LBT procedure to determine the duration of time that the channel is sensed to be idle before the transmitting entity transmits on the channel.

LAA may employ uplink LBT at the UE. The UL LBT scheme may be different from the DL LBT scheme, e.g., by using different LBT mechanisms or parameters. These differences in schemes may be due to the LAA UL being based on scheduled access, which may affect a UE's channel contention opportunities. Other considerations motivating a different UL LBT scheme may include, but are not limited to, multiplexing of multiple UEs in a single subframe.

A DL transmission burst may be a continuous transmission from a DL transmitting node, e.g., with no transmission immediately before or after from the same node on the same CC. An UL transmission burst from a UE perspective may be a continuous transmission from a UE, e.g., with no transmission immediately before or after from the same UE on the same CC. A UL transmission burst may be defined from a UE perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

Random access (RA) procedures may be used to establish communications between a wireless device and a base station in a cell. A four-step RA procedure may include, e.g., a first step comprising a wireless device sending, to a base station, a request to establish communications with the base station. A second step may include, e.g., the base station sending, to the wireless device, a response indicating that the wireless device may send additional information for establishing the requested communications. A third step may include, e.g., the wireless device sending, to the base station, the additional information for establishing the requested communications. A fourth step may include, e.g., the base station sending, to the wireless device, information confirming the establishing of the requested communications. A four-step RA procedure may have an associated latency, e.g., which may be a minimum of fourteen transmission time intervals (TTI). As an example, 3GPP TR 38.804 v14.0.0 indicates a minimum latency of fourteen TTIs comprising, e.g., 3 TTIs after a message from step 1 of a four-step RA procedure, 1 TTI for a message from step 2 of a four-step RA procedure, 5 TTIs after the message from step 2, 1 TTI for a message from step 3 of a four-step RA procedure, 3 TTIs after the message from step 3, and 1 TTI for a message from step 4 of a four-step procedure (e.g., 3+1+5+1+3+1=14). Reducing the number of steps in an RA procedure may reduce latency. By using parallel transmissions, a four-step RA procedure may be reduced to a two-step RA procedure. A two-step RA procedure may have an associated latency, e.g., which may be a minimum of four TTIs and which may be less than an associated latency for a four-step RA procedure. As an example, 3GPP TR 38.804 v14.0.0 indicates a minimum latency of four TTIs comprising, e.g., 3

TTIs after a message from step 1 of a two-step RA procedure and 1 TTI for a message from step 2 of a two-step RA procedure.

Figure 15:
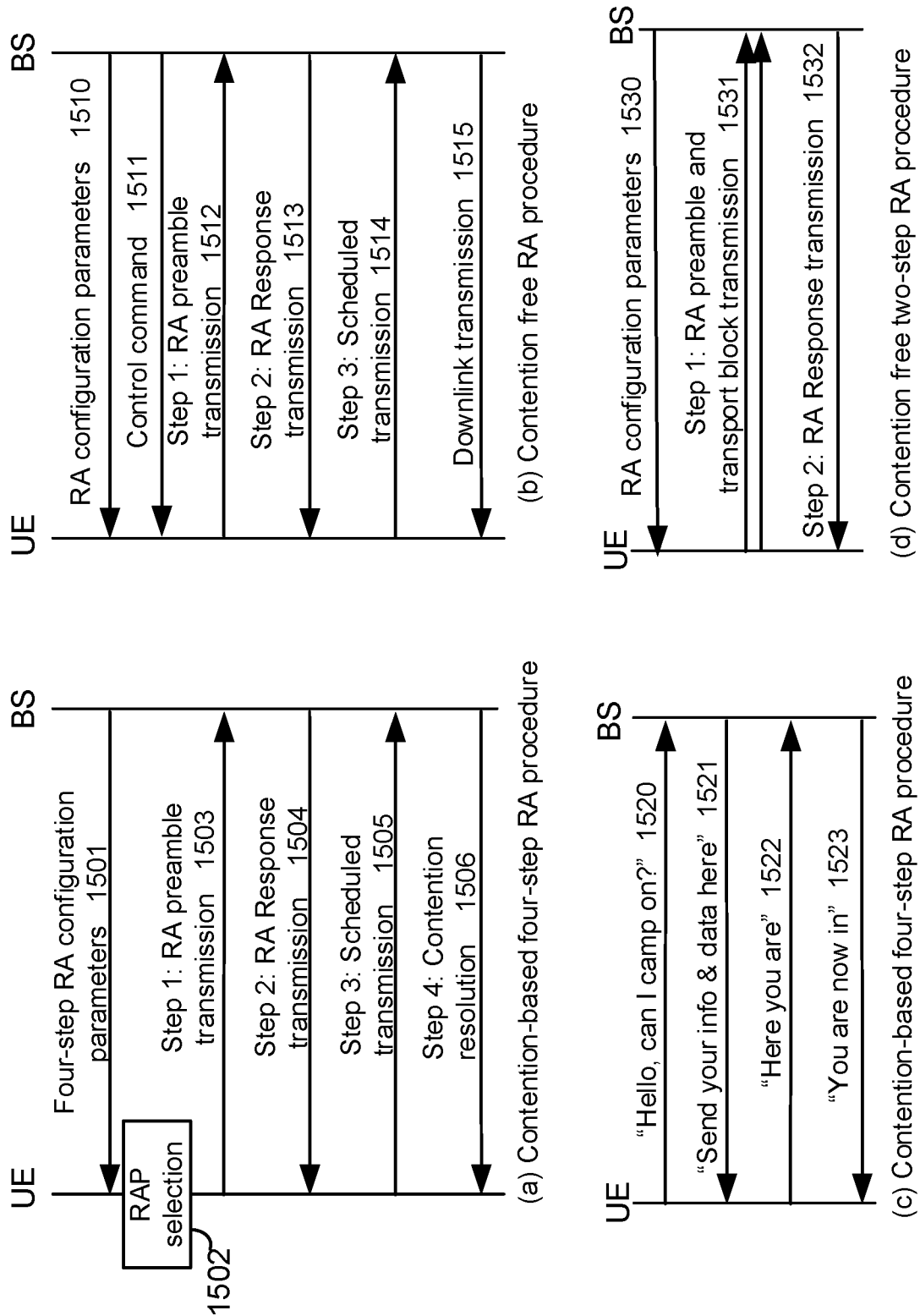
FIG. 15 shows examples of contention-based and contention free random access procedures.

FIG. 15 shows examples of (a) a contention-based four-step RA procedure, (b) a contention free three-step RA procedure, (c) descriptions of a contention-based four-step RA procedure, and (d) a contention free two-step RA procedure. A four-step RA procedure may comprise a RAP transmission in a first step, an RAR transmission in a second step, a scheduled transmission of one or more transport blocks (TBs) in a third step, and contention resolution in a fourth step.

In step 1501, a base station may transmit four-step RA configuration parameters to a wireless device (e.g., a UE). The base station may generate and transmit RA configuration parameters periodically, e.g., based on a timer. The base station may broadcast RA configuration parameters in one or more messages. The wireless device may perform a RAP selection process at step 1502, e.g., after receiving the four-step RA configuration parameters. In a contention-based RA procedure, such as shown in part (a) of FIG. 15, the RA configuration parameters may comprise a root sequence that may be used by the wireless device to generate a RAP. The RAP may be randomly selected by the wireless device, among various RAP candidates generated by the root sequence, during the RAP selection process. The wireless device may perform the RAP selection using, e.g., the procedure described below regarding FIG. 16, and/or one or more RAP selections procedures described herein.

During a first step of the RA procedure, at step 1503, a wireless device may transmit a RAP, e.g., using a configured RA preamble format with a single particular transmission (Tx) beam. A random access channel (RACH) resource may be defined as a time-frequency resource to transmit a RAP. Broadcast system information may indicate whether wireless device should transmit one preamble, or multiple or repeated preambles, within a subset of RACH resources.

In the second step of the four-step RA procedure, at step 1504, a base station may transmit a random access response (RAR) to the wireless device. The base station may transmit the RAR in response to an RAP that the wireless device may transmit. A wireless device may monitor the physical-layer downlink control channel for RARs identified by the RA-RNTI in an RA response window. The RA response window may start at a subframe that contains the end of an RAP transmission, plus three subframes, and the RA response window may have the length ra-ResponseWindowSize. A wireless device may determine the RA-RNTI associated with the PRACH in which the wireless device transmits an RAP by the following operation:

RA-RNTI=$1+t\_id+10*f\_id$ where t_id is the index of the first subframe of the specified PRACH ($0 \leq t\_id < 10$), and f_id is the index of the specified PRACH within that subframe, in ascending order of frequency domain ($0 \leq f\_id < 6$). Different types of UEs, e.g., narrow band-Internet of Things (NB-IoT), bandwidth limited (BL)-UE, and/or UE-Extended Coverage (UE-EC), may use different formulas or operations for determining RA-RNTI. A base station may configure an association between a DL signal or channel, a subset of RACH resources, and/or a subset of RAP indexes. Such an association may be for determining the DL transmission in the second step of the RA procedure, at step 1504 of FIG. 15. Based on the DL measurement and the corresponding association, a wireless device may select the subset of RACH resources and/or the subset of RAP indexes.

In the third step of the four-step RA procedure (e.g., step 1505 in FIG. 15), a wireless device may adjust an UL time alignment by using the TA value corresponding to the TA command in the received RAR in the second step (e.g., step 1504 in FIG. 15). A wireless device may transmit one or more TBs to a base station using the UL resources assigned in the UL grant in the received RAR. One or more TBs that a wireless device may transmit in the third step (e.g., step 1505 in FIG. 15) may comprise RRC signaling, such as an RRC connection request, an RRC connection Re-establishment request, or an RRC connection resume request. The one or more TBs may also comprise a wireless device identity, e.g., which may be used as part of the contention-resolution mechanism in the fourth step (e.g., step 1506 in FIG. 15).

The fourth step in the four-step RA procedure (e.g., step 1506 in FIG. 15) may comprise a DL message for contention resolution. Based on the second step (e.g., step 1504 in FIG. 15), one or more wireless devices may perform simultaneous RA attempts using the same RAP in the first step (e.g., step 1503 in FIG. 15), and/or receive the same RAR with the same TC-RNTI in the second step (e.g., step 1504 in FIG. 15). The contention resolution in the fourth step may be to ensure that a wireless device does not incorrectly use another wireless device identity. The contention resolution mechanism may be based on either a C-RNTI on a PDCCH, or a UE Contention Resolution Identity on a DL-SCH, e.g., depending on whether or not a wireless device has a C-RNTI. If a wireless device has a C-RNTI, e.g., if the wireless device detects the C-RNTI on the PDCCH, the wireless device may determine the success of RA procedure. If the wireless device does not have a C-RNTI (e.g., if a C-RNTI is not pre-assigned), the wireless device may monitor a DL-SCH associated with a TC-RNTI, e.g., that a base station may transmit in an RAR of the second step. In the fourth step (e.g., step 1506 in FIG. 15), the wireless device may compare the identity in the data transmitted by the base station on the DL-SCH with the identity that the wireless device transmits in the third step (e.g., step 1505 in FIG. 15). If the wireless determines that two identities are the same or satisfy a threshold similarity, the wireless device may determine that the RA procedure is successful. If the wireless device determines that the RA is successful, the wireless device may promote the TC-RNTI to the C-RNTI. A TC-RNTI may be an identifier initially assigned to a wireless device when the wireless device first attempts to access a base station. A TC-RNTI may be used for a wireless device in an idle state. After access is allowed by the base station, a C-RNTI may be used for identifying the wireless device. A C-RNTI may be used for a wireless device in an inactive or an active state.

The fourth step in the four-step RA procedure (e.g., step 1506 in FIG. 15) may allow HARQ retransmission. A wireless device may start a mac-ContentionResolutionTimer when the wireless device transmits one or more TBs to a base station in the third step (e.g., step 1505 in FIG. 15). The wireless may restart the mac-ContentionResolutionTimer at each HARQ retransmission. When a wireless device receives data on the DL resources identified by C-RNTI or TC-RNTI in the fourth step (e.g., step 1506 in FIG. 15), the wireless device may stop the mac-ContentionResolution-Timer. If the wireless device does not detect the contention resolution identity that matches the identity transmitted by the wireless device in the third step (e.g., step 1505 in FIG. 15), the wireless device may determine that the RA procedure has failed and the wireless device may discard the TC-RNTI. Additionally or alternatively, if the mac-ContentionResolutionTimer expires, the wireless device may determine that the RA procedure has failed and the wireless device may discard the TC-RNTI. If the wireless device determines that the contention resolution has failed, the wireless device may flush the HARQ buffer used for transmission of the MAC PDU and the wireless device may restart the four-step RA procedure from the first step (e.g., step 1503 in FIG. 15). The wireless device may delay subsequent RAP transmission, e.g., by a backoff time. The backoff time may be randomly selected, e.g., according to a uniform distribution between 0 and the backoff parameter value corresponding to the BI in the MAC PDU for RAR.

In a four-step RA procedure, the usage of the first two steps may be, e.g., to obtain a UL time alignment for a wireless device and/or to obtain an uplink grant. The UL time alignment may not be necessary in one or more scenarios. For example, in small cells, or for stationary wireless devices, the process for acquiring the UL time alignment may not be necessary if either a TA equal to zero may be sufficient (e.g., for small cells), or if a stored TA value from the last RA may be able to serve for the current RA (e.g., a stationary wireless device). If a wireless device is in an RRC connected state, e.g., with a valid TA value and no resource configured for UL transmission, the UL time alignment may not be necessary when the wireless device attempts to obtain an UL grant.

Part (b) of FIG. 15 shows a three-step contention free RA procedure. A base station may transmit RA configuration parameters to a wireless device, e.g., a UE, in step 1510. In a contention-free RA procedure, such as shown in part (b) of FIG. 15, the configuration parameters may indicate to the wireless device what preamble to send to the base station and when to send the preamble. The base station may also transmit a control command to the wireless device at step 1511. The control command may comprise, e.g., downlink control information. In a first step of the RA procedure, the wireless device may transmit a random access preamble transmission to the base station at step 1512. The RAP transmission may be based on the RA configuration parameters and the control command. In a second step of the RA procedure, the base station may transmit to the wireless device a random access response at step 1513. In a third step of the RA procedure, the wireless device may transmit scheduled transmissions at step 1514. The scheduled transmissions may be based on the RAR. The contention free RA procedure may end with the third step. Thereafter, the base station may transmit a downlink transmission to the wireless device at step 1515. This downlink transmission may comprise, e.g., an acknowledgement (ACK) indication, a non-acknowledgement (NACK) indication, data, or other information. Contention-free RA procedures such as described above may have reduced latency compared with contention-based RA procedures. Contention-based RA procedures may involve collisions, such as when more than one wireless device is attempting to communicate with the same base station at the same time.

Part (c) of FIG. 15 shows an example of common language descriptions that may facilitate an understanding of some of the messaging involved in the contention-based four-step RA procedure described above regarding part (a) of FIG. 15. In step 1 of the RA procedure, a wireless device may send a communication to a base station similar to a request such as, "Hello, can I camp on?" (step 1520). If the base station can accommodate the wireless device request, the base station may respond to the wireless device with a message similar to an instruction such as "Send your info & data here" (step 1521). Based on the base station's response, the wireless device may send a message similar to a response such as "Here you are" (step 1522). Based on the information received by the base station, the base station may respond with a message similar to a grant such as "You are now in" (step 1523).

Part (d) of FIG. 15 shows an example of a two-step contention free random access procedure of a wireless device. At step 1530, the wireless device may receive RA configuration parameters from a base station (e.g., from a handover source base station, and/or from a handover target base station via the handover source base station). The RA configuration parameters may comprise one or more parameters indicating a type of a random access process. The type of the random access process may indicate a two-step random access process. At step 1531, the wireless device may transmit an RA preamble and one or more transport blocks as a first step of the procedure, e.g., overlapping in time with each other. In response to the RA preamble and/or the one or more transport blocks, at step 1532, the wireless device may receive an RA response from a base station (e.g., a handover target base station).

Figure 16:
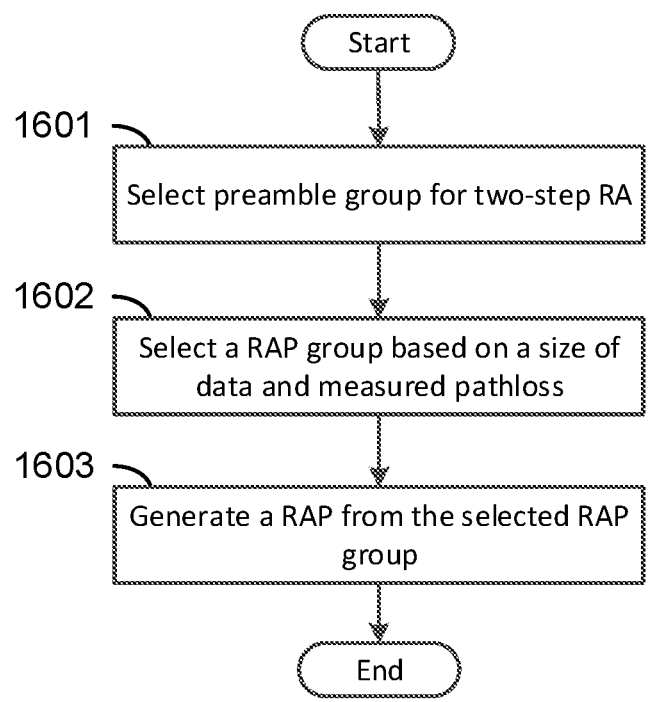
FIG. 16 shows an example of a random access preamble selection procedure.

FIG. 16 shows an example of a RAP selection procedure for preamble groups that may be used as the RAP selection process at step 1502 of FIG. 15. A base station may broadcast the RAP grouping information, along with one or more thresholds, in system information. At step 1601, a wireless device may select a preamble group comprising preambles. Two or more RAP groups may be indicated by broadcast system information, and one or more of the RAP groups may be optional. At step 1602, the wireless device may select a RAP group among a plurality of RAP groups, based on, e.g., a size of data that the wireless may have to transmit, a measured pathloss, and/or other information. At step 1603, the wireless device may generate a RAP from the selected RAP group. If a base station configures two groups, e.g., in a four-step RA procedure, a wireless device may use the pathloss and a size of the message transmitted by the wireless device in the third step of the RA procedure, to determine from which group the wireless device selects an RAP. A base station may use a group type to which a RAP belongs as an indication of the message size in the third step and/or the radio conditions at a wireless device. The process may end at step 1603.

Figure 17:
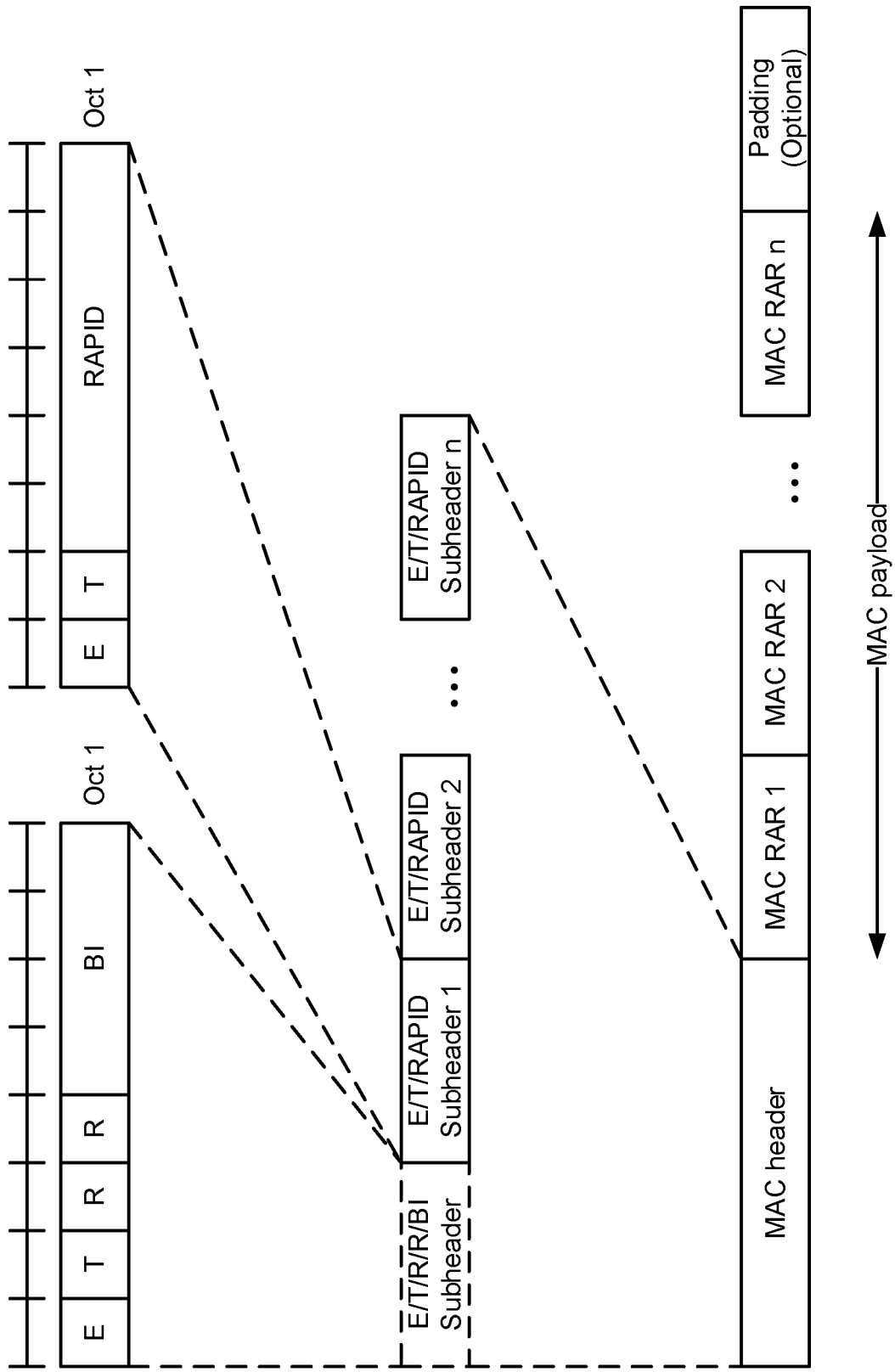
FIG. 17 shows an example media access control (MAC) packet data unit (PDU) format of an example of MAC PDU comprising a MAC header and MAC random access responses (RARs) for a four-step RA procedure.

FIG. 17 shows an example of a MAC PDU comprising a MAC header and MAC RARs. A four-step RA procedure may use the arrangement shown in FIG. 17. A two-step RA procedure may also use the arrangement shown in FIG. 17. Additionally or alternatively, a two-step RA procedure may use a variation of the arrangement shown in FIG. 17, e.g., with additional or fewer fields, and/or with longer or shorter fields. If an RAR comprises a RAPID corresponding to a RAP that a wireless device transmits, the wireless device may process the data in the RAR. The data in the RAR may comprise, e.g., one or more of a timing advance (TA) command, a UL grant, and/or a Temporary C-RNTI (TC-RNTI). The MAC header may comprise subheaders, such as an E/T/R/R/BI subheader (described further below) and up to n number of E/T/RAPID subheaders (described further below). The E/T/R/R/BI subheader may comprise an octet of bits comprising 1 bit each of E, T, R, and R, and four bits of BI. Each of n E/T/RAPID subheaders may comprise an octet comprising 1 bit each of E and T, and 6 bits of an RAPID.

Figure 18:
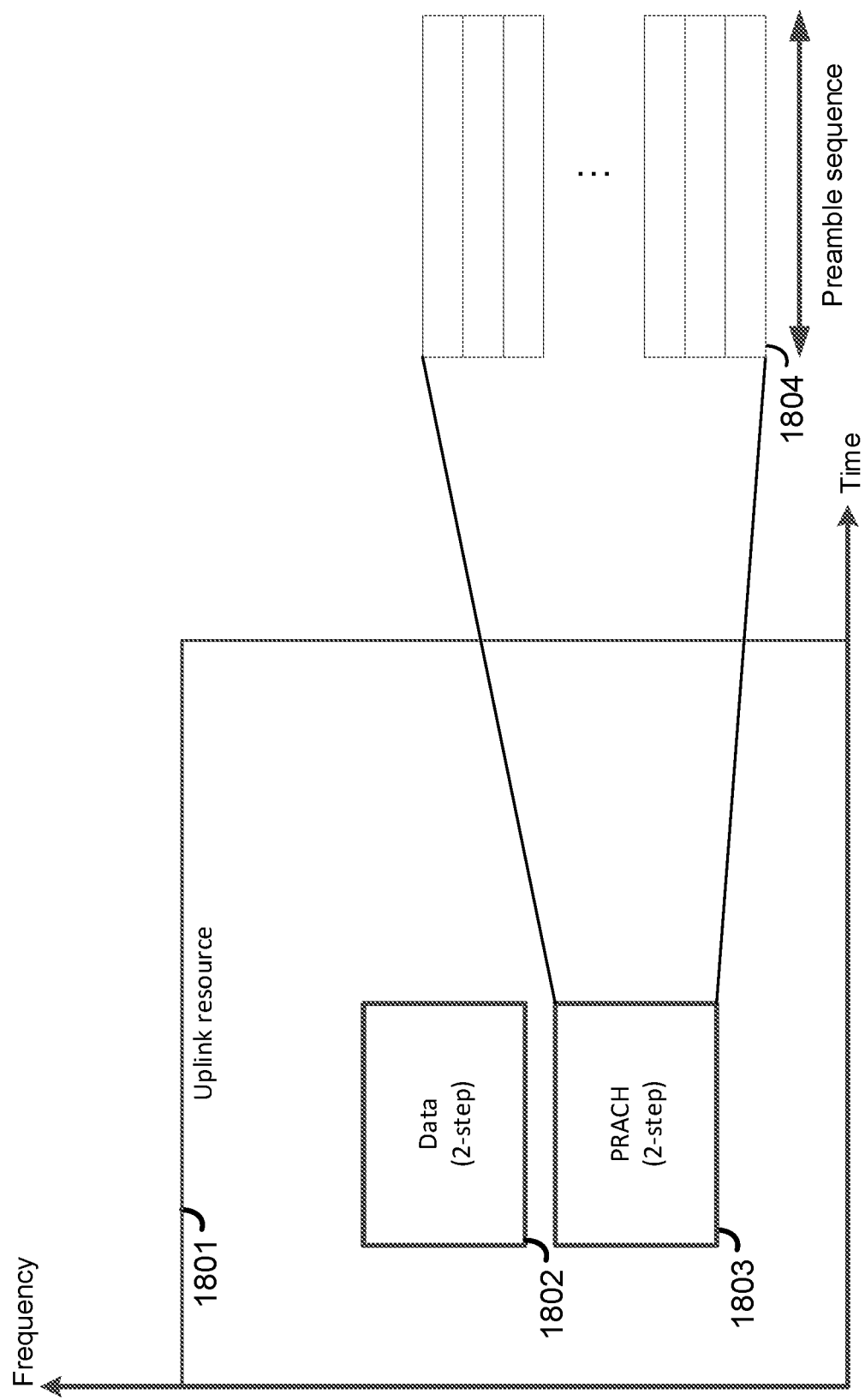
FIG. 18 shows an example of shows an example of an uplink resource for a transmission in a first step of a two-step RA procedure.

FIG. 18 shows an example of an uplink resource 1801 that may be used, e.g., for a transmission of a random access preamble and data in a first step of a two-step RA procedure. A transmission may comprise a random access preamble 1803, e.g., via a physical random access channel (PRACH), and data 1802. The data 1802 may comprise one or more transport blocks, an identifier of a wireless device, and/or other information. The data may be included in, e.g., an RRC connection request. The RRC connection request may comprise one or more of, e.g., the data 1802, an identifier of a wireless device, an indication of a type of data (e.g., emergency, high priority access, standard access, signaling, etc.), and/or other information. The RAP 1803 may comprise a preamble sequence, e.g., bits arranged in octets 1804. A guard time and/or a cyclic prefix may be inserted, e.g., at either end of the preamble sequence. Additionally or alternatively, a guard band may be inserted above the preamble sequence and/or below the preamble sequence.

Figure 19:
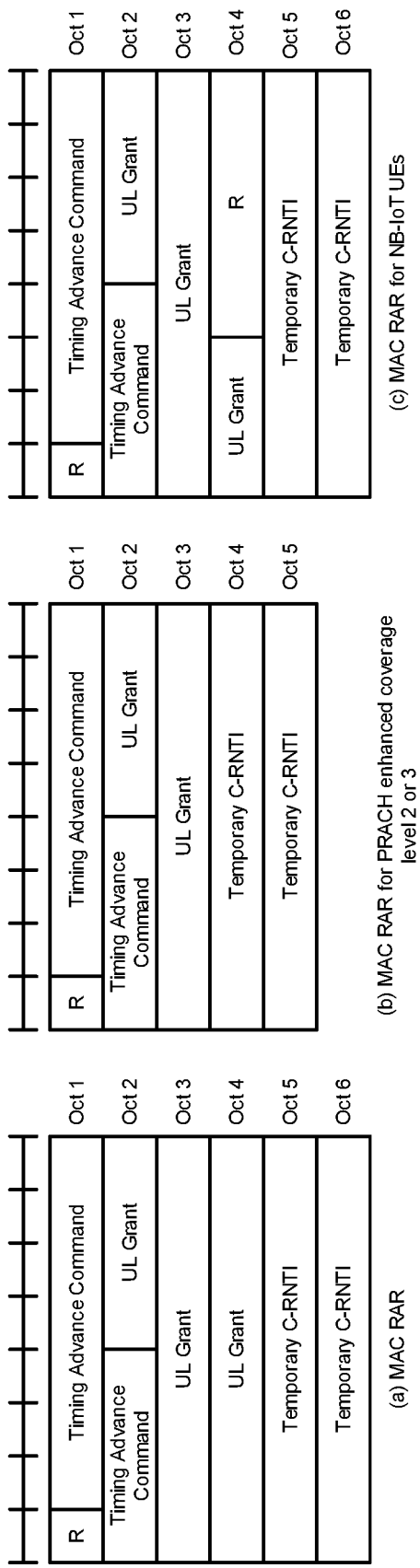
FIG. 19 shows an example MAC RAR format of an example of MAC RAR comprising a timing advance command, Uplink (UL) Grant, and Temporary Cell-Radio Network Temporary Identifier for a four-step RA procedure.

FIG. 19 shows examples of MAC RAR formats comprising a TA command, a UL Grant, and a TC-RNTI for a four-step RA procedure. Part (a) shows an example MAC RAR format, part (b) shows an example MAC RAR for a PRACH enhanced coverage level 2 or level 3, and part (c) shows an example MAC RAR for NB-IoT UEs.

In FIG. 19 part (a), a first octet comprises 1 bit of R, and 7 bits of the TA command. The second octet comprises an additional 4 bits of the TA command as well as 4 bits of the UL grant. The third and fourth octet each comprise 8 additional bits of the UL grant. And, the fifth and sixth octet each comprise 8 bits of the TC-RNTI. In FIG. 19 part (b), the MAC RAR for PRACH enhanced coverage level 2 or level 3 comprises a MAC RAR similar to the MAC RAR example in FIG. 19 part (a), except that in part (b) the UL grant comprises 8 bits in the third octet and the TC-RNTI is included in the fourth and fifth octets. In FIG. 19 part (c), a MAC RAR example for NB-IoT UEs comprises a MAC RAR similar to the MAC RAR in FIG. 19 part (a), except that the fourth octet in part (c) comprises 3 bits of the UL grant and 5 bits of R. As shown in FIG. 19 parts (a), (b), and (c), a MAC RAR may comprise one or more reserved bits (R bits). One or more of the R bits in the MAC RAR may indicate whether a RA procedure is a 2-step RA procedure or a 4-step RA procedure.

Figure 20:
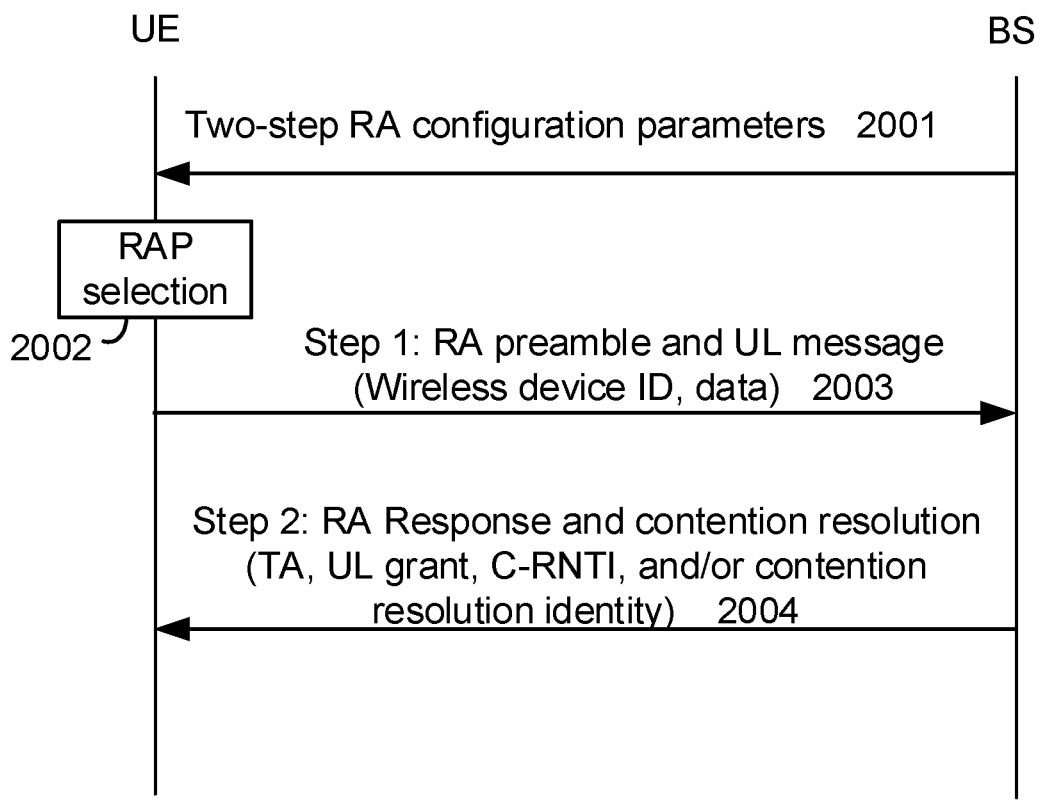
FIG. 20 shows an example of a two-step RA procedure.

FIG. 20 shows a two-step RA procedure that may comprise an uplink (UL) transmission of an RAP and data, followed by a downlink (DL) transmission of an RAR and contention resolution information. A two-step RA procedure may reduce RA latency compared with a four-step RA process, e.g., by integrating a process to obtain a timing advance (TA) value with a data transmission. In the UL transmission of a two-step RA procedure at step 2003, a wireless device may transmit, via a cell and to a base station, a RAP for UL time alignment and/or an UL message. The UL message may comprise, e.g., an UL grant, a wireless device ID, one or more TBs, a C-RNTI, and/or other information. In the DL transmission at step 2004, a base station may transmit an RAR and contention resolution information. The DL transmission may identify an assignment of dedicated resources for the wireless to transmit data, e.g., which may include an assignment of one or more transport blocks. The DL transmission may be in response to the UL transmission. The RAR may comprise an acknowledgement of a reception of the one or more transport blocks, and/or an indication of a successful decoding of the one or more transport blocks. The contention resolution may comprise, e.g., TA information, an UL grant, a C-RNTI, and/or a contention resolution identity.

In the UL transmission of a two-step RA procedure, a wireless device, may transmit, via a cell and to a base station, an RAP in parallel with one or more TBs. The wireless device may acquire one or more configuration parameters for the UL transmission before the wireless device starts a two-step RA procedure, e.g., at step 2001. In a contention-based RA procedure such as shown in FIG. 20, the one or more configuration parameters may comprise a root sequence that may be used by the wireless device to generate an RAP. The wireless device may determine an RAP at step 2002. An RAP selection by the wireless device may be based on the RA configuration parameters received at step 2001, e.g., comprising one or more RAP selections procedures described herein. The wireless device may use the root sequence to generate one or more candidate preambles, and the wireless device may randomly select one of the candidate preambles as the RAP. The one or more candidate preambles may be organized into groups that may indicate an amount of data for transmission. For example a first group may comprise RAPs indicated for small data transmissions, and a second group may comprise RAPs indicated for larger data transmissions. By transmitting an RAP from a specific group of RAPs, the wireless device may be able to indicate a size of data it may have for transmission. The wireless device may transmit the RAP via a RACH resource. The wireless device may transmit the one or more TBs via an UL resource associated with the RAP. The UL transmissions may occur, e.g., in the same subframe, in consecutive subframes, or in the same burst. A two-step RA procedure may be on a contention basis. The contention may occur for the RAP and/or data transmission.

In the UL transmission, the RAP may be used to adjust UL time alignment for a cell and/or to aid in channel estimation for one or more TBs. A portion of the UL transmission for one or more TBs may comprise, e.g., a wireless device ID, a C-RNTI, a service request such as buffer state reporting (e.g., a buffer status report) (BSR), one or more user data packets, and/or other information. A wireless device in an RRC connected state may use a C-RNTI as an identifier of the wireless device (e.g., a wireless device ID). A wireless device in an RRC inactive state may use a C-RNTI (if available), a resume ID, or a short MAC-ID as an identifier of the wireless device. A wireless device in an RRC idle state may use a C-RNTI (if available), a resume ID, a short MAC-ID, an IMSI (International Mobile Subscriber Identifier), a T-IMSI (Temporary-IMSI), and/or a random number as an identifier of the wireless device.

The UL transmission may comprise one or more TBs that may be transmitted using a two-step RA procedure different ways. User data packet(s) may be multiplexed in the first step of a two-step RA procedure. A base station may configure one or more resources reserved for the UL transmission that may be indicated to a wireless device before the UL transmission. If the wireless device transmits one or more TBs in the first step of the two-step RA procedure, a base station may transmit in a DL transmission an RAR that may comprise a contention resolution message and/or an acknowledgement/non-acknowledgement message of the UL data transmission. The DL transmission may be in response to the UL transmission. A wireless device may transmit one or more TBs after the reception of an RAR. The wireless device may transmit an indicator, such as buffer state reporting, in the UL transmission. The indicator may indicate to a base station an amount of data the wireless device may attempt to transmit. The base station may assign a UL grant based on the indicator. The base station may transmit the UL grant to the wireless device via an RAR. If UL data transmission, based on the UL grant via an RAR, occurs after the reception of RAR, the UL data transmission may occur on a contention-based channel. The UL data transmission may occur after a wireless device receives the RAR, e.g., in a subframe x+5, or x+n, where x is a subframe in which the RAR is received by the wireless device and n is any whole number greater than zero.

A wireless device may provide, to a base station, an indication of a required UL grant size. The wireless device may provide this indication, e.g., by determining a RAP selection (e.g., at step 2002), as opposed to transmitting a BSR, e.g., comprising one or more RAP selections procedures described herein. A base station may partition RAPs available to the base station into one or more RAP groups such that each partition may indicate a particular UL grant size. A wireless device may indicate a request, to a base station, of a small or large grant by selecting a RAP from a designated group. The base station may determine the requested grant size based on a RAP that the base station receives. A base station may configure an association between RAP groups and a UL grant size. The base station may broadcast one or more parameters via system information to indicate the association between RAP groups and a UL grant size.

A wireless device may provide, to a base station, an indication of a required UL grant size by transmitting an RAP on a partitioned radio resource. A base station may partition radio resources used for RAP transmission into one or more groups such that one or more resources in a group carrying an RAP may indicate a UL grant size that a wireless device may request. The base station may determine the requested grant size based on a RAP received by the base station via resources in a group. When a high granularity is required, a base station may configure a large number of radio resources for the RAP transmission. A base station may configure an association between radio resource groups and a UL grant size. The base station may broadcast one or more parameters via system information to indicate the association between radio resource groups and a UL grant size.

In the second step of the two-step RA procedure (e.g., step 2004), a base station may transmit an RAR to a wireless device. The base station may transmit the RAR in response to receiving the RAP and data from the wireless device. The RAR may comprise TA information, a contention resolution identity, a UL grant, and/or a C-RNTI. A MAC PDU may comprise one or more of an RAR MAC subheader and a corresponding RAR. The TA may be used by the wireless device for a two-step RA procedure, e.g., when a TA timer has expired.

A base station may or may not transmit the contention resolution identity to a wireless device. If a wireless device transmits a C-RNTI (e.g., as a wireless device ID) in a UL transmission, the wireless device may complete contention resolution based on a C-RNTI in an RAR. If a wireless device transmits a shared RNTI, that may be monitored by more than one wireless device as a wireless device ID in a UL transmission, the wireless device may complete contention resolution based on a contention resolution identity in an RAR. Other identifiers for a wireless device, such as a random number, resume ID, T-IMSI, and/or IMSI may be used to complete the contention resolution.

The UL grant may be for a wireless device that may have subsequent UL data to transmit. BSR may be transmitted by a wireless device in the UL transmission. A base station may use the BSR for determining a UL grant.

A wireless device may not have a C-RNTI, such as a wireless device in an RRC inactive state. If a two-step RA procedure is used for state transition from inactive to connected, a base station may assign a C-RNTI to a wireless device that lacks a C-RNTI.

A wireless device may acquire one or more two-step RA configuration parameters (e.g., in step 2001 of FIG. 20) from one or more messages broadcast and/or unicast by a cell. A base station may broadcast or multicast, via a cell, one or more two-step RA configuration parameters comprised in one or more system information blocks. The base station may transmit configuration parameters to a wireless device via dedicated resource(s) and signaling, such as via a unicast to a wireless device in an RRC connected state.

A base station may configure or restrict the usage of the two-step RA procedure to one or more case-based procedures, services, or radio conditions. If a cell is small such that there may be no need for a TA, a base station in the cell may use broadcast signaling to configure all wireless devices under its coverage to use a two-step RA procedure. A wireless device may acquire the configuration, via one or more system information blocks, and/or via L1 control signaling used to initiate a two-step RA procedure for downlink data arrival.

If a base station has macro coverage, a wireless device having a stored and/or persisted TA value, e.g., a stationary or near stationary wireless device such as a sensor-type wireless device, may perform a two-step RA procedure. A base station having macro coverage may use dedicated signaling to configure a two-step RA procedure with one or more wireless devices having stored and/or persisted TA values under the coverage.

A wireless device in an RRC connected state may perform a two-step RA procedure, e.g., when performing a network initiated handover, and/or when the wireless device requires or requests a UL grant within a required delay and there are no physical-layer uplink control channel resources available to transmit a scheduling request. A wireless device in an RRC inactive state may perform a two-step RA procedure, e.g., for a small data transmission while remaining in the inactive state or for resuming a connection. A wireless device may initiate a two-step RA procedure, for example, for initial access such as establishing a radio link, re-establishment of a radio link, handover, establishment of UL synchronization, and/or a scheduling request when there is no UL grant.

Determining a type of RA procedure may comprise determining whether to do a 2-step or a 4-step RA procedure. An indicator may be provided in a MAC PDU subheader. Such an indicator may be included in a RAP identifier (RAPID), such as shown in FIG. 17. A RAPID may identify a specific RAP, where up to $2^n$ unique RAPs are possible for an n-bit wide RAPID. Multiple wireless devices may transmit their own RAPs to a base station. A base station may receive RAPs from a plurality of wireless devices. Each RAPID may indicate one of the plurality of RAPs transmitted to a base station. A wireless device may determine a RAP. This determination may be performed by the wireless device using a random process. The wireless device may transmit the RAP. If a base station detects the RAP from the wireless device, the base station may use bits in a RAPID field to identify that RAP. The base station may transmit the RAPID in a MAC subheader within a MAC header of a MAC PDU, such as shown in FIG. 17. The wireless device that transmits the RAP may receive a MAC PDU comprising the RAPID in a MAC subheader. The wireless device may determine, based on the RAPID, that the RAP was successfully received by the base station.

The number of n bits in a RAPID may be 6 bits, such as in the RAPID shown in FIG. 17, or any number of bits greater or smaller than 6. The base station may determine an estimate of a number of wireless devices supported in a cell. The base station may also determine, based on the estimated number of wireless devices in a cell, a total number of RAPs that may be used for the cell. The base station may also determine, based on the number of RAPs that may be used for the cell, the number of bits to be used in the RAPID for identifying a RAP. The base station may reduce the number of bits used in the RAPID for identifying unique RAPs, which in turn, may allow one or more bits of the RAPID shown in FIG. 17, to be used for other information, such as a type of RA procedure to be used. Using fewer than n bits for identifying RAPs, may allow use of one or more unused RAPID bits as an indicator for other information such as whether a random access procedure uses a 2-step procedure or a 4-step procedure. The indication of whether a RA procedure is 2-steps or 4-steps may be in the form of a single bit, where "0" indicates one of the two possible RA procedures, such as a 2-step procedure, and "1" indicates the other, such as a 4-step procedure. Additionally or alternatively, more than one bit of a RAPID may be used, e.g., 2 or 3 bits, to indicate additional information, such as information specific to one or more steps in a RA procedure.

One or more bits of the E and/or T fields, such as in a MAC subheader comprising a RAPID shown in FIG. 17, may be used as an indication of a type of RA procedure, such as a 2-step RA procedure or a 4-step RA procedure. The E field may be an extension field. A MAC subheader with an E field set to 1 may indicate the presence of a backoff indicator (BI) in the subheader and the presence of an additional MAC subheader. A MAC subheader with an E field set to 0 may indicate the presence of a RAPID in the subheader. The T field may be an indication of a presence of additional MAC subheaders. A MAC subheader with a T field set to 1 may indicate the presence of an additional MAC subheader, and a MAC subheader with a T field set to 0 may indicate that the MAC subheader is the last MAC subheader in the MAC header. One or more of these E and/or T fields may be used to indicate a type of RA procedure, such as a 2-step RA procedure or a 4-step RA procedure.

A wireless device may perform a method for determining whether to perform a 2-step RA procedure or a 4-step RA procedure. The wireless device may transmit, to a base station, a RAP comprising a RAP identifier (e.g., RAPID/RAP ID) and one or more transport blocks. Additionally or alternatively, the wireless device may transmit, to a base station, one or more preambles in parallel with one or more transport blocks. Any of the above transmissions by the wireless device may be based on a determination, by the wireless device, that the type of the RA procedure is a two-step RA procedure. The wireless device may receive, from the base station, a MAC PDU comprising one or more MAC subheaders and one or more MAC RARs, such as shown in FIG. 17. This transmission by base station may be based on the first transmission by the wireless device. Each of the RARs may be associated with one of the one or more MAC subheaders. The wireless device may determine, based on a first field in a particular MAC subheader of the one or more MAC subheaders, a type of an RA procedure. Additionally or alternatively, based on the type of RA procedure (e.g., based on the first field in the particular MAC subheader), the wireless device may determine a size of an RAR that is associated with the particular MAC subheader comprising the field (e.g., a first MAC subheader, a second MAC subheader, etc.). The type of RA procedure may be, e.g., either a 2-step RA procedure or a 4-step RA procedure. Additionally or alternatively, the RA procedure may be a 3-step RA procedure, or some other number of steps. This particular MAC subheader may comprise a second field comprising the first field and/or one or more bits of an RAP identifier (e.g., a RAPID/RAP ID). This particular MAC subheader may also comprise an extension field, a type field, and/or a reserved bit. The wireless device may determine, based on a comparison of the field in the particular MAC subheader with the RAPID of the RAP transmitted by the wireless device, whether the RAP in the first transmission by the wireless device is successfully received by the base station. The wireless device may determine the type of RA procedure (e.g., a two-step RA procedure) based on whether an initial attempt of the particular RA procedure is successful. If the wireless device determines that the first attempt at the RA procedure is not successful, the wireless device may retransmit the first transmission and/or the wireless device may determine to perform a four-step RA procedure, such as shown in FIG. 15 part (a) and described above. The wireless device may determine whether a random process has completed. This determining whether a random access has completed may be based on, e.g., the first MAC subheader comprising a random access preamble identifier of the one or more preambles, and/or a second field in the first RAR that indicates that the one or more transport blocks have been successfully received by the base station. Additionally or alternatively, the determining that the random access procedure has completed may be based on the type of the random access procedure of the first RAR being a two-step random access procedure. The wireless device may transmit, based on a second field in the first RAR that indicates that at least one of the one or more transport blocks have not been successfully received by the base station, one or more messages using a four-step random access procedure. The wireless device may receive, from a base station, one or more messages comprising configuration parameters of a two-step random access procedure and/or configuration parameters of a four-step random access procedure. The wireless device may receive, from the base station, an RAR that may comprise an uplink grant. The wireless device may retransmit, in response to a field of the RAR (e.g., a first field, a second field, etc.) indicating that one or more transport blocks have not been successfully received by the base station, the one or more transport blocks. A wireless device may perform any combination of one or more of the above steps. A base station, or any other device, may perform any combination of a step, or a complementary step, of one or more of the above steps.

A base station may perform a method for determining whether to perform a two-step RA procedure or a four-step RA procedure. The base station may receive, from a wireless device, an RAP. The base station may also receive, in this first transmission from the wireless device, one or more transport blocks. The base station may determine, based on the RAP, a type of RA procedure. The type of RA procedure may be, e.g., either a two-step RA procedure or a four-step RA procedure. Additionally or alternatively, the RA procedure may be a 3-step RA procedure, or some other number of steps. The base station may transmit, to the wireless device and based on the RAP, a MAC PDU comprising one or more MAC subheaders and one or more MAC RARs, such as shown in FIG. 17. A particular MAC subheader may comprise a field indicating the type of the RA procedure. This particular MAC subheader may comprise one or more bits of an RAP identifier (e.g., a RAPID/RAP ID). This particular subheader may also comprise an extension field, a type field, and/or a reserved bit. Each of the one or more RARs may be associated with one of the one or more MAC subheaders. The RAR may comprise the same size or one of a plurality of different sizes. An indication of the type of the RA procedure may be based on a RAPID in the RAP. Additionally or alternatively, an indication of the type of the RA procedure may be based on one or more of the extension field, the type field, and/or a reserved bit. A base station may perform any combination of one or more of the above steps. A wireless device, or any other device, may perform any combination of a step, or a complementary step, of one or more of the above steps.

A base station may determine a first MAC PDU for a two-step RA procedure comprising RARs only for two-step RA procedures, and a base station may determine a second and different MAC PDU for a 4-step RA procedure comprising RARs only for 4-step RA procedures, wherein each RAR in a MAC PDU is for the same type of RA procedure. The base station may provide an indicator as to which type of RA procedure the MAC PDU corresponds. Such an indicator may be included in any location of the MAC PDU, e.g., within a MAC header or within MAC RARs (e.g., within an R field comprising reserved bits). By including the indicator in the MAC header, a wireless device may be able to determine the type of RA procedure, as well as the size of the MAC RARs, prior to receiving or decoding the MAC RARs of the MAC PDU.

A base station may multiplex different type of RA responses (RARs) into one MAC PDU. A wireless device may require or request resources for both two-step RA and four-step RA procedures, and these resources for difference types of RA procedures may be independent of each other. A base station may require or request to use additional resources to accommodate a MAC PDU for 2-step RA procedures that may be different from a MAC PDU for 4-step procedures. If a base station multiplexes two types of RARs (e.g., RARs for 2-step RA procedures and RARs for 4-step RA procedures) into one MAC PDU, the base station may only be able to assign common RACH resources, where a UE can transmit a 2-step RAP or a 4-step RAP. Resources in the uplink and the downlink may be conserved by identifying an RA type without allocating separate resources for different MAC PDUs. If a base station multiplexes two types of RARs in the same MAC PDU, e.g., if the length of a two-step RAR may be different than the length of a four-step RAR, one or more indicators may be required to indicate one or more RAR boundaries in the same MAC PDU.

A base station may determine a type of RA procedure, such as a two-step RA procedure or a four-step RA procedure, for communications with one or more wireless devices. A base station may monitor RACH resources to determine whether one or more RAPs are received. If a RAP is received, the base station may determine a type of RA procedure for the RAP, such as a two-step RA procedure or a four-step RA procedure. The base station may determine, based on the type of the RA procedure for the RAP, a corresponding type of RA procedure for communications with the wireless device that transmitted the RAP. The base station may make the above determinations for a plurality of RAPs, and each of the plurality of RAPs may be associated with one of a plurality of wireless devices. The base station may multiplex a plurality of MAC PDUs. Each of the MAC PDUs may comprise a one or more MAC subheaders. At least one of the one or more MAC subheaders may comprise an indication of a type of an RA procedure, such as a two-step RA procedure or a four-step RA procedure. The base station may transmit the multiplexed plurality of MAC PDUs. One or more of the plurality of wireless devices may receive the multiplexed MAC PDUs and determine whether to perform one or more steps of an RA procedure with the base station. The one or more of the plurality of wireless devices may determine, based on one or more indications in a MAC subheader of at least one of the MAC PDUs, a type of the RA procedure for communications with the base station.

A base station and/or a wireless device may determine whether an attempt for an RA procedure is successful. If an attempt for an RA procedure is successful, the base station and the wireless device may communicate using the type of RA procedure of the successful attempt. If the attempt for an RA procedure is not successful, the base station and/or the wireless device may make another attempt for an RA procedure of the same type as the prior attempt. If one or more attempts (e.g., up to a threshold number) for an RA procedure of a particular type of RA procedure (e.g., a two-step RA procedure) are not successful, the base station and/or the wireless device may attempt an RA procedure of a different type (e.g., a four-step RA procedure). A base station may perform any combination of one or more of the above steps. A wireless device, or any other device, may perform any combination of a step, or a complementary step, of one or more of the above steps.

A two-step RA procedure may be attempted by a wireless device. The wireless device may transmit, to a base station, an RAP in parallel with data. The data may be an uplink message that may comprise, e.g., an identifier of the wireless device and other data such as one or more transport blocks. A base station may receive the transmission from the wireless device and the base station may decode one or more transport blocks received from the wireless device. The base station may transmit, to the wireless device, a random access response (RAR). The base station may include the RAR in a MAC PDU. The base station may also include one or more additional RARs in the MAC PDU. The base station may multiplex the MAC PDU with other MAC PDUs. The base station may transmit the multiplexed MAC PDUs. The base station may include in the RAR, which may be responsive to the first transmission of the wireless device, one or more indications of whether the one or more transport blocks were successfully received by the base station. The one or more indications may be included in one or more R fields of one or more reserved bits of the RAR. Examples of R fields are shown, e.g., as "R" in FIG. 19 parts (a), (b), and (c). The wireless device may receive the multiplexed MAC PDUs. The wireless device may demultiplex the multiplexed MAC PDUs. The wireless device may determine, based on a RAPID or other indication in a MAC subheader of a MAC PDU, that a particular RAR associated with that MAC subheader is intended for the wireless device. For example, if a RAPID in a MAC subheader of a MAC PDU corresponds to an RAP that a wireless device transmitted to a base station, the wireless device may determine that a particular RAR associated with that MAC subheader comprising the RAPID is intended for the wireless device. The RAPID or other indication in the MAC subheader may include an indication of the identifier of the wireless device that was previously included in the uplink message of the transmission by the wireless device. The wireless device may determine, based on the indication in the RAR associated with the MAC subheader, whether the one or more transport blocks were successfully received by the base station. As described above, the indication may comprise one or more bits in one or more R fields in the RAR. R fields may comprise remainder bits of an octet comprising fields designated for other purposes, and these remainder bits may be reserved for future use or for one or more indications such as described above. An indication whether one or more transport blocks were successfully received by the base station may comprise a single bit. The indication may also comprise one or more additional bits to provide additional information to the wireless device. The additional information provided by one or more additional bits may comprise, e.g., a redundancy version for a retransmission of one or more transport blocks by the wireless device.

A wireless device may perform a method for determining whether a 2-step RA procedure is successful. A wireless device may receive, from a base station, one or more messages comprising configuration parameters for a RACH of a cell. The configuration parameters may comprise one or more RA parameters. The wireless device may transmit, to the base station, an RAP in parallel with: one or more first TBs with a first redundancy version (RV) associated with a HARQ process. This first transmission by the wireless device may be based on the one or more RA parameters. The one or more first TBs may comprise an identifier associated with the wireless device (e.g., UE ID). The wireless device may receive, from the base station, an RAR MAC PDU comprising, e.g., a preamble identifier (e.g., RAPID), an uplink grant, a field indicating whether the one or more first TBs are successfully received by a base station, and/or an RNTI. The RNTI may comprise, e.g., one or more of a C-RNTI or a TC-RNTI. The uplink grant may comprise an indication of uplink resources. The field indicating whether the one or more first TBs are successfully received by the base station may comprise: one or more of the identifier associated with the wireless device or a C-RNTI, if the one or more first TBs are received successfully by the base station; or one or more of a fixed value or a TC-RNTI, if the one or more first TBs are not received successfully by the base station. One or more transport blocks may be considered successfully received by the base station if the base station is able to decode information contained in the one or more transport blocks. Additionally or alternatively, the RAR MAC PDU may comprise at least one MAC subheader that comprises one or more of a TC-RNTI or an indication of a decoding failure. The wireless device may transmit, to the base station, one or more first TBs with a second RV associated with the HARQ process, wherein the second RV may be the same as/or different from the first RV. The wireless device may receive, from the base station, a downlink packet comprising the identifier associated with the wireless device, if the one or more first TBs with the first RV or the second RV are received successfully by the base station. The wireless device may receive, from the base station, an indication of a NACK, if TBs are not received successfully. The wireless device may transmit, based on the indication of the NACK, a HARQ comprising retransmitted TBs with another RV different from the prior first and second RVs. The wireless device may receive, from the base station, an indication of an ACK, if TBs are successfully received. If the one or more first TBs are not received successfully by the base station, the wireless device may determine that the RA procedure has failed and/or the wireless device may fall back to a four-step RA procedure, such as described above regarding FIG. 15 part (a). A wireless device may perform any combination of one or more of the above steps. A base station, or any other device, may perform any combination of a step, or a complementary step, of one or more of the above steps.

A base station may perform a method for determining whether a two-step RA procedure is successful. A base station may transmit, to a wireless device, one or more messages comprising configuration parameters for a RACH of a cell. The configuration parameters may comprise one or more RA parameters. The base station may receive, from the wireless device, an RAP in parallel with: one or more first TBs with a first redundancy version (RV) associated with a HARQ process. This first transmission by the wireless device may be based on the one or more RA parameters. The one or more first TBs may comprise an identifier associated with the wireless device (e.g., UE ID). The base station may transmit, to the wireless device, an RAR MAC PDU comprising, e.g., a preamble identifier (e.g., RAPID), an uplink grant, a field indicating whether the one or more first TBs are received successfully, and/or an RNTI. The RNTI may comprise, e.g., one or more of a C-RNTI or a TC-RNTI. The uplink grant may comprise an indication of uplink resources. The field indicating whether the one or more first TBs are received successfully may comprise: one or more of the identifier associated with the wireless device or a C-RNTI, if the one or more first TBs are received successfully by the base station; or one or more of a fixed value or a TC-RNTI, if the one or more first TBs are not received successfully by the base station. One or more transport blocks may be considered successfully received by the base station if the base station is able to decode information contained in the one or more transport blocks. Additionally or alternatively, the RAR MAC PDU may comprise at least one MAC subheader that comprises one or more of a TC-RNTI or an indication of a decoding failure. The base station may receive, from the wireless device, one or more first TBs with a second RV associated with the HARQ process, wherein the second RV may be the same as or different from the first RV. The base station may transmit, to the wireless device, a downlink packet comprising the identifier associated with the wireless device, if the one or more first TBs with the first RV or the second RV are received successfully by the base station. The base station may transmit, to the wireless device, an indication of a NACK, if TBs are not received successfully. The base station may receive, based on the indication of the NACK, a HARQ comprising retransmitted TBs with another RV different from the prior first and second RVs. The base station may transmit, to the wireless device, an indication of an ACK, if TBs are successfully received. If the one or more first TBs are not received successfully by the base station, the base station may determine that the RA procedure has failed and/or that a four-step RA procedure, such as described above regarding FIG. 15 part (a), should be attempted. The base station may transmit, to the wireless device, an indication that the RA procedure has failed and/or an indication to fall back to a four-step RA procedure. A base station may perform any combination of one or more of the above steps. A wireless device, or any other device, may perform any combination of a step, or a complementary step, of one or more of the above steps.

Because a two-step RA procedure may reduce latency of UL data transfer compared with a four-step RA procedure, two-step RA procedures may be advantageous for UL data transfer such as UL data arrival for a wireless device in an RRC connected state or UL data arrival for a wireless device in an RRC inactive state. If a wireless device is in an RRC connected state, using two-step RA procedure may improve the latency of receiving an uplink grant for UL data arrival. The two-step RA procedure may be used, e.g., if a TA timer expires or a physical-layer uplink control channel resource for the SR is not configured for a wireless device. If a wireless device is in an RRC inactive state, the wireless device may transmit a UL data arrival using a two-step RA procedure without a state transition to the RRC connected state.

If a base station configures four-step and two-step RA procedures, the base station may use separate preamble signature groups and/or separate time-frequency resources for each of four-step and two-step RA preamble transmissions. Using separate preamble signature groups and/or separate time-frequency resources for different types of RA procedures may help the base station determine whether a wireless device attempts to initiate a two-step RA procedure or a four-step RA procedure. A base station may broadcast and/or unicast one or more configuration parameters that indicate separate preamble signature groups, and/or that use separate time-frequency resources, for four-step and two-step RA preamble transmissions.

One or more RAP groups may be configured for a two-step RA procedure via broadcast system information. If a base station configures one or more groups in the two-step RA procedure, a wireless device may use a size of the message transmitted by the wireless device in the third step, and/or the pathloss, to determine for which group the wireless device selects an RAP. A base station may use a group type to which an RAP belongs as an indication of the message size in the third step and/or as an indication of the radio conditions at a wireless device. A base station may broadcast the RAP grouping information along with one or more thresholds on system information.

A process for generating a RAP may be predetermined, or may be determined, e.g., using two-step RA configuration parameters. A type of sequence for RAP generation, e.g., a Zadoff-Chu sequence, the number of samples in a sequence, a sub-carrier spacing for a RAP transmission, and a format of a RAP transmission in a subframe (e.g., guard time/frequency, cyclic prefix length for a RAP transmission, and/or a resource block size allocated for an RAP and data transmission) may be predetermined. A cell may broadcast one or more parameters, such as a root sequence index and cyclic shift interval (e.g., rootSequenceindex, highspeedflag, and/or zeroCorrelationZoneConfig in LTE), required for a wireless device to generate a set of RAPs.

The resources used for a RAP and data transmission may be pre-determined or indicated by RA configuration parameters. A table or other form of memory may indicate possible pairs of system frame number (SFN) and subframe number. A wireless device may attempt the first step of a two-step RA procedure, e.g., transmission of an RAP and data, based on such a table. A base station may broadcast one or more pairs of SFN and subframe used in the cell for the RAP and data transmission of a two-step RA procedure. A frequency offset with which a wireless device transmits an RAP and data within a subframe may be configured by two-step RA configuration parameters. A resource via which a data part is transmitted during the UL transmission may be pre-determined or configured by two-step RA configuration parameters. Such a resource may be associated with a selected RAP ID, such that a wireless devices that select different RAPs transmit data via different resources in the UL transmission.

One or more wireless devices may perform the first step of a two-step RA procedure using the same cell in the same subframe. The cell may respond to one or more wireless devices' UL transmissions by multiplexing one or more RARs into a single MAC PDU as shown in FIG. 17. FIG. 17 is an example MAC PDU format. Other fields may be added, e.g., to the subheader and/or to the RARs. A MAC PDU may comprise a MAC header and MAC RARs. The MAC header may comprise one or more MAC subheaders, at least one of which may comprise a BI. Other MAC subheaders may comprise a RAPID that may indicate an index number of one of available RAPs in a cell. Each MAC RAR may comprise a wireless device ID, a C-RNTI, a TA command, an UL grant, and/or other parameters. A wireless device may identify an RAR corresponding to the wireless device in a MAC PDU by first identifying a subheader having a RAPID that matches the RAP that the wireless device transmitted during the UL transmission. The wireless device may decode an RAR that is paired with the identified subheader.

The MAC PDU may comprise a subheader that may comprise a bit string, e.g., including a special bit string comprising zeros, that may be pre-defined to indicate the failure of RAP detection but success of data decoding at a cell. The bit string may be indicated by a field of the RAPID or by a dedicated field for the bit string in the subheader. An RAR that is a pair of the subheader having the special bit string may include the wireless device ID (and/or other IDs) that a wireless device transmits in the UL transmission. The wireless device may decode the RAR having a corresponding subheader that has the special bit string, to determine whether the RAR is intended for the wireless device. The MAC subheader may comprise a field that may be a RAP identifier associated with the RAP if the RAP is detected. If the RAP is not detected, the field may comprise a pre-defined format. Additionally or alternatively, a second field in the MAC PDU subheader may indicate that a RAP is not detected.

An RAR response timer may be configured using two-step RA configuration parameters. A wireless device may reset and/or start the RAR response timer in response to the wireless device transmitting a UL RAP and data transmission. The wireless device may monitor a downlink channel for an RAR on a cell until the RAR response timer is expired. A base station may transmit a MAC PDU that comprises one or more RARs, one or multiple times, in a DL transmission before the RAR response timer expires. The presence of an RAR may be indicated via a specific channel (e.g., a PDCCH in LTE) using an identity (e.g., RA-RNTI in LTE) created based on UL transmission time (e.g., as a combination of SFN and/or subframe number) and/or frequency offset. A wireless device may stop an RAR response timer when at least one of the following conditions are satisfied: the wireless device detects a MAC PDU that comprises a RAPID matching the RAP that the wireless device transmitted (and/or satisfying a threshold of similarity), the wireless device determines an RAR has a wireless device ID that the wireless device transmitted, and/or the RAR response timer is expired.

A wireless device may monitor RARs for unique identifiers associated with the wireless device to determine whether information transmitted by the base station is intended for the wireless device. A base station may assign a unique identifier to each wireless device of a plurality of wireless devices in a cell. The unique identifier may be associated with a radio network temporary identifier (RNTI). For a particular cell, the RNTI may be a cell radio network temporary identifier (C-RNTI). A wireless device may have a plurality of RNTIs associated with it, each of which may be for a different purpose. A wireless device may monitor resources in a time and frequency resource map by identifying a C-RNTI corresponding to the wireless device. If a base station transmits information in these resources, the information may be scrambled by the unique identifier of the wireless device, e.g., C-RNTI, to which the information is intended. If the wireless device receives a transmission from a base station, the wireless device may attempt to decode packets with the unique identifier assigned to the wireless device by the base station. The wireless device may determine, using its unique identifier, whether there is any data for the particular wireless device. The wireless device may monitor one or more channels, such as downlink control channels, with its unique identifier, e.g., at least one of RNTI assigned to the wireless device, to determine whether information is intended for that particular wireless device. If the wireless device uses its unique identifier to attempt to decode information but is not successful, then the wireless device may determine that the information is intended for a different wireless device. The wireless device that was unsuccessful in its attempt to decode information may continue to monitor the one or more channels.

A two-step RA procedure may comprise two pairs of transmission, e.g., a first pair for a preamble transmission and a second pair for data transmission. Four overall outcomes may be possible from these pairs of transmission: both pairs succeed, both pairs fail, the first pair succeeds but the second pair fails, or the second pair succeeds but the first pair fails. A wireless device may determine, based on an indication in a MAC subheader such as described above, whether one or more preamble transmissions are successfully received by a base station. A wireless may determine, based on an indication in a MAC RAR such as described above, whether one or more data transmissions are successfully received by a base station. If either one or more preamble transmissions are not successfully received by a base station, and/or if either one or more data transmissions are not successfully received by a base station, a wireless device may determine whether to perform a retransmission of at least one of the first pair and/or the second pair of transmissions. If a wireless device determines to perform a retransmission, the wireless device may determine when to perform the retransmission.

Figure 21:
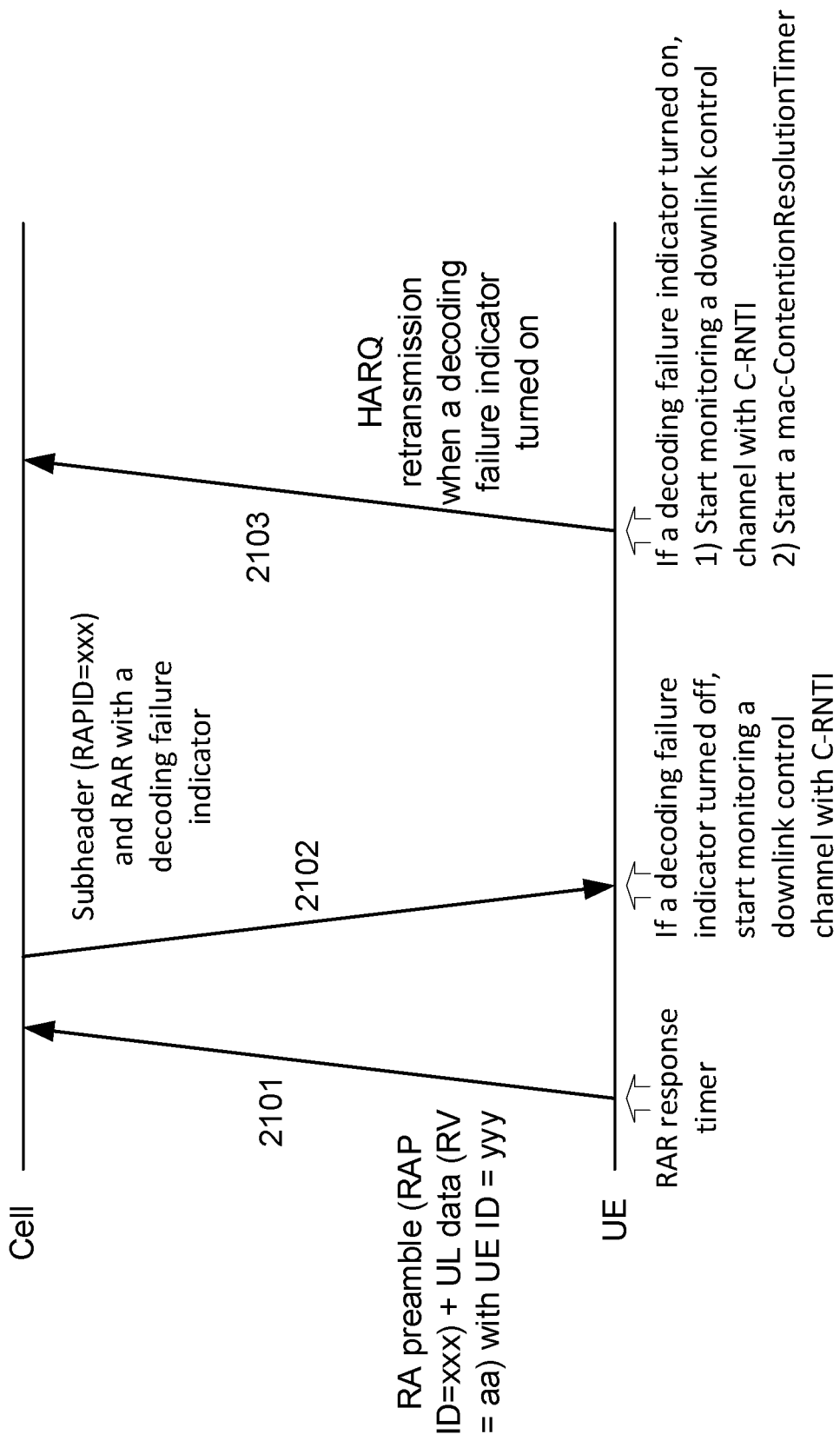
FIG. 21 shows an example of contention resolution for a two-step RA procedure.

A contention resolution may be completed based on, e.g., either a C-RNTI or a wireless device contention resolution identity in an RAR. If a base station detects an RAP and decodes one or more TBs or portion thereof that a wireless device transmits, the base station may respond with an RAR that comprises the C-RNTI and/or other wireless device identifiers that the wireless device transmits in the first step of a two-step RA procedure. By detecting the C-RNTI and/or other wireless device identifiers in the received RAR, the wireless device may determine the success of the two-step RA procedure. The wireless device may start monitoring the downlink control channel associated with the C-RNTI (or Temporary C-RNTI) from the time the wireless device detects the C-RNTI (or Temporary C-RNTI) in the RAR such as shown in FIG. 21.

If a base station detects an RAP but fails to decode one or more TBs or portion thereof that a wireless device transmits in the UL transmission of the two-step RA procedure, the base station may indicate such a failure. The base may transmit a MAC PDU that comprises a TC-RNTI, and/or one or more indicators in a MAC subheader and/or in an RAR, that may indicate a decoding failure to the wireless device of the RAP that the base station detected but failed to decode. A wireless device may determine, based on the one or more indicators, that the RAP was not successfully received or decoded by the base station. The wireless device may re-transmit the one or more transport blocks, e.g., by performing HARQ retransmission. The wireless device may start a mac-ContentionResolutionTimer when the wireless device retransmits, based on uplink grant in the RAR, the one or more transport blocks. The wireless device may not start a mac-ContentionResolutionTimer when the wireless device transmits one or more transport blocks based on uplink grant in the RAR, if the RAR indicates that one or more transport blocks are received and decoded successfully by the base station.

A wireless device may restart the mac-ContentionResolutionTimer at a HARQ retransmission. If a wireless device starts or restarts the mac-ContentionResolutionTimer, the wireless device may start monitoring a downlink control channel using the C-RNTI or TC-RNTI. The wireless device may start this monitoring at a subframe and/or at a time offset from a start or restart of the mac-ContentionResolutionTimer. If an RAR indicates that one or more transport blocks are received successfully by a base station, the wireless device may monitor the C-RNTI and/or TC-RNTI. The wireless device may start this monitoring at a subframe and/or at a time offset from receiving the RAR.

If a wireless device transmits a C-RNTI in the first step of a two-step RA procedure, the wireless device may monitor a downlink control channel using the C-RNTI. If a wireless device does not transmit a C-RNTI in the first step of a two-step RA procedure, the wireless device may monitor a downlink control channel using the TC-RNTI. If the mac-ContentionResolution Timer expires, a wireless device may determine that the two-step RA procedure has failed.

FIG. 21 shows an example of contention resolution for a two-step RA procedure. At step 2101, a wireless device may transmit, to a base station and via a cell, a random access preamble (RAP) and data. The base station associated with the cell may receive the RAP and the data. The RAP may include an identifier (e.g., RAPID=xxx). The data may comprise UL data and a redundancy version (e.g., RV=aa). The data may comprise an identifier of the wireless device (e.g., UE ID=yyy). The wireless device may start an RAR response timer (e.g., mac-ContentionResolutionTimer) at or near the time the wireless device transmits the RAP and data. At step 2102, the base station may transmit, and the wireless device may receive, a MAC PDU comprising a subheader that includes a RAP identifier of the RAP (e.g., RAPID=xxx). The MAC PDU may also comprise an RAR that may correspond to the subheader comprising an uplink grant. The RAR may include one or more indications of a decoding failure by the base station of the UL data. If an indication of a decoding failure is turned off, the wireless device may start monitoring a downlink control channel with a C-RNTI of the wireless device. At step 2103, if an indication of a decoding failure is turned on, the wireless device may perform a HARQ retransmission of the RAP and data, the wireless device may start monitoring the downlink control channel with the C-RNTI of the wireless device, and/or the wireless device may start and/or restart a timer (e.g., the mac-ContentionResolutionTimer).

The wireless device may transmit one or more transport blocks in a first subframe and via radio resources indicated in an uplink grant. The wireless device may start a contention resolution timer in the first subframe depending on whether the RAR comprises the identifier of the wireless device. The wireless device may stop monitoring for RAR(s), e.g., after decoding a MAC packet data unit for an RAR and determining that the RAP identifier matches the RAP transmitted by the wireless device. The MAC PDU may comprise one or more MAC RARs and a MAC header. The MAC header may comprise a subheader having a backoff indicator and one or more subheaders that comprises RAPIDs.

If one or more data transmissions are successfully received by a base station, the base station may transmit a MAC PDU comprising one or more corresponding RARs that each comprise an uplink grant. The uplink grant may indicate a particular subframe for a wireless device to transmit uplink data. The wireless device may start monitoring a downlink control channel from a second subframe.

The wireless device may determine the second subframe based on, e.g.: a third subframe in which an RAR is received, if the RAR comprises the wireless device identifier; and/or the first subframe in which the wireless device transmits uplink resources based on the uplink grant. The wireless device may monitor the data for a C-RNTI, if the data comprises a C-RNTI; and/or the wireless device may monitor the RAR for a Temporary C-RNTI (TC-RNTI), if the data does not comprise a C-RNTI.

If a wireless device does not receive any MAC PDU that comprises the RAPID and/or the wireless device identifier associated with the RAP, and if an RAR response timer has expired, the wireless device may retry the first step of a two-step RA procedure. The wireless device may retransmit the RAP and the data on the same cell.

If the wireless device receives a MAC PDU that comprises a BI, the wireless device may select a backoff time. The backoff time may be random, and it may be determined according to a uniform distribution, e.g., between 0 and a BI value. The wireless device may delay the subsequent re-transmission of the RAP and the data by the selected backoff time. If the wireless device receives a MAC PDU that does not comprise any backoff indicator until an RAR response timer has expired, the backoff time may be set to zero. The wireless device may have a counter for counting the number of retransmissions of RAP and data. The wireless device may set the counter to zero (or 1) in the initial RAP transmission, and the wireless device may increase the counter by one whenever the wireless device re-tries the first step of a two-step RA procedure. The wireless device may reset the counter to zero (or 1) when the wireless device receives any MAC PDU that comprises the RAP ID or the wireless device ID, and/or when an RAR response timer expires. Two-step RA configuration parameters may have a parameter limiting an allowed maximum number of the retransmissions of RAP and data. If the counter reaches the maximum number, the wireless device may stop retransmission. The wireless device may perform a new RA on another cell with two-step or four-step RA procedure depending on two-step RA configuration parameters of a cell associated with the another cell.

Figure 22:
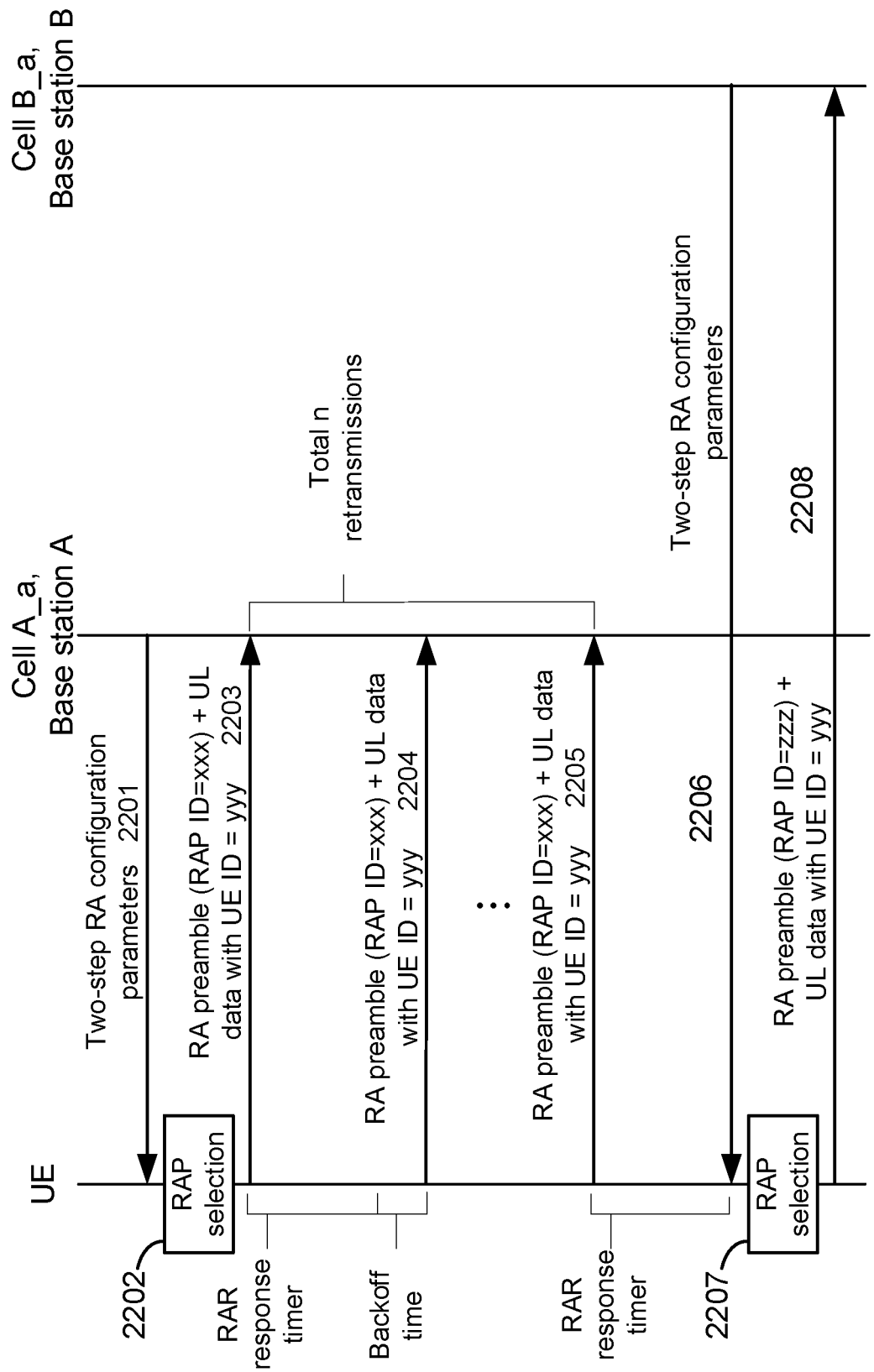
FIG. 22 shows an example of a two-step RA procedure of an example failure of UL transmission for n times.

FIG. 22 shows an example of a two-step RA procedure and the failure of UL transmission for n times. At step 2201, a first base station (e.g., base station A) may transmit, via a first cell (e.g., cell A_a), two-step RA configuration parameters to a wireless device. The wireless device may determine a RAP selection, at step 2202, e.g., comprising one or more RAP selections procedures described herein. At step 2203, the wireless device may transmit a RAP and data (e.g. one or more transport blocks) of a two-step RA procedure to a base station. The RAP may comprise an identifier (RAP ID=xxx), and the data may comprise a wireless device identifier (UE ID=yyy). At or near the time the wireless device transmits the RAP and the data, the wireless device may start an RAR response timer. The base station may successfully decode and identify a RAP ID associated with the RAP, but the base station may fail to decode the data. Failure to decode the data may result from, e.g., collision or low signal quality. The base station may not transmit an RAR to the wireless in response to the RAP and data, or the base station may transmit an RAR comprising an indication of a decoding failure of the data. If the RAR response timer expires, and if the wireless device has not received an RAR indicating that the RAP and the data were successfully received by the base station, at step 2204, the wireless device may retransmit the RAP and the data after a time period corresponding to a backoff time. The wireless device may perform the above steps 2203 through 2204, to retransmit the RAP and the data, n number of times, where n may be any whole number. After the nth retransmission at step 2205, and after the RAR response timer expires with the wireless device not receiving an RAR indicating that the RAP and the data were successfully received by the base station, the wireless device may receive RA configuration parameters from a second base station (e.g., base station B) via a second cell (e.g., cell B_a), at step 2206. The RA configuration parameters from the second base station may be for a two-step RA procedure or for a four-step RA procedure. At step 2207, the wireless device may determine, based on the RA configuration parameters from the second base station, a RAP selection, e.g., comprising one or more RAP selections procedures described herein. The wireless device may transmit, to the second base station, a new RAP (e.g., comprising RAP ID=zzz) and the data (e.g., comprising the UE ID=yyy). The wireless device may repeat any of the above steps until the wireless device determines that a RA procedure is successful.

The wireless device may receive a MAC PDU comprising a subheader that includes a RAP ID that the wireless device transmitted, but that also includes a decoding failure indicator in the subheader or in the RAR associated with the subheader. The decoding failure indicator may be implemented in different ways depending on a MAC PDU format. If RARs for data decoding failures and successes have the same size, a MAC PDU may have a dedicated field inserted in a subheader or in an RAR to indicate the data decoding success or failure. This field may comprise one bit, such that either zero or one may indicate data decoding success or failure. A special bit string may be also used in an existing field in an RAR to indicate data decoding success or failure. This special bit string may comprise, e.g., all zeros or a detectable pattern of ones and zeros in the field of a wireless device ID in an RAR to indicate data decoding failure, or to indicate data decoding success. If RARs for data decoding failure and success have the same size, a wireless device may determine, based on a pre-determined RAR size information, the boundary of an RAR in a MAC PDU. If RARs for data decoding failure and success have different sizes, the base station may insert a field, to indicate RAR size information, in a MAC subheader or in an RAR. A wireless device may determine the boundary of an RAR in a MAC PDU based on the field. If RARs for data decoding failure and successes have different sizes, the RARs may have different formats. For example, an RAR for a data decoding failure may comprise a field of Temporary Cell Radio Network Temporary Identity instead of a field of a contention resolution wireless device ID, and an RAR for a data decoding success may comprise a contention resolution wireless device ID instead of a TC-RNTI.

A wireless device may transmit, to a base station and as a part of a two-step RA process, a random access preamble and one or more transport blocks. The wireless device may receive a MAC PDU comprising: one or more MAC PDU subheaders, wherein a subheader comprises an RAP identifier; and one or more RARs, wherein each RAR corresponds to a MAC PDU subheader in the one or more MAC PDU sub-headers. The wireless device may determine whether the one or more transport blocks are received successfully based on one or more of: a first field in the subheader (e.g., a bit in the subheader indicating a fall back to a four-step RA procedure); a second field in an RAR associated with a first sub-header comprising an RAR identifier associated with the RAR (e.g., a bit in the RAR indicating a fall back to a four-step RA procedure). The wireless device may retransmit one or more transport blocks, if the one or more transport blocks are not received successfully by a base station. The wireless device may determine a size of the RAR based on one or more indications in the first field and/or in the second field. The wireless device may determine whether to fall back to a four-step RA procedure based on one or more indications in the first field and/or in the second field.

A wireless device may perform a method for determining whether a two-step RA procedure has failed based on one or more timers. A wireless device may receive, from a base station, RA configuration parameters. The wireless device may transmit, to a base station, an RAP and one or more first transport blocks. The one or more first transport blocks may comprise an identifier of the wireless device (e.g., UE ID). The wireless device may receive, from the base station, a MAC PDU comprising one or more MAC subheaders and one or more RARs. At least one of the one or more MAC subheaders may comprise a RAPID of the RAP transmitted by the wireless device. Each RAR of the one or more RARs may be associated with a MAC subheader of the one or more MAC subheaders. A first RAR may be associated with a first MAC header comprising an uplink grant for a first subframe. The wireless device may transmit, to the base station, in a first subframe, and via radio resources indicated by the uplink grant, one or more transport blocks. The wireless device may start, in response to transmitting one or more transport blocks, and based on whether the RAR comprises the identifier of the wireless device, a contention resolution timer. The contention resolution timer may be for determining whether a random access procedure is successful. The wireless device may stop, based on a determination that the RAPID of the MAC subheader matches the identifier of the wireless device, an RAR response timer that started in response to transmitting the RAP. The wireless device may stop, based on a determination that a downlink control information detected from a downlink control channel comprises the identifier of the wireless device, the contention resolution timer. The wireless device may perform one or more operations regarding the contention timer one or more times, and/or using one or more timers. The wireless device may restart, based on a retransmission of the one or more TBs, the contention resolution timer. The wireless device may determine that, based on an expiration of the contention resolution timer, a first RA procedure has failed. The wireless device may initiate, at a time period after determining that the first RA procedure has failed, a second RA procedure. The wireless device may determine, based on a backoff indicator in the RAR, the time period. The wireless device may monitor a downlink control channel associated with an RNTI. The wireless device may start the monitoring from a second subframe. The monitoring by the wireless device may comprise monitoring the downlink control channel for a downlink control information associated with the RNTI. The wireless device may determine the second subframe based on one or more of: a subframe in which an additional RAR is received that comprises the identifier of the wireless device; and/or a subframe in which the wireless device transmits uplink resources based on the uplink grant. The monitoring may be performed after detecting the RAR comprising the RNTI. The RNTI may comprise one or more of a C-RNTI or a TC-RNTI. The wireless device may determine that an RAR associated with the RAP has not been received. The wireless device may perform the following one or more times: retransmitting the RAP and the one or more transport blocks; starting, based on the retransmitting the RAP and the one or more transport blocks, a second timer; and determining that an RAR associated with the retransmitted RAP has not been received. This determining may occur at a second time period after the starting of the second timer. The wireless device may determine, based on a determination that an RAR associated with one or more retransmissions of the RAP has not been received, that an RA procedure with the base station has failed. The wireless device may receive, from a second base station, RA parameters. The wireless device may transmit, to the second base station, the RAP and the one or more transport blocks. A wireless device may perform any combination of one or more of the above steps. A base station, or any other device, may perform any combination of a step, or a complementary step, of one or more of the above steps.

Figure 23:
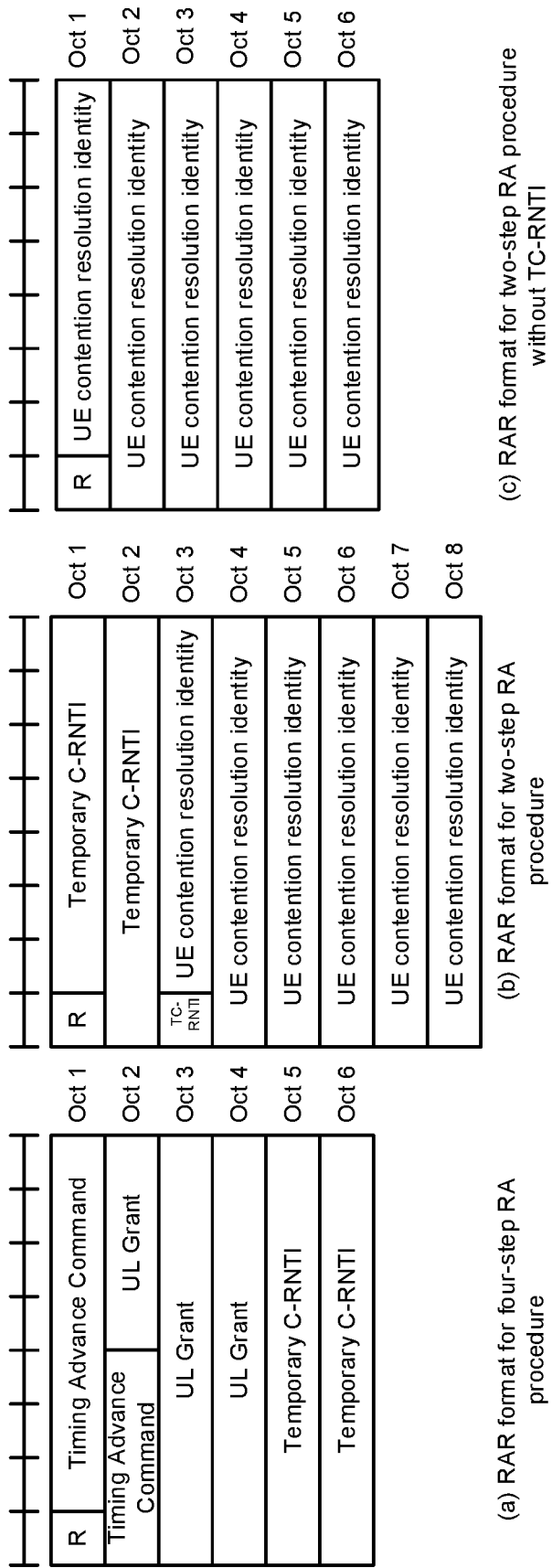
FIG. 23 shows example RARs with a fixed size 8 bytes for example RAR formats for two-step RA procedures and for a four-step RA procedure.

A base station may multiplex, in a MAC PDU, RARs for two-step and four-step RA procedures. If RARs for two-step and four-step RA procedure have the same size, a wireless device may not require an RAR length indicator field and/or the wireless device may determine the boundary of each RAR in the MAC PDU based on pre-determined RAR size information. The RAR may have a field to indicate a type of RAR (e.g., comprising one or bits in a reserved "R" field as shown in FIG. 23). An RAR may comprise different formats for two-step and four-step RARs with a fixed size. Some examples for different RAR formats are shown in FIG. 23 parts (a), (b), and (c). By using RARs with different formats, the size of the sub-header may be reduced and/or additional bits may be available for other fields. Encoding RARs with an indication of an RAR type may reduce downlink signaling overhead.

FIG. 24 shows an example RAR format that may or may not comprise a field to indicate a type of RAR. The RAR shown in FIG. 24 may comprise a fixed size using the same format for two-step and four-step RA. If RARs for two-step and four-step RA procedures have different sizes, a field for indicating an RAR type may be included in a subheader (such as a MAC subheader) or in an RAR. An RAR may comprise different types of fields that may correspond with an indicator in a subheader or in an RAR. A wireless device may determine the boundary of one or more RARs in a MAC PDU based on one or more indicators.

Different message formats may be used based on the type of device for communication. If a wireless device comprises, e.g., an IoT device, such as a smart appliance or other electronics equipment that may not require a large amount of data transmission, the format may include a small message space for transmissions by the device instead of including an uplink grant. If the wireless device comprises, e.g., a phone, tablet, or other device that requires a large amount of data transmissions, the format may include an uplink grant for larger transmissions.

A wireless device may determine whether an RAR is a two-step RAR or a four-step RAR, at least based on the RAP identifier in the corresponding MAC PDU sub-header. Two-step and four-step RA preamble identifiers may be selected from two different preamble groups. The wireless device may determine whether an RAR is a two-step RAR or a four-step RAR, at least based on a field indicating an RAR type. The MAC PDU subheader may comprise the field indicating an RAR type. The field may comprise one bit indicating a two-step or a four-step RAR type. The RAR length may be predetermined for each RAR type. A wireless device may determine a size of an RAR based on a determination of whether the RAR is a two-step RAR or a four-step RAR.

A wireless device may transmit, to a base station, a random access preamble via a random access channel in a subframe and using a frequency offset. A wireless device may determine an RA-RNTI based on one or more of a subframe number and/or a frequency index. A wireless device may monitor a control channel for a control packet associated with an RA-RNTI. A wireless device may receive a MAC PDU, associated with RA-RNTI, comprising: one or more MAC PDU subheaders, wherein a subheader may comprise an RAP identifier; one or more RARs, wherein each RAR of the one or more RARs may correspond to a MAC PDU subheader of the one or more MAC PDU sub-headers; and an uplink grant. The wireless device may transmit one or more transport blocks based on the uplink grant.

Example RAR formats are shown in FIGS. 19, 23, and 24. An RAR may include one or more fields, such as a timing advance command, an uplink grant, a TC-RNTI, a C-RNTI, a wireless device (e.g., a UE) contention resolution identity, and/or other parameters. An RAR format may be determined based on the fields that are needed in the RAR. A present bit may be used for a field to indicate whether the field is included in the RAR. For example, a presence field may indicate whether or not an RAR includes an uplink grant. Other fields may be associated with a presence field. Multiple RAR types may include different fields that may be pre-defined. A field in the MAC subheader or in an RAR may determine the RAR type and a corresponding RAR length. A two bit field may indicate which of four or three RAR types are transmitted. Other fields, comprising any number of its, may be included in the MAC subheader and/or in an RAR to indicate information about an RA procedure.

FIG. 19 shows example RAR formats with a fixed size (e.g., 6 bytes) for various RA procedures (e.g., two-step and four-step RA procedures). FIG. 23 parts (c) and (a) show example RAR formats with a fixed size (e.g., 6 bytes) for two-step and four-step RA procedures, respectively. FIG. 23 part (b) shows an example RAR format with a fixed size (e.g., 8 bytes) for a two-step RA procedure. FIG. 24 shows an example RAR format with a fixed size (e.g., 12 bytes) for two-step and four-step RA procedures. As shown in FIGS. 23 parts (a)-(c) and FIG. 24, an RAR format may comprise, e.g., one or more: reserved fields (e.g., "R"), timing advance command, uplink grant, temporary C-RNTI (TC-RNTI), and/or wireless device (e.g., UE) contention resolution identity.

A two-step RA procedure may comprise a hybrid automatic repeat request (HARQ), including, e.g., HARQ with soft combining, if a data decoding failure occurs. If a wireless device receives a MAC PDU that comprises a subheader with a RAP ID that matches or indicates the RAP that was transmitted by the wireless device, but a decoding failure indicator indicates a failure has occurred, the wireless device may perform HARQ. The wireless device may perform HARQ, e.g., by transmitting another redundancy version to the cell from which the wireless device received the MAC PDU. The HARQ transmission may occur at an a priori known subframe or time period, such as every eight subframes, after a prior HARQ transmission in the same HARQ process. The HARQ may predetermine a sequence of redundancy version numbers that the wireless device may transmit in a HARQ transmission in the same process. An RV number may start, e.g., from zero or one in an initial UL data transmission, and the next RV in the sequence may be transmitted if a wireless device determines that an RAR comprises an indicator requesting a next RV.

Figure 25:
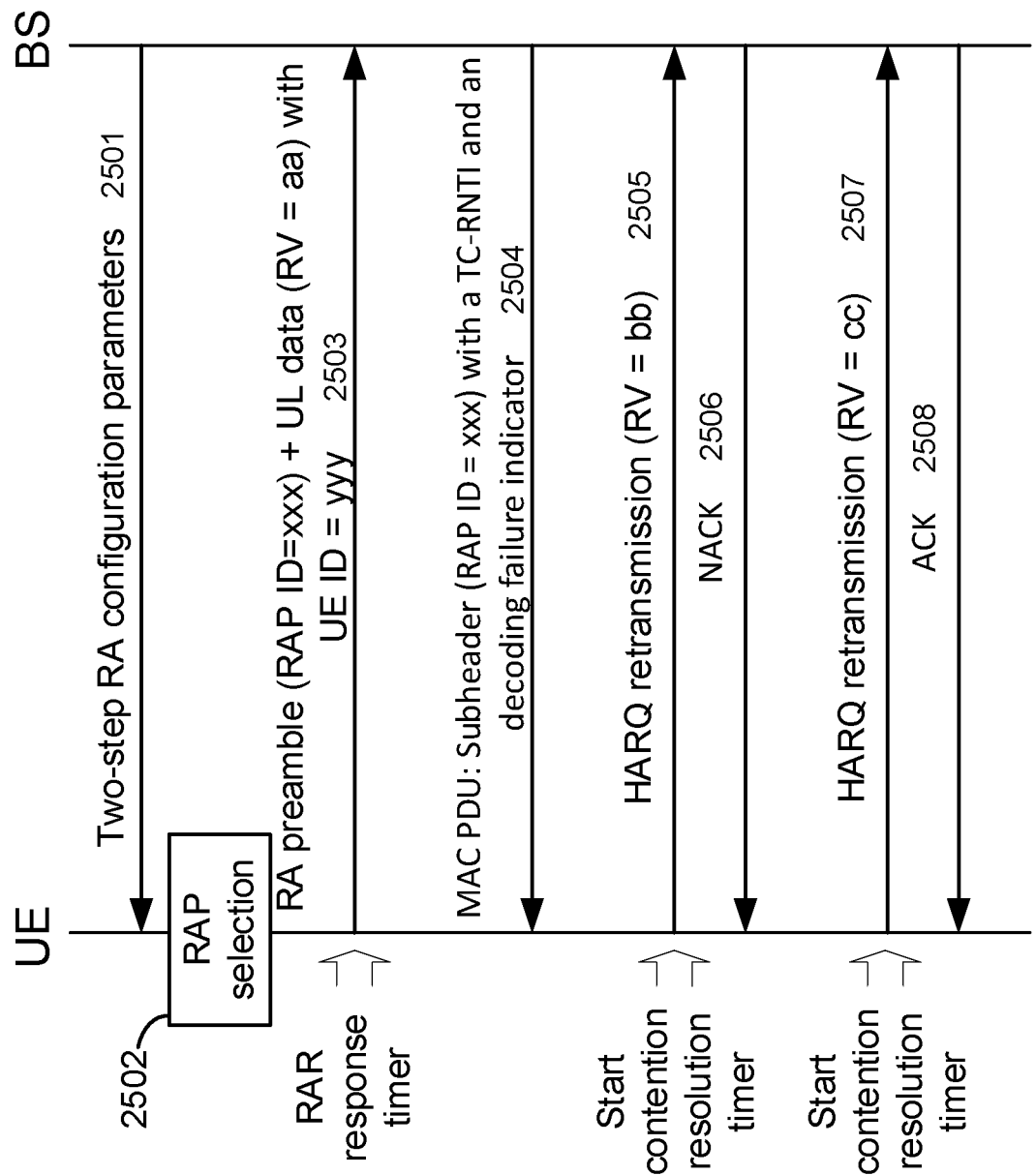
FIG. 25 shows an example for hybrid automatic repeat request (HARQ) retransmission, such as when a cell detects a random access preamble identifier but fails to decode data.

FIG. 25 shows an example of an RA procedure using HARQ retransmission. A HARQ retransmission may occur if a wireless device detects a RAPID in a cell but determines that the base station failed to decode data transmitted by the wireless device. At step 2501, a wireless device may receive, from a base station and via a cell, RA configuration parameters. At step 2502, the wireless device may determine an RAP selection, e.g., comprising one or more RAP selections procedures described herein. At step 2503, the wireless device may transmit an RAP (e.g., comprising an RAP ID=xxx) and UL data (e.g., comprising a first RV=aa, and UE ID=yyy). At or near step 2503, the wireless device may start or restart an RAR response timer. At step 2504, the base station may transmit, and the wireless device may receive, a MAC PDU comprising a subheader (e.g., comprising RAP ID=xxx), such as a MAC subheader, with a TC-RNTI and a decoding failure indicator. Based on receiving the decoding failure indicator, the wireless device may stop the RAR response timer. At step 2505, the wireless device may transmit a HARQ retransmission of the RAP and the UL data. The HARQ retransmission may comprise a second RV (e.g., RV=bb). The wireless device may transmit the HARQ retransmission based on a determination that a decoding failure has occurred (e.g., which may be indicated by the decoding failure indicator). At or near step 2505, the wireless device may start a contention resolution timer. At step 2506, the base station may transmit, to the wireless device, a NACK. The base station may transmit the NACK transmission based on receiving the HARQ retransmission. Based on receiving the NACK, the wireless device may stop the contention resolution timer. At step 2507, the wireless device may transmit a second HARQ retransmission of the RAP and the UL data. The second HARQ retransmission may comprise a third RV (e.g., RV=cc). The wireless device may transmit the second HARQ retransmission based on the wireless device receiving the NACK. At or near step 2507, the wireless device may start or restart a contention resolution timer. At step 2508, the base station may transmit, to the wireless device, an ACK. The wireless device may receive the ACK. Based on receiving the ACK, the wireless device may determine that the second HARQ retransmission was successful. Based on receiving the ACK, the wireless device may stop the contention resolution timer.

For RA procedures using HARQ retransmission, each RV may be transmitted in an adaptive or in a non-adaptive manner A base station may transmit, to a wireless device and via a cell, one or more indicators of a HARQ transmission type. For example, the base station may transmit, to the wireless device and via a downlink control channel, a new data indicator (NDI) with downlink control information (DCI). Additionally or alternatively, the base station may transmit, to the wireless device and via a downlink HARQ indicator channel, a one-bit HARQ acknowledgement (ACK) or non-acknowledgement (NACK). The wireless device may determine, based on the ACK or NACK, whether to transmit, to the base station and via the cell, another RV. If the wireless device detects an NDI that differs from a previously received NDI (e.g., an NDI bit has changed), the wireless device may, regardless of a HARQ ACK or NACK, transmit another RV specified in the DCI. The wireless device may transmit this RV using a resource and modulation and coding scheme (MCS) specified in the same DCI. If the wireless device detects a NDI non-toggled but receives a HARQ NACK message, the wireless device may transmit a predefined RV with the same resource and MCS as the previous HARQ transmission.

The maximum number of HARQ transmissions may be determined for a two-step RA procedure, e.g., by max-HARQ-Msg3Tx in LTE. A wireless device may have a counter for counting the number of HARQ transmissions. A wireless device may set the counter to one based on transmitting the first RV. The wireless device may increase the counter by one based on transmitting a next RV in the cell. If the counter reaches the maximum number of HARQ transmissions configured in a cell (or a retransmission threshold and/or a HARQ transmission threshold), a wireless device may determine that the two-step RA procedure has failed. If the wireless determines that the two-step RA procedure has failed, the wireless device may perform a new RA procedure on a different cell, the same RA procedure but on a different cell, or a new RA procedure on the same cell. The new RA procedure may comprise a two-step or a four-step RA procedure.

Figure 26:
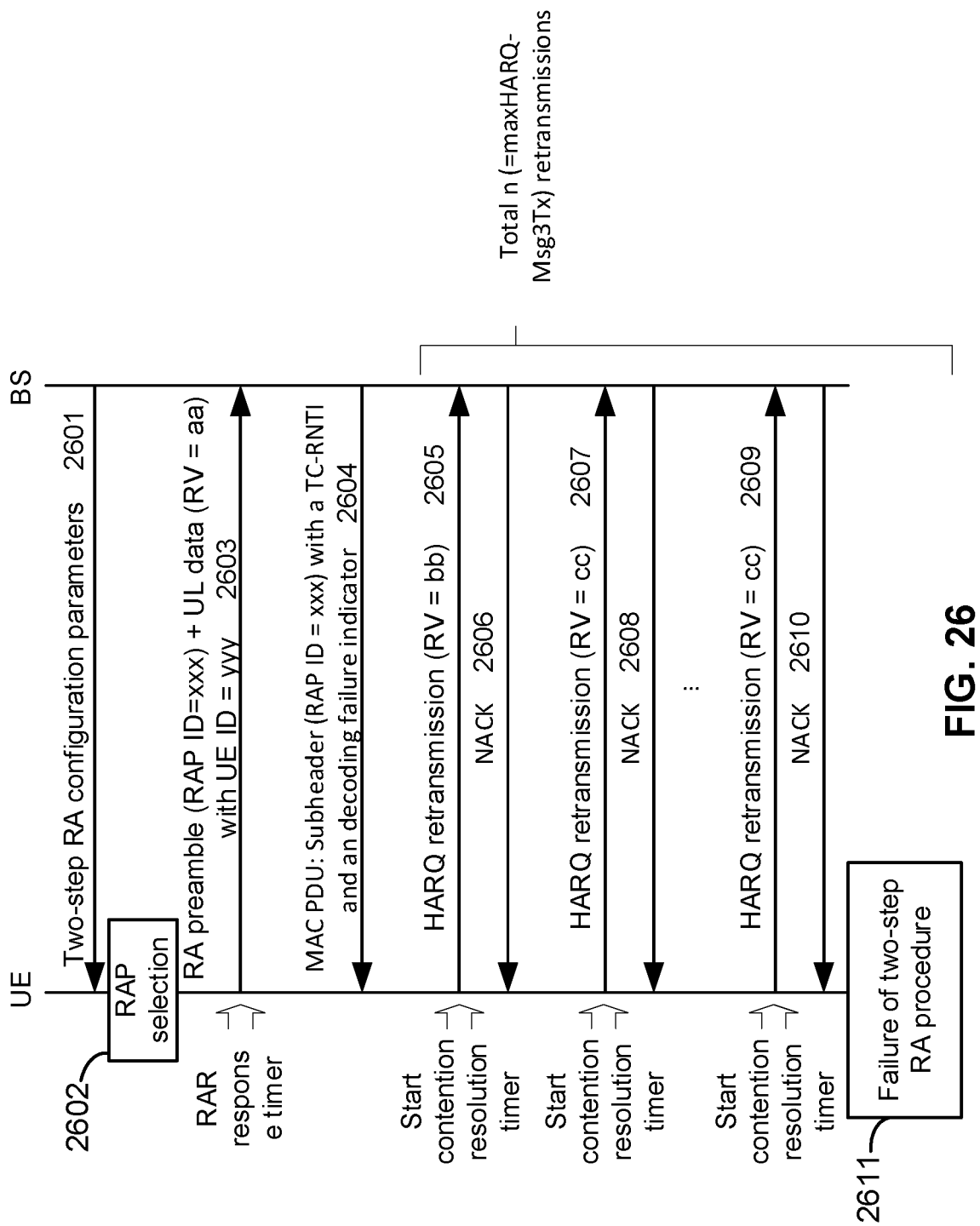
FIG. 26 shows an example of a two-step RA procedure failure as the number of HARQ retransmission reaches a threshold.

FIG. 26 shows an example of a two-step RA procedure failure as the number of HARQ retransmission reaches a threshold. Each of FIG. 26 steps 2601 through 2607 correspond to FIG. 25 steps 2501 through 2607, respectively, the descriptions of which are incorporated by reference here for FIG. 26 steps 2601 through 2607. At step 2608, the base station may transmit, and the wireless device may receive, a second NACK. Steps 2607 and 2608 may be repeated any number of times, wherein each HARQ retransmission may include a different RV, up to a final HARQ retransmission and NACK at steps 2609 and 2610, respectively. The final HARQ retransmission may be based on the total number of HARQ retransmissions reaching a threshold value, such as indicated by maxHARQ-Msg3Tx. At step 2611, if the threshold value for HARQ retransmissions is reached, and if a wireless device receives a NACK (e.g., at step 2610) and/or the contention resolution timer expires without the wireless device receiving an ACK, then the wireless device may determine that the RA procedure has failed. A base station may determine that an RA procedure has failed, e.g., if the base station is unsuccessful in decoding a threshold number of HARQ retransmissions, and/or if the base station does not receive a HARQ retransmission from the wireless device after a threshold period of time.

A wireless device may determine that a two-step RA procedure is successful, e.g., if, prior to the expiration of an RAR response timer, the wireless device receives a MAC PDU that comprises the same RAP ID and wireless device ID that a wireless device transmitted in the UL transmission. An RA procedure may be successful if a base station identifies the wireless device's transmitted RAP, decodes the wireless device's transmitted data, and transmits, to the wireless device and before the wireless device's RAR timer expires, a MAC PDU comprising the RAP ID and wireless device ID. A base station may identify an RAP ID based on a peak detector. The peak detector may detect a peak from correlation outputs between a received signal and a set of RAPs available to a cell. If the resource block, over which the data or portion thereof is transmitted during the UL transmission, is associated with an RAP, an RAP ID may also be detectable based on an energy detector. The energy detector may measure an energy level of the resource block for a UL data transmission.

Figure 27:
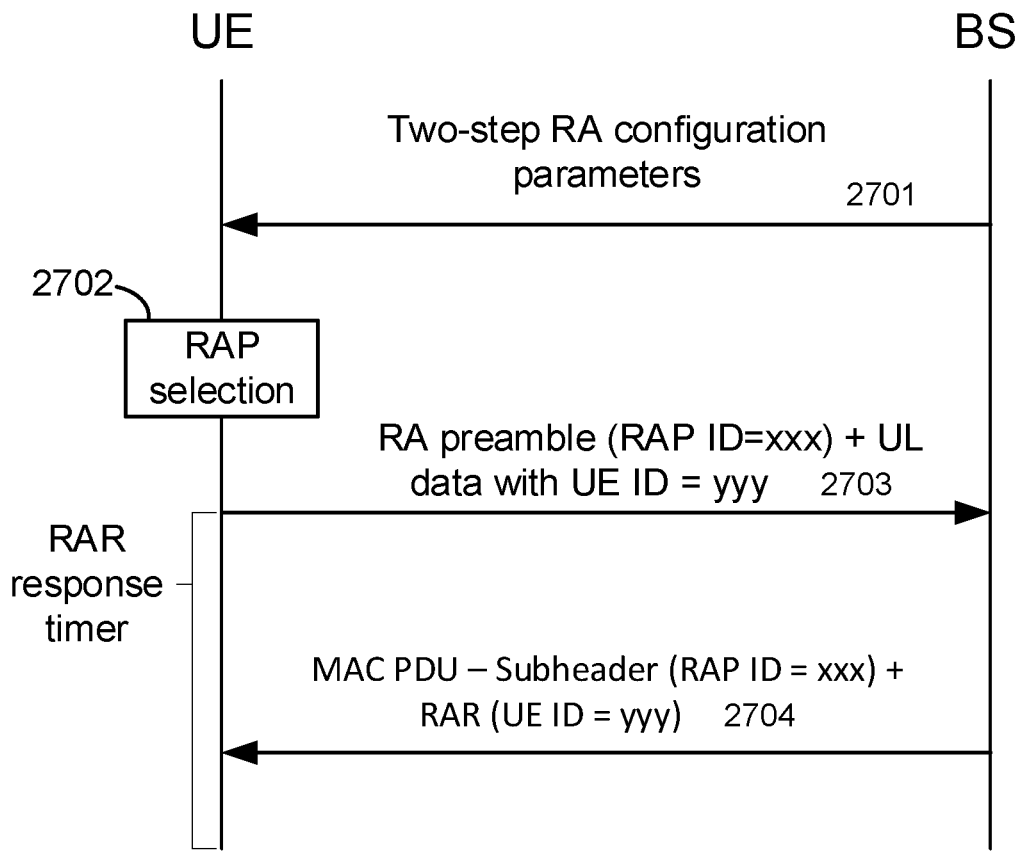
FIG. 27 shows an example of a two-step RA procedure when a base station decodes a RAP and UL data and responds with an RAR to a wireless device.

FIG. 27 shows an example of a successful two-step RA procedure, e.g., wherein a base station decodes an RAP and UL data, and a base station responds by transmitting an RAR to a wireless device. Each of FIG. 27 steps 2701 through 2703 correspond to FIG. 20 steps 2001 through 2003, respectively, the descriptions of which are incorporated by reference here for FIG. 27 steps 2701 through 2703. At or near step 2703, the wireless device may start or restart an RAR response timer. At step 2704, the base station may transmit, to the wireless device, a MAC PDU comprising one or more MAC subheaders and one of more RARs. At least one of the MAC subheaders in the MAC PDU may comprise a RAP ID (e.g., RAP ID=xxx) that may correspond to the RAP ID included in the RAP that was transmitted by the wireless device in step 2703. At least one of the RARs in the MAC PDU may comprise an identifier associated with the wireless device (e.g., UE ID=yyy) that may correspond to the identifier transmitted by the wireless device in step 2703. If the wireless device determines that the RAP ID included in at least one of the MAC subheaders corresponds to the wireless device's RAP IP; if the wireless device determines that an RAP, corresponding to the MAC subheader with the wireless device's RAP ID, comprises the wireless device's identifier; and if the RAR response time has not expired; then the wireless device may determine that the two-step RA procedure was successful.

A wireless device may transmit in parallel, to a base station and via a first cell, a random access preamble, and one or more transport blocks with a first RV associated with a HARQ process, wherein the one or more TBs comprise the wireless device ID. The wireless device may receive an RAR MAC PDU comprising one or more of: a preamble identifier; an uplink grant; a field indicating whether the one or more TBs are received successfully; and/or an RNTI. The wireless device may transmit, using uplink resources, the one or more TBs with a second RV different from the first RV associated with the HARQ process. The uplink resources may be identified in the uplink grant. The wireless device may receive a downlink packet comprising the wireless device ID, if the one or more TBs are decoded successfully. The wireless device may receive one or more messages comprising configuration parameters of a RACH of a first cell.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, that may configure connections between internal hardware modules with lesser functionality on a programmable device. The above mentioned technologies may be used in combination to achieve the result of a functional module.

Systems, apparatuses, and methods may perform operations of multi-carrier communications described herein. Additionally or alternatively, a non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   transmitting, by a wireless device and as part of a two-step random access procedure, a preamble and one or more transport blocks;
   receiving, by the wireless device, a media access control (MAC) packet data unit comprising:
      a MAC subheader; and
      a random access response (RAR);
   determining, based on a field in the MAC subheader, a type of the received RAR from a plurality of types of RARs comprising:
      a first type of RAR that is indicative of random access procedure success and that has a first size; and
      a second type of RAR that is indicative of falling back from the two-step random access procedure and that has a second size different from the first size; and
   transmitting, based on the received RAR being the second type of RAR indicative of falling back from the two-step random access procedure, the one or more transport blocks.

2. The method of claim 1, wherein the second type of RAR is indicative of falling back from the two-step random access procedure to a four-step random access procedure, and wherein the transmitting the one or more transport blocks based on the received RAR being the second type of RAR comprises transmitting the one or more transport blocks as part of the four-step random access procedure.

3. The method of claim 1, wherein the transmitting the one or more transport blocks based on the received RAR being the second type of RAR comprises transmitting the one or more transport blocks as a third step of a four-step random access procedure.

4. The method of claim 1, wherein the received RAR comprises a timing advance command, and wherein the transmitting the one or more transport blocks based on the received RAR being the second type of RAR comprises transmitting the one or more transport blocks using a timing advance that is based on the timing advance command.

5. The method of claim 1, wherein the MAC subheader comprises a random access preamble identifier (RAPID) associated with the preamble.

6. The method of claim 1, wherein the field is a single bit.

7. The method of claim 1, further comprising:
   determining, based on the field, a size of the received RAR as being the second size; and
   decoding, based on the second size, the received RAR.

8. The method of claim 1, further comprising:
   transmitting contention resolution information associated with the transmitting the one or more transport blocks based on the received RAR being the second type of RAR; and
   receiving a contention resolution message that is based on the contention resolution information.

9. A method comprising:
   transmitting, by a wireless device and as part of a two-step random access procedure, a preamble and a first one or more transport blocks;
   receiving, by the wireless device, a media access control (MAC) packet data unit comprising:
      a MAC subheader; and
      a random access response (RAR);
   determining, based on a field in the MAC subheader, a type of the received RAR from a plurality of types of RARs comprising:
      a first type of RAR that is indicative of random access procedure success and that has a first size; and
      a second type of RAR that is indicative of falling back from the two-step random access procedure and that has a second size different from the first size; and
   transmitting, based on the received RAR being the first type of RAR indicative of random access procedure success, a second one or more transport blocks.

10. The method of claim 9, further comprising:
    receiving, after the receiving the MAC packet data unit, an uplink grant,
    wherein the transmitting the second one or more transport blocks comprises transmitting, based on the uplink grant, the second one or more transport blocks.

11. The method of claim 9, wherein the received RAR comprises a timing advance command, and wherein the transmitting the second one or more transport blocks comprises transmitting the second one or more transport blocks using a timing advance that is based on the timing advance command.

12. The method of claim 9, wherein the second type of RAR is indicative of falling back from the two-step random access procedure to a four-step random access procedure.

13. The method of claim 9, wherein the field is a single bit.

14. The method of claim 9, further comprising:
    determining, based on the field, a size of the received RAR as being the first size; and
    decoding, based on the first size, the RAR.

15. A wireless device comprising:
    one or more processors; and
    memory storing instructions that, when executed by the one or more processors, configure the wireless device to:
       transmit, as part of a two-step random access procedure, a preamble and one or more transport blocks;
       receive a media access control (MAC) packet data unit comprising:
          a MAC subheader; and
          a random access response (RAR);

determine, based on a field in the MAC subheader, a type of the received RAR from a plurality of types of RARs comprising:
  a first type of RAR that is indicative of random access procedure success and that has a first size; and
  a second type of RAR that is indicative of falling back from the two-step random access procedure and that has a second size different from the first size; and
transmit, based on the received RAR being the second type of RAR indicative of falling back from the two-step random access procedure, the one or more transport blocks.

16. The wireless device of claim 15, wherein the second type of RAR is indicative of falling back from the two-step random access procedure to a four-step random access procedure, and wherein the instructions, when executed by the one or more processors, configure the wireless device to transmit the one or more transport blocks based on the received RAR being the second type of RAR by transmitting the one or more transport blocks as part of the four-step random access procedure.

17. The wireless device of claim 15, wherein the instructions, when executed by the one or more processors, configure the wireless device to transmit the one or more transport blocks based on the received RAR being the second type of RAR by transmitting the one or more transport blocks as a third step of a four-step random access procedure.

18. The wireless device of claim 15, wherein the received RAR comprises a timing advance command, and wherein the instructions, when executed by the one or more processors, configure the wireless device to transmit the one or more transport blocks based on the received RAR being the second type of RAR by transmitting the one or more transport blocks using a timing advance that is based on the timing advance command.

19. The wireless device of claim 15, wherein the MAC subheader comprises a random access preamble identifier (RAPID) associated with the preamble.

20. The wireless device of claim 15, wherein the field is a single bit.

21. The wireless device of claim 15, wherein the instructions, when executed by the one or more processors, configure the wireless device to:
  determine, based on the field, a size of the received RAR as being the second size; and
  decode, based on the second size, the received RAR.

22. The wireless device of claim 15, wherein the instructions, when executed by the one or more processors, configure the wireless device to:
  transmit contention resolution information associated with the transmitting the one or more transport blocks based on the received RAR being the second type of RAR; and
  receive a contention resolution message that is based on the contention resolution information.

23. A wireless device comprising:
one or more processors; and
memory storing instructions that, when executed by the one or more processors, configure the wireless device to:
  transmit, as part of a two-step random access procedure, a preamble and a first one or more transport blocks;
  receive a media access control (MAC) packet data unit comprising:
    a MAC subheader; and
    a random access response (RAR);
  determine, based on a field in the MAC subheader, a type of the received RAR from a plurality of types of RARs comprising:
    a first type of RAR that is indicative of random access procedure success and that has a first size; and
    a second type of RAR that is indicative of falling back from the two-step random access procedure and that has a second size different from the first size; and
  transmit, based on the received RAR being the first type of RAR indicative of random access procedure success, a second one or more transport blocks.

24. The wireless device of claim 23, wherein the instructions, when executed by the one or more processors, configure the wireless device to:
  receive, after the receiving the MAC packet data unit, an uplink grant; and
  transmit the second one or more transport blocks by transmitting, based on the uplink grant, the second one or more transport blocks.

25. The wireless device of claim 23, wherein the received RAR comprises a timing advance command, and wherein the instructions, when executed by the one or more processors, configure the wireless device to transmit the second one or more transport blocks by transmitting the second one or more transport blocks using a timing advance that is based on the timing advance command.

26. The wireless device of claim 23, wherein the second type of RAR is indicative of falling back from the two-step random access procedure to a four-step random access procedure.

27. The wireless device of claim 23, wherein the field is a single bit.

28. The wireless device of claim 23, wherein the instructions, when executed by the one or more processors, configure the wireless device to:
  determine, based on the field, a size of the received RAR as being the first size; and
  decode, based on the first size, the RAR.

* * * * *

UNITED STATES PATENT AND TRADEMARK OFFICE
CERTIFICATE OF CORRECTION

PATENT NO. : 11,758,587 B2
APPLICATION NO. : 17/333821
DATED : September 12, 2023
INVENTOR(S) : Jeon et al.

Page 1 of 1

It is certified that error appears in the above-identified patent and that said Letters Patent is hereby corrected as shown below:

In the Drawings

Sheet 7 of 27, FIG. 7, Reference Numeral 723, Lines 1-4:
Delete "DL-SCH of SCH" and insert --DL-SCH of SCG-- therefor Sheet 7 of 27, FIG. 7, Reference Numeral 724, Lines 1-3:
Delete "UL-SCH of SCH" and insert --UL-SCH of SCG-- therefor In the Specification Column 22, Detailed Description, Line 43:
After "demand", insert --.-- therefor Column 42, Detailed Description, Lines 18-19:
Delete "mac-ContentionResolution Timer" and insert --mac-ContentionResolutionTimer-- therefor Column 48, Detailed Description, Line 43:
After "manner", insert --.-- therefor Column 51, Detailed Description, Lines 20-21:
After "manner", insert --.-- therefor Signed and Sealed this
Nineteenth Day of November, 2024

Katherine Kelly Vidal
*Director of the United States Patent and Trademark Office*